United States Patent
Jung et al.

(10) Patent No.: US 12,206,627 B2
(45) Date of Patent: *Jan. 21, 2025

(54) METHOD AND APPARATUS FOR PERFORMING COMMUNICATION IN MOBILE COMMUNICATION SYSTEM

(71) Applicant: SAMSUNG ELECTRONICS CO., LTD., Suwon-si (KR)

(72) Inventors: Sangyeob Jung, Suwon-si (KR); Soenghun Kim, Suwon-si (KR); Jaehyuk Jang, Suwon-si (KR); Milos Tesanovic, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,409

(22) Filed: Mar. 31, 2023

(65) Prior Publication Data

US 2023/0239130 A1 Jul. 27, 2023

Related U.S. Application Data

(63) Continuation of application No. 17/452,192, filed on Oct. 25, 2021, now Pat. No. 11,621,823, which is a
(Continued)

(30) Foreign Application Priority Data

Nov. 1, 2018 (KR) .......................... 10-2018-0133144

(51) Int. Cl.
*H04L 5/00* (2006.01)
*H04L 5/14* (2006.01)
(Continued)

(52) U.S. Cl.
CPC ............. *H04L 5/1469* (2013.01); *H04W 8/24* (2013.01); *H04W 72/0453* (2013.01); *H04W 76/27* (2018.02); *H04W 80/02* (2013.01)

(58) Field of Classification Search
CPC ...... H04L 5/1469; H04W 76/27; H04W 8/24; H04W 72/0453; H04W 80/02
See application file for complete search history.

(56) References Cited

U.S. PATENT DOCUMENTS 9,888,478 B2    2/2018  Kim et al.
11,621,823 B2 *  4/2023  Jung .................... H04L 5/1469
                                                             370/329
(Continued)

FOREIGN PATENT DOCUMENTS

CN          104285388 A      1/2015
CN          107466032 A     12/2017
KR      10-2014-0047504 A    4/2014

OTHER PUBLICATIONS

European Patent Office, "Communication pursuant to Article 94(3) EPC" dated Jun. 2, 2023, in connection with European Patent Application No. 19878902.6, 18 pages.
(Continued)

*Primary Examiner* — Erika A Washington

(57) ABSTRACT

A user equipment (UE) for performing communication, the UE including a transceiver; and a processor coupled with the transceiver and configured to: control the transceiver to receive a UE capability enquiry, determine UE capability fields, except a frequency division duplexing (FDD) additional UE capability field, a time division duplexing (TDD) additional UE capability field, a frequency range 1 (FR 1) additional UE capability field and a frequency range 2 (FR 2) additional UE capability field, to include values applicable for all duplex modes and frequency ranges, and control
(Continued)

the transceiver to transmit UE capability information based on a result of the determination.

16 Claims, 19 Drawing Sheets

Related U.S. Application Data continuation of application No. 16/672,189, filed on Nov. 1, 2019, now Pat. No. 11,159,302.

(51) Int. Cl.
    *H04W 8/24*     (2009.01)
    *H04W 72/0453*     (2023.01)
    *H04W 76/27*     (2018.01)
    *H04W 80/02*     (2009.01)

(56) References Cited

U.S. PATENT DOCUMENTS

| | | |
|---|---|---|
| 2014/0162642 A1 | 6/2014 | Kwon et al. |
| 2016/0029209 A1 | 1/2016 | Kim et al. |
| 2019/0261425 A1 | 8/2019 | Park et al. |
| 2019/0357261 A1 | 11/2019 | Cirik et al. |
| 2022/0116982 A1 | 4/2022 | Lee et al. |

OTHER PUBLICATIONS

Office Action dated Dec. 2, 2022 in connection with Korean Patent Application No. 10-2018-0133144, 6 pages.
Intellectual Property India, "Examination report under sections 12 &13 of the Patents Act" issued Mar. 2, 2022, in connection with Indian Patent Application No. 202137024179, 6 pages.
Supplementary European Search Report dated Dec. 6, 2021, in connection with European Application No. 19878902.6, 14 pages.
3GPP TS 38.306 V15.0.0 (Dec. 2017), Technical Specification, 3rd Generation Partnership Project; Technical Specification Group Radio Access Network; NR; User Equipment (UE) radio access capabilities (Release 15), Dec. 2017, 14 pages.
Ericsson, "Power class and P-max," R2-1810858, 3GPP TSG-WG2 Meeting #102AH, Montreal, Canada, Jul. 2-6, 2018, 22 pages.
NGMN, "Definition of the Testing Framework for the NGMN 5G TTI Interoperability," Version 1, Next Generation Mobile Networks, Ltd., Aug. 2018, 59 pages.
Office Action dated Oct. 17, 2023, in connection with Chinese Patent Application No. 201980072466.3, 14 pages.
Qualcomm Incorporated, "[Q102-LTE][Q127-NR1] Inclusion of NR capability by EN-DC UE," 3GPP TSG-RAN WG2 #103 meeting, Gothenburg, Sweden, Aug. 2018, R2-1811140, 8 pages.
Qualcomm Incorporated, "Handling of FDD/TDD and FR1/FR2 capability differences," 3GPP TSG-RAN WG2 #103 meeting, Chengdu, China, Oct. 2018, R2-1814228 (Resubmission of R2-1811134), 4 pages.
Notice of Allowance issued Nov. 25, 2024, in connection with Korean Patent Application No. 10-2024-0051683, 5 pages.
ETSI TS 138 304 V15.1.0 (Oct. 2018), Technical Specification; 5G; NR; User Equipment (UE) procedures in idle mode and in RRC Inactive state (3GPP TS 38.304 version 15.1.0 Release 15); 30 pages.
ETSI TS 138 331 V15.3.0 (Oct. 2018); ), Technical Specification; 5G; NR; Radio Resource Control (RRC); Protocol specification (3GPP TS 38.331 version 15.3.0 Release 15); 441 pages.
Ericsson, "Review issue list for TS 38.331 EN-DC ASN.1 freeze," 3GPP TSG-RAN2#AH-1801, Tdoc R2-1803550, Vancouver, Canada, Jan. 2018, 387 pages.
Ericsson, "Introduction of SA," 3GPP TSG-WG2 Meeting #102AH R2-1810388, Montreal, Canada Jul. 2018, 283 pages.
Communication pursuant to Article 94(3) EPC dated Nov. 8, 2024, in connection with European Patent Application No. 19 878 902.6, 10 pages.

\* cited by examiner

METHOD AND APPARATUS FOR PERFORMING COMMUNICATION IN MOBILE COMMUNICATION SYSTEM

CROSS-REFERENCE TO RELATED APPLICATIONS

This application is a continuation of application Ser. No. 17/452,192 filed on Oct. 25, 2021, now U.S. Pat. No. 11,621,823 issued Apr. 4, 2023, which is a continuation of application Ser. No. 16/672,189 filed on Nov. 1, 2019, now U.S. Pat. No. 11,159,302 issued Oct. 25, 2021, which is based on and claims priority under 35 U.S.C. § 119 to Korean Patent Application No. 10-2018-0133144 filed on Nov. 1, 2018, in the Korean Intellectual Property Office, the disclosures of which are herein incorporated by reference in their entirety.

BACKGROUND

1. Field

The disclosure relates to a mobile communication system, and more particularly, to a method and apparatus for performing communication between a base station (BS) and a user equipment (UE) in a mobile communication system.

2. Description of Related Art

To meet increasing demand with respect to wireless data traffic after the commercialization of $4^{th}$ generation (4G) communication systems, efforts have been made to develop enhanced $5^{th}$ generation (5G) New Radio (NR) communication systems. In order to achieve a high data transmission rate, 5G communication systems are designed to support a super-high frequency band (millimeter wave (mmWave)), e.g., a frequency band of 28 GHz. In order to reduce the occurrence of stray electric waves and to increase transmission distances of electric waves in the super-high frequency band, various technologies for 5G communication systems are being studied, for example: beamforming, Massive Multiple Input Multiple Output (MIMO), Full Dimensional MIMO (FD-MIMO), array antennas, analog beam-forming, and large-scale antennas. In addition, unlike Long-Term Evolution (LTE) systems, 5G communication systems support various subcarrier spacings such as 15 kHz, 30 kHz, 60 kHz, and 120 kHz. A physical control channel uses polar coding, and a physical data channel uses Low Density Parity Check (LDPC). In addition, as waveforms for uplink transmission, not only Cyclic Prefix-Orthogonal Frequency Division Multiplexing (CP-OFDM) but also Discrete Fourier Transform-Spread-Orthogonal Frequency Division Multiplexing (DFT-S-OFDM) are used. LTE may support Hybrid Automatic Repeat Request (HARQ) retransmission in a Transport Block (TB) unit, but 5G may additionally support HARQ retransmission in a Code Block Group (CBG) unit in which multiple Code Blocks (CBs) are grouped.

In order to improve system networks for 5G communication systems, various technologies have been developed, including evolved small cells, advanced small cells, cloud radio access networks (cloud RAN), ultra-dense networks, Device-to-Device communication (D2D), wireless backhaul, Vehicle-to-Everything (V2X) networks, cooperative communication, Coordinated Multi-Points (CoMP), and interference cancellation.

The Internet has evolved from a human-based connection network, where humans create and consume information, to the Internet of Things (IoT), where distributed configurations, such as objects, exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

To this end, various attempts are being made to apply 5G communication systems to the IoT network. For example, technologies related to sensor networks, M2M communication, and MTC are being implemented by using 5G communication technology including beamforming, MIMO, and array antennas. Application of cloud radio access network (Cloud-RAN) as the above-described big data processing technology may be an example of convergence of 5G communication technology and IoT technology. As such, a plurality of services may be provided to a user in a communication system, and in order to provide the plurality of services to a user, there is a need for a method of providing each service within a same time period according to a characteristic of each service, and an apparatus using the method. Various services provided by 5G communication systems are being studied, and one of the various services is a service that satisfies the requirements of low latency and high reliability. The service is referred to as Ultra-Reliable and Low-Latency Communication (URLLC).

Because various services may be provided due to the aforementioned technical features and the development of wireless communication systems, methods for effectively providing these services are required.

SUMMARY

According to an embodiment of the disclosure, provided is a method of providing information about a capability of a user equipment (UE) in a mobile communication system. According to an embodiment of the disclosure, provided is a method of using a plurality of scheduling request resources configured in a base station (BS) so as to request a resource for data transmission by the UE in a mobile communication system. According to an embodiment of the disclosure, provided is a method of performing cell reselection by the UE, in response to channel bandwidth signaling, in a mobile communication system.

Additional aspects will be set forth in part in the description which follows and, in part, will be apparent from the description, or may be learned by practice of the presented embodiments of the disclosure.

According to an embodiment of the disclosure, a user equipment (UE) for performing communication includes a transceiver; and a processor coupled with the transceiver and configured to: control the transceiver to receive a UE capability enquiry, determine UE capability fields, except a frequency division duplexing (FDD) additional UE capability field, a time division duplexing (TDD) additional UE capability field, a frequency range 1 (FR 1) additional UE capability field and a frequency range 2 (FR 2) additional UE capability field, to include values applicable for all duplex modes and frequency ranges, and control the transceiver to transmit UE capability information based on a result of the determination.

The processor may be further configured to in case that the UE supports functionalities of a FDD and a TDD and at least one of the UE capability fields have a different value for the FDD and the TDD, determine, for the FDD, whether the UE supports an additional functionality compared to what is indicated by a previous UE capability fields, and in response to the UE supporting the additional functionality for the FDD, determine the FDD additional UE capability field to reflect the additional functionality for the FDD.

The processor may be further configured to in case that the UE supports functionalities of a FDD and a TDD and at least one of the UE capability fields have a different value for the FDD and the TDD, determine, for the TDD, whether the UE supports an additional functionality compared to what is indicated by a previous UE capability fields, and in response to the UE supporting the additional functionality for the TDD, determine the TDD additional UE capability field to reflect the additional functionality for the TDD.

The processor may be further configured to in case that the UE supports functionalities of a FR1 and a FR2 and at least one of the UE capability fields have a different value for the FR1 and the FR2, determine, for the FR1, whether the UE supports an additional functionality compared to what is indicated by a previous UE capability fields, and in response to the UE supporting the additional functionality for the FR1, determine the FR1 additional UE capability field to reflect the additional functionality for the FR1.

The processor may be further configured to in case that the UE supports functionalities of a FR1 and a FR2 and at least one of the UE capability fields have a different value for the FR1 and the FR2, determine, for the FR2, whether the UE supports an additional functionality compared to what is indicated by a previous UE capability fields, and in response to the UE supporting the additional functionality for the FR2, determine the FR2 additional UE capability field to reflect the additional functionality for the FR2.

In case that a rat type for the UE capability enquiry is set to a nr, the UE capability fields includes UE-NR-capability fields.

According to another embodiment of the disclosure, a base station for performing communication includes a transceiver; and a processor coupled with the transceiver and configured to: control the transceiver to transmit a user equipment (UE) capability enquiry, and to receive UE capability information in response to the UE capability enquiry, wherein UE capability fields of the UE capability information, except a FDD (frequency division duplexing) additional UE capability field, a time division duplexing (TDD) additional UE capability field, a frequency range 1 (FR 1) additional UE capability field and a frequency range 2 (FR 2) additional UE capability field, is determined to include values applicable for all duplex modes and frequency ranges.

According to another embodiment of the disclosure, a method, performed by a user equipment (UE), of performing communication includes receiving a UE capability enquiry; determining UE capability fields, except a frequency division duplexing (FDD) additional UE capability field, a time division duplexing (TDD) additional UE capability field, a FR 1 (frequency range 1) additional UE capability field and a frequency range 2 (FR 2) additional UE capability field, to include values applicable for all duplex modes and frequency ranges, and transmitting UE capability information based on a result of the determination.

According to an embodiment of the disclosure, a method, performed by a base station, of performing communication includes transmitting a UE capability enquiry; and receiving UE capability information in response to the UE capability enquiry, wherein UE capability fields of the UE capability information, except a FDD (frequency division duplexing) additional UE capability field, a tdd (time division duplexing) additional UE capability field, a frequency range 1 (FR 1) additional UE capability field and a frequency range 2 (FR 2) additional UE capability field, is determined to include values applicable for all duplex modes and frequency ranges.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
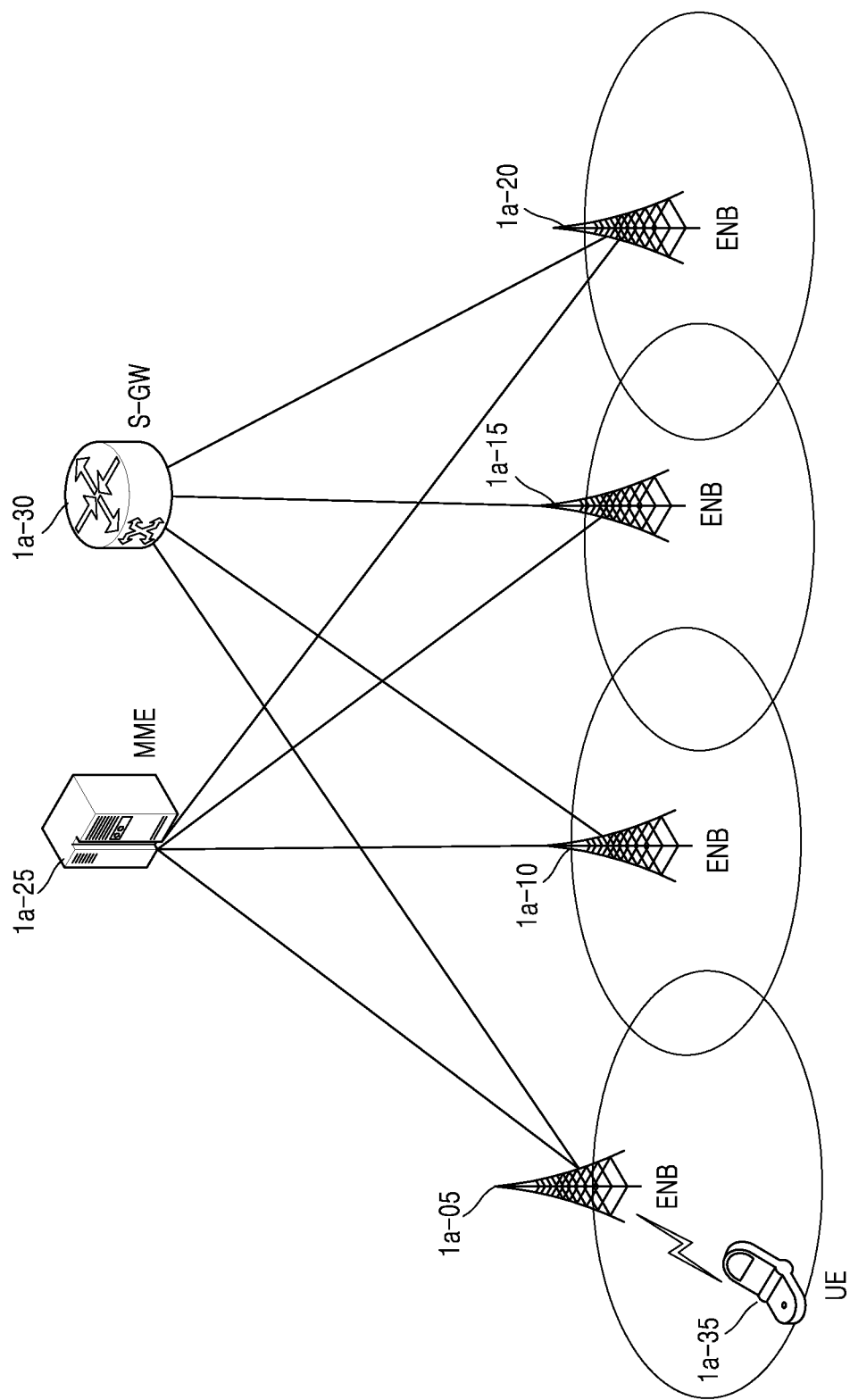
FIG. 1A illustrates a diagram of an architecture of a Long-Term Evolution (LTE) system, according to an embodiment of the disclosure.

FIGS. 1A through 3I, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor.

In the disclosure, a downlink (DL) refers to a wireless transmission path of a signal to be transmitted from a base station (BS) to a UE, and an uplink (UL) refers to a wireless transmission path of a signal to be transmitted from a UE to a BS. Although the following descriptions may be provided about long term evolution (LTE) or LTE-Advanced (LTE-A) systems as an example, embodiments of the disclosure are also applicable to other communication systems having similar technical backgrounds or channel structure. For example, embodiments of the disclosure may be applicable to a system including $5^{th}$ generation (5G) new radio (NR) communication technology developed after LTE-A system, and hereinafter, 5G may indicate a concept including LTE, LTE-A, and other similar services according to the related art. The disclosure is applicable to other communication systems through modification at the discretion of one of ordinary skill in the art without greatly departing from the scope of the disclosure.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of description, the disclosure uses terms and names defined in the $3^{rd}$ Generation Partnership Project (3GPP) long term evolution (LTE) standards. However, the disclosure is not limited to these terms and names, and may be equally applied to communication systems conforming to other standards. In the disclosure, an evolved node B (eNB) may be interchangeably used with a next-generation node B (gNB) for convenience of explanation. That is, a BS described by an eNB may represent a gNB.

In the following descriptions of the disclosure, well-known functions or configurations are not described in detail because they would obscure the disclosure with unnecessary details. Hereinafter, embodiments of the disclosure will be described in detail with reference to accompanying drawings.

FIG. 1A illustrates a diagram of an architecture of a LTE system, according to an embodiment of the disclosure.

Referring to FIG. 1A, a radio access network of the LTE system may include a plurality of next-generation base stations (e.g., evolved nodes B (eNBs), nodes B, or BSs) 1a-05, 1a-10, 1a-15, and 1a-20, a mobility management entity (MME) 1a-25, and a serving-gateway (S-GW) 1a-30.

A UE (or a terminal) 1a-35 may access an external network via the eNB 1a-05, 1a-10, 1a-15, or 1a-20 and the S-GW 1a-30.

In FIG. 1A, the eNB 1a-05, 1a-10, 1a-15, or 1a-20 may correspond to an existing node B of a universal mobile telecommunications system (UMTS). The eNB 1a-05, 1a-10, 1a-15, or 1a-20 may be connected to the UE 1a-35 through wireless channels and perform complex functions compared to the existing node B. In the LTE system, all user traffic data including real-time services such as voice over Internet protocol (VoIP) may be serviced through shared channels. Therefore, an entity for performing scheduling by collating status information of UEs, the status information including buffer status information, available transmit power status information, and channel status information, may be required and the eNB 1a-05, 1a-10, 1a-15, or 1a-20 may operate as such an entity.

One eNB may generally control a plurality of cells. For example, the LTE system may use radio access technology such as orthogonal frequency division multiplexing (OFDM) at a bandwidth of 20 MHz so as to achieve a data rate of 100 Mbps. The LTE system may also use adaptive modulation & coding (AMC) to determine a modulation scheme and a channel coding rate in accordance with a channel status of the UE 1a-35. The eNBs 1a-05, 1a-10, 1a-15, and 1a-20 as access nodes of a cellular network may provide wireless access to UEs that access a network. That is, to service traffic of users, the eNBs 1a-05, 1a-10, 1a-15, and 1a-20 may perform scheduling by collating status information of UEs, the status information including buffer status information, available transmit power status information, and channel status information, and may support connection between the UEs and a core network (CN).

The S-GW 1a-30 is an entity for providing data bearers and may generate or remove the data bearers by the control of the MME 1a-25. The MME 1a-25 is an entity for performing a mobility management function and various control functions on the UE 1a-35 and may be connected to the plurality of eNBs 1a-05, 1a-10, 1a-15, and 1a-20.

The MME 1a-25 and the S-GW 1a-30 may further perform authentication with respect to a UE attempting to access a network, bearer management, or the like, and may process a packet received from or a packet to be transmitted to the eNB 1a-05, 1a-10, 1a-15, or 1a-20.

Figure 1B:
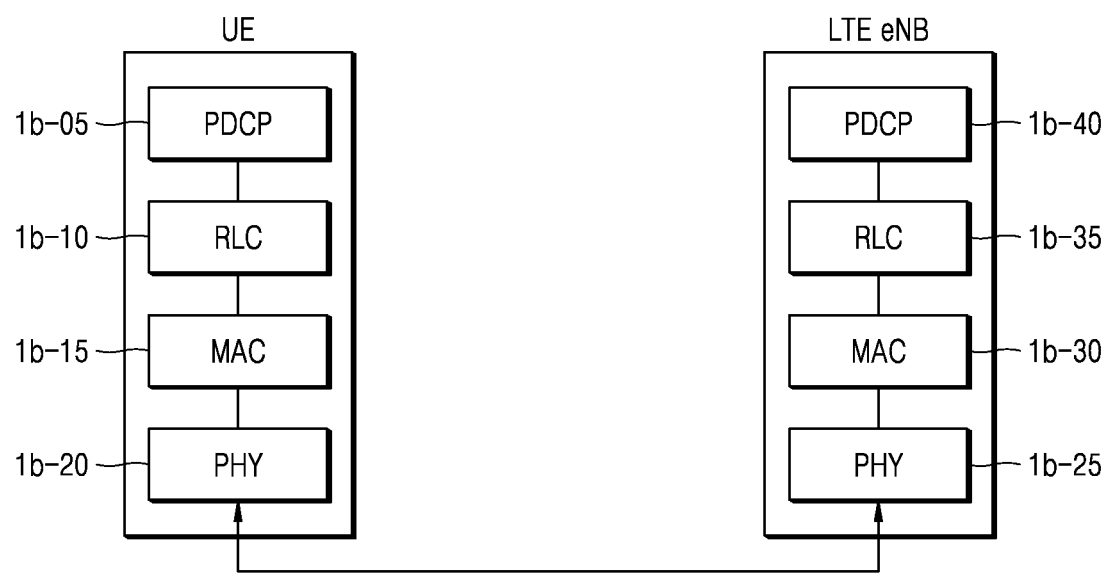
FIG. 1B illustrates a diagram of a radio protocol architecture of an LTE system, according to an embodiment of the disclosure.

FIG. 1B illustrates a diagram of a radio protocol architecture of an LTE system, according to an embodiment of the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, media access control (MAC) layers 1b-15 and 1b-30, and physical (PHY) layers 1b-20 and 1b-25 respectively for a UE and a LTE eNB. The PDCP layer 1b-05 or 1b-40 is in charge of, for example, Internet protocol (IP) header compression/decompression. Main functions of the PDCP layer 1b-05 or 1b-40 are summarized as shown below.

Header compression and decompression: robust header compression (ROHC) only

Transfer of user data

In-sequence delivery of upper layer packet data units (PDUs) at PDCP re-establishment procedure for RLC acknowledged mode (AM)

For split bearers in DC (only support for RLC AM): PDCP PDU routing for transmission and PDCP PDU reordering for reception Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC layer 1b-10 or 1b-35 may perform, for example, an automatic repeat request (ARQ) operation by reconfiguring PDCP PDUs to appropriate sizes. Main functions of the RLC layer 1b-10 or 1b-35 are summarized as shown below.

Transfer of upper layer PDUs

Error correction through ARQ (only for AM data transfer)

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 may be connected to a plurality of RLC layers configured for one UE, and may multiplex RLC PDUs into a MAC PDU and demultiplex the RLC PDUs from the MAC PDU. Main functions of the MAC layer 1b-15 or 1b-30 are summarized as shown below.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through hybrid ARQ (HARQ)

Priority handling between logical channels of one UE

Priority handling between UEs by means of dynamic scheduling

Multimedia broadcast/multicast service (MBMS) service identification

Transport format selection

Padding

The PHY layer 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

The PHY layer 1b-20 or 1b-25 also uses HARQ for additional error correction, and a receiver transmits 1-bit information indicating whether a packet transmitted from a transmitter is received. Such information is called HARQ acknowledgement (ACK)/negative acknowledgement (NACK) information. DL HARQ ACK/NACK information for UL transmission may be transmitted through a physical HARQ indicator channel (PHICH), and UL HARQ ACK/NACK information for DL transmission may be transmitted through a physical uplink control channel (PUCCH) or a physical uplink shared channel (PUSCH). The PUSCH may be used for the UE to transmit not only the HARQ ACK/NACK information but also transmit channel status information (CSI), a scheduling request (SR), or the like to the eNB. The SR is 1-bit information, and when the UE transmits the SR in a resource in the PUCCH configured by the eNB, the eNB recognizes that the UE has data to be transmitted through a UL and thus allocates a UL resource. The UE may transmit a detailed buffer status report (BSR) through the UL resource. The eNB may allocate a plurality of SR resources to a single UE.

The PHY layer 1b-20 or 1b-25 may include one or more frequencies/carriers, and a technology by which one eNB simultaneously configures and uses a plurality of frequencies is called carrier aggregation (CA). The CA technology may increase one carrier used for communication between a UE and an E-UTRAN nodeB (eNB), into one main carrier and one or more subcarriers, thereby greatly increasing a data rate by the number of subcarriers. In LTE, a cell, in the eNB, that uses a main carrier is called a primary cell (PCell), and a cell using a subcarrier is called a secondary cell (SCell). A technology of expanding CA capability to two eNBs is referred to as a dual connectivity (DC) technology. In the DC technology, the UE may be simultaneously connected to a master eNB (MeNB) and a secondary eNB (SeNB) and may use both of them, and cells belonging to the MeNB may be called a master cell group (MCG), and cells belonging to the SeNB may be called a secondary cell group (SCG). Each cell group may have a representative cell. The representative cell of the MCG may be called a PCell, and the representative cell of the SCG may be called a primary secondary cell (PSCell). When the NR is used, the MCG is used for LTE and the SCG is used for the NR, allowing the UE to use both LTE and NR at the same time.

Although not illustrated, there are RRC layers above the PDCP layers of the UE and the base station, and the RRC layers may exchange control messages related to access and measurement for radio resource control. For example, the eNB may instruct the UE to perform measurement by using the message of the RRC layer, and the UE may report the measurement result to the eNB by using the message of the RRC layer.

Figure 1C:
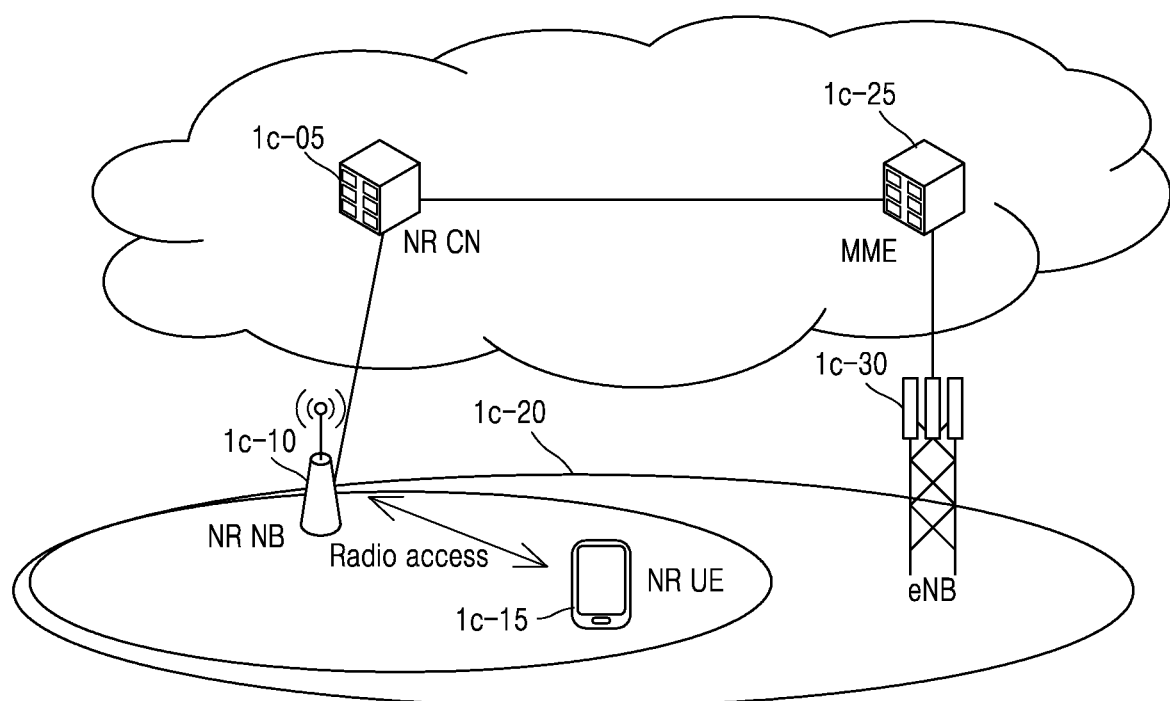
FIG. 1C illustrates a diagram of an architecture of a next-generation mobile communication system, according to an embodiment of the disclosure.

FIG. 1C illustrates a diagram of an architecture of a next-generation mobile communication system, according to an embodiment of the disclosure.

Referring to FIG. 1C, a radio access network of the next-generation mobile communication system (e.g., a NR or 5G system) includes a next-generation BS (e.g., a new radio node B (NR gNB or NR BS) 1c-10 and a new radio core network (NR CN) 1c-05. A NR UE (or NR terminal) 1c-15 may access an external network via the NR gNB 1c-10 and the NR CN 1c-05.

In FIG. 1C, the NR gNB 1c-10 may correspond to an existing evolved node B (eNB) of an existing LTE system. The NR gNB 1c-10 may be connected to the NR UE 1c-15 through wireless channels and may provide superior services compared to an existing node B. In the NR or 5G system, all user traffic data may be serviced through shared channels. Therefore, an entity for performing scheduling by collating, for example, buffer status information of UEs, available transmit power status information, and channel status information may be required and the NR gNB 1c-10 may operate as such an entity. One NR gNB 1c-10 may control a plurality of cells. In the NR or 5G system, a bandwidth greater than the maximum bandwidth of the existing LTE system may be applied to achieve an ultrahigh data rate. In the NR or 5G system, a beamforming technology may be additionally associated with OFDM as a radio access technology. Also, AMC may also be used to determine a modulation scheme and a channel coding rate in accordance with a channel status of the NR UE 1c-15.

The NR CN 1c-05 may perform functions such as mobility support, bearer establishment, and quality of service (QoS) configuration. The NR CN 1c-05 is an entity for performing a mobility management function and various control functions on the NR UE 1c-15 and may be connected to a plurality of base stations. The NR or 5G system may cooperate with the existing LTE system, and the NR CN 1c-05 may be connected to an MME 1c-25 through a network interface. The MME 1c-25 may be connected to an existing eNB 1c-30.

Figure 1D:
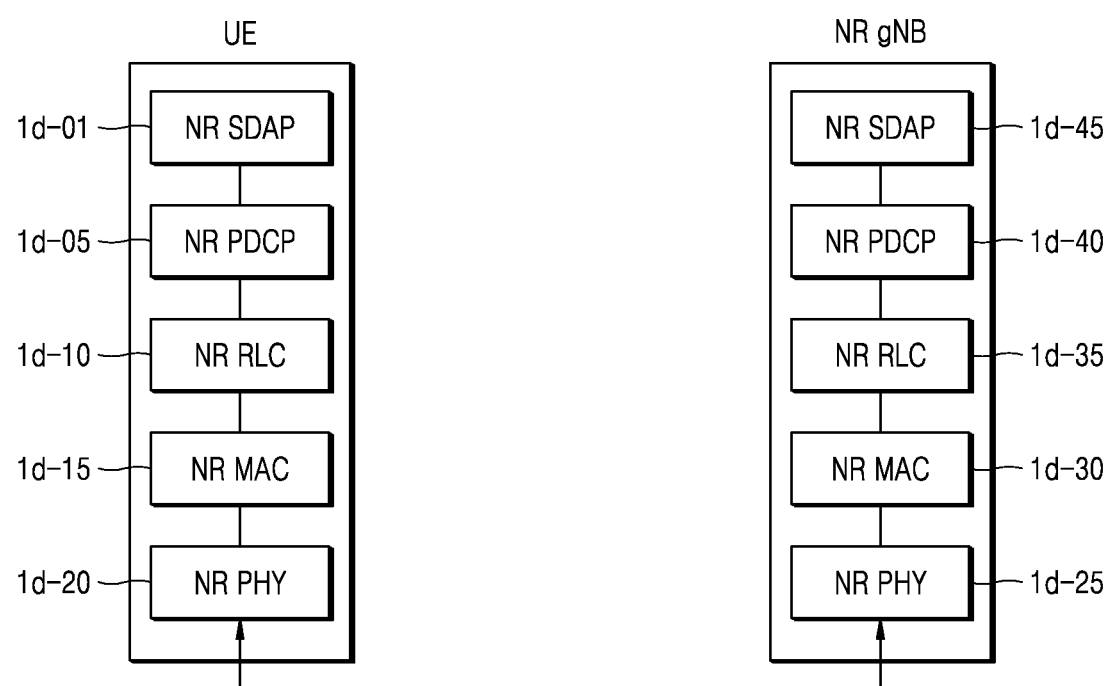
FIG. 1D illustrates a diagram of a radio protocol architecture of a next-generation mobile communication system, according to an embodiment of the disclosure.

FIG. 1D illustrates a diagram of a radio protocol architecture of a next-generation mobile communication system, according to an embodiment of the disclosure.

Referring to FIG. 1D, the radio protocol architecture of the next-generation mobile communication system may include NR service data adaptation protocol (SDAP) layers 1d-01 and 1d-45, NR PDCP layers 1d-05 and 1d-40, NR RLC layers 1d-10 and 1d-35, NR MAC layers 1d-15 and 1d-30, and NR PHY layers 1d-20 and 1d-25 respectively for a UE and an NR gNB.

Main functions of the NR SDAP layer 1d-01 or 1d-45 may include some of the following.
  Transfer of user plane data
  Mapping between a QoS flow and a data radio bearer (DRB) for both DL and UL
  Marking QoS flow identification (ID) in both DL and UL packets
  Reflective QoS flow to DRB mapping for the UL SDAP PDUs With regard to the NR SDAP layer 1d-01 or 1d-45, information about whether to use a header of the NR SDAP layer 1d-01 or to use functions of the NR SDAP layer 1d-01 may be configured for the UE by using a radio resource control (RRC) message per PDCP layer, per bearer, or per logical channel. When the SDAP header is configured, a 1-bit non access stratum (NAS) reflective QoS indicator and a 1-bit access stratum (AS) reflective QoS indicator of the SDAP header may be used to direct the UE to update or reconfigure UL and DL QoS flow and data bearer mapping information. The SDAP header may include QoS flow ID information indicating QoS. QoS information may be used as data processing priority information or scheduling information for appropriately supporting a service.
  Main functions of the NR PDCP layer 1d-05 or 1d-40 may include some of the following.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink In the aforementioned descriptions, the reordering function of the NR PDCP layer 1d-05 or 1d-40 may indicate a function of reordering PDCP PDUs received from a lower layer, on a PDCP sequence number (SN) basis. The reordering function of the NR PDCP layer 1d-05 or 1d-40 may include a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

Main functions of the NR RLC layer 1d-10 or 1d-35 may include at least some of the following.
  Transfer of upper layer PDUs
  In-sequence delivery of upper layer PDUs
  Out-of-sequence delivery of upper layer PDUs
  Error correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment In the above description, the in-sequence delivery function of the NR RLC layer 1d-10 or 1d-35 may indicate a function of delivering RLC SDUs received from a lower layer, to an upper layer in order. When a plurality of RLC SDUs segmented from one RLC SDU are received, the in-sequence delivery function of the NR RLC layer 1d-10 or 1d-35 may include a function of reassembling the RLC SDUs and delivering the reassembled RLC SDU.

The in-sequence delivery function of the NR RLC layer 1d-10 or 1d-35 may include at least one of a function of reordering received RLC PDUs on a RLC SN or PDCP SN basis, a function of recording missing RLC PDUs by reordering the received RLC PDUs, a function of reporting status information of the missing RLC PDUs to a transmitter, or a function of requesting to retransmit the missing RLC PDUs.

The in-sequence delivery function of the NR RLC layer 1d-10 or 1d-35 may include a function of delivering only RLC SDUs prior to a missing RLC SDU, to an upper layer in order when the missing RLC SDU exists.

The in-sequence delivery function of the NR RLC layer 1d-10 or 1d-35 may include a function of delivering all RLC SDUs received before a timer starts, to an upper layer in order when a certain timer expires, even when a missing RLC SDU exists.

The in-sequence delivery function of the NR RLC layer 1d-10 or 1d-35 may include a function of delivering all RLC SDUs received up to a current time, to an upper layer in order when a certain timer expires, even when a missing RLC SDU exists.

The NR RLC layer 1d-10 or 1d-35 may process the RLC PDUs in order of reception and may deliver the RLC PDUs to the NR PDCP layer 1d-05 or 1d-40 regardless of SNs (out-of-sequence delivery).

When a segment is received, the NR RLC layer 1d-10 or 1d-35 may reassemble the segment with other segments stored in a buffer or subsequently received, into a whole RLC PDU and may deliver the RLC PDU to the NR PDCP layer 1d-05 or 1d-40.

The NR RLC layer 1d-10 or 1d-35 may not have a concatenation function, and the concatenation function may be performed by the NR MAC layer 1d-15 and 1d-30 or be replaced with a multiplexing function of the NR MAC layer 1d-15 and 1d-30.

In the above description, the out-of-sequence delivery function of the NR RLC layer 1d-10 or 1d-35 may refer to a function of directly delivering RLC SDUs received from a lower layer, to an upper layer out of order. The out-of-sequence delivery function of the NR RLC layer 1d-10 or 1d-35 may include a function of reassembling a plurality of RLC SDUs segmented from one RLC SDU and delivering the reassembled RLC SDU when the segmented RLC SDUs are received. The out-of-sequence delivery function of the NR RLC layer 1d-10 or 1d-35 may include a function of recording missing RLC PDUs by storing RLC SNs or PDCP SNs of received RLC PDUs and reordering the received RLC PDUs.

The NR MAC layer 1*d*-15 and 1*d*-30 may be connected to a plurality of NR RLC layers configured for one UE, and main functions of the NR MAC layer 1*d*-15 and 1*d*-30 may include some of the following functions.

Mapping between logical channels and transport channels
    Multiplexing/demultiplexing of MAC SDUs
    Scheduling information reporting
    Error correction through HARQ
    Priority handling between logical channels of one UE
    Priority handling between UEs by means of dynamic scheduling
    MBMS service identification
    Transport format selection
    Padding An NR PHY layer 1*d*-20 and 1*d*-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 1E:
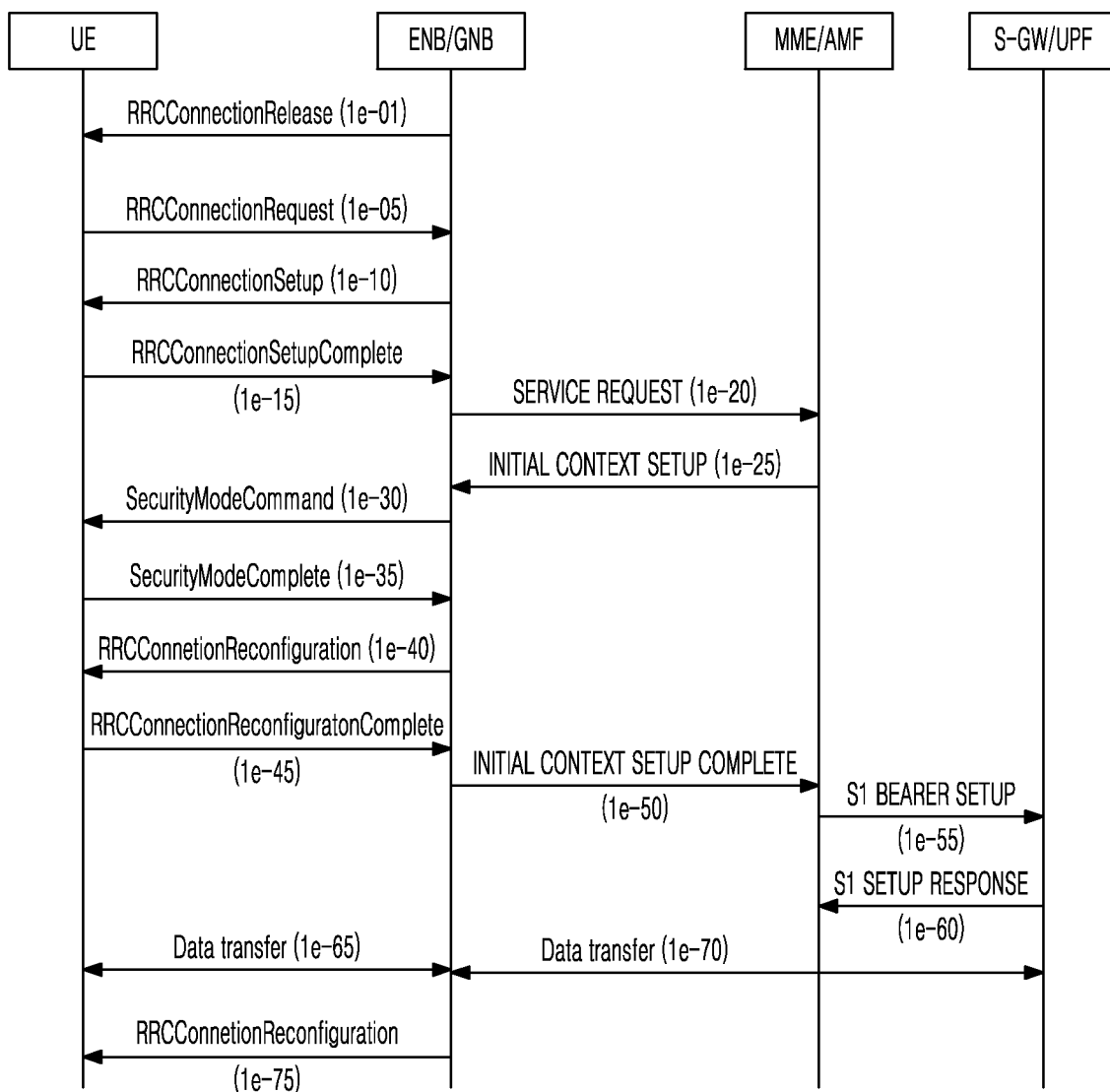
FIG. 1E illustrates a diagram for describing processes, performed by a user equipment (UE), of transiting from a radio resource control (RRC) connected mode to a RRC idle mode and transiting from the RRC idle mode to the RRC connected mode, according to a connection state between the UE and a base station (BS), according to an embodiment of the disclosure.

FIG. 1E illustrates a diagram for describing processes, performed by a UE, of transiting from a RRC connected mode to a RRC idle mode and transiting from the RRC idle mode to the RRC connected mode, according to a connection state between the UE and a BS including an eNB, a gNB, etc., according to an embodiment of the disclosure.

According to an embodiment of the disclosure, when the UE configured to transmit and receive data in the RRC connected mode does not transmit or receive data due to a predefined reason or for a predefined time, the BS may transmit a RRCConnectionRelease message to the UE so as to allow the UE to transit to the RRC idle mode (1*e*-01). Afterward, when the UE that is not currently configured for connection (hereinafter, also referred to as the idle-mode UE) has data to be transmitted or received, the UE may perform a RRC connection establishment process on the BS.

The UE may establish inverse direction transmission synchronization with the BS through a random access process, and may transmit an RRCConnectionRequest message to the BS (1*e*-05). The RRCConnectionRequest message may include an identifier of the UE, an establishment cause, or the like.

The BS may transmit an RRCConnectionSetup message to allow the UE to establish RRC connection (1*e*-10). The RRCConnectionSetup message may include RRC connection configuration information, or the like. The RRC connection may also be described as a signaling radio bearer (SRB), and may be used in transmitting and receiving a RRC message that is a control message between the UE and the BS.

The UE that set up the RRC connection may transmit an RRCConnetionSetupComplete message to the BS (1*e*-15). The RRCConnetionSetupCompletem message may include a control message of SERVICE REQUEST requesting, by the UE, an MME or an access mobility management function (AMF) for bearer setup for a certain service.

The BS may transmit the control message of SERVICE REQUEST included in the RRCConnetionSetupCompletem message to the MME or the AMF (1*e*-20), and the MME or the AMF may determine whether to provide the service requested by the UE.

As a result of the determination, when the MME or the AMF determines to provide the service requested by the UE, the MME or the AMF may transmit an INITIAL CONTEXT SETUP REQUEST message to the BS (1*e*-25). The INITIAL CONTEXT SETUP REQUEST message may include QoS information to be applied to configuration of a DRB, security information (e.g., a security key, a security algorithm, or the like) to be applied to the DRB, or the like.

The BS may exchange a SecurityModeCommand message (1*e*-30) and a SecurityModeComplete message (1*e*-35) with the UE so as to configure security.

When the configuration of the security is completed, the BS may transmit an RRCConnectionReconfiguration message to the UE (1*e*-40). The RRCConnectionReconfiguration message may include configuration information about a DRB to process user data, and the UE may configure the DRB by using the configuration information about the DRB and may transmit an RRCConnectionReconfigurationComplete message to the BS (1*e*-45).

After the BS completes the configuration of the DRB with the UE, the BS may transmit an INITIAL CONTEXT SETUP COMPLETE message to the MME or the AMF (1*e*-50), and upon reception of the message, the MME or the AMF exchanges a S1 BEARER SETUP message and a S1 BEARER SETUP RESPONSE message (1*e*-55 and 1*e*-60) with a S-GW or a User Plane Function (UPF) so as to configure a S1 bearer. The S1 bearer indicates connection for data transmission established between the S-GW or the UPF and the BS, and may correspond to the DRB on a one-to-one basis.

When the aforementioned processes are completed, the UE may transmit and receive data to/from the BS via the S-GW or the UPF (1*e*-65 and 1*e*-70). As described above, the general data transmission procedure may broadly consist of 3 steps that are RRC connection configuration, security configuration, and DRB configuration.

The BS may transmit an RRCConnectionReconfiguration message to newly allocate, add, or change configuration with respect to the UE, due to predefined causes (1*e*-75).

Figures 1, 1F:
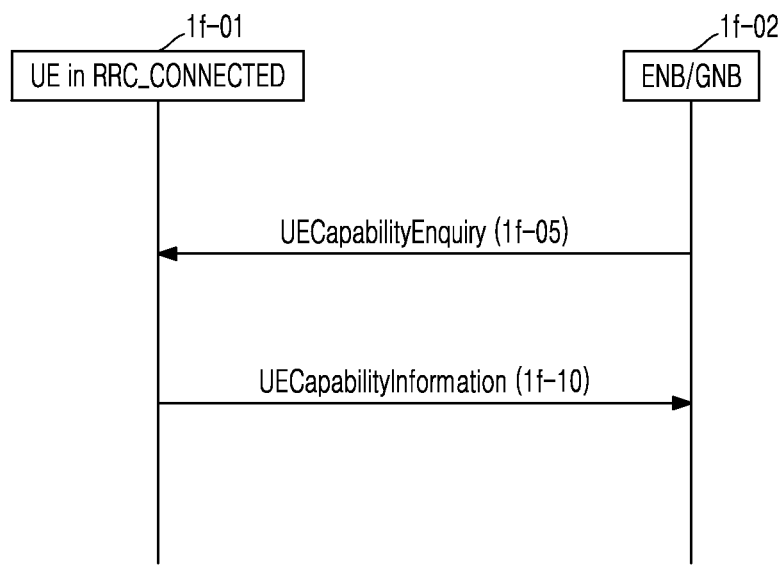
FIGS. 1F-1, 1F-2, and 1F-3 are diagrams for describing a procedure of transmitting and receiving UE radio access capability information between a BS and a UE in an RRC connected mode, according to an embodiment of the disclosure.
Figures 1, 1F, 2:
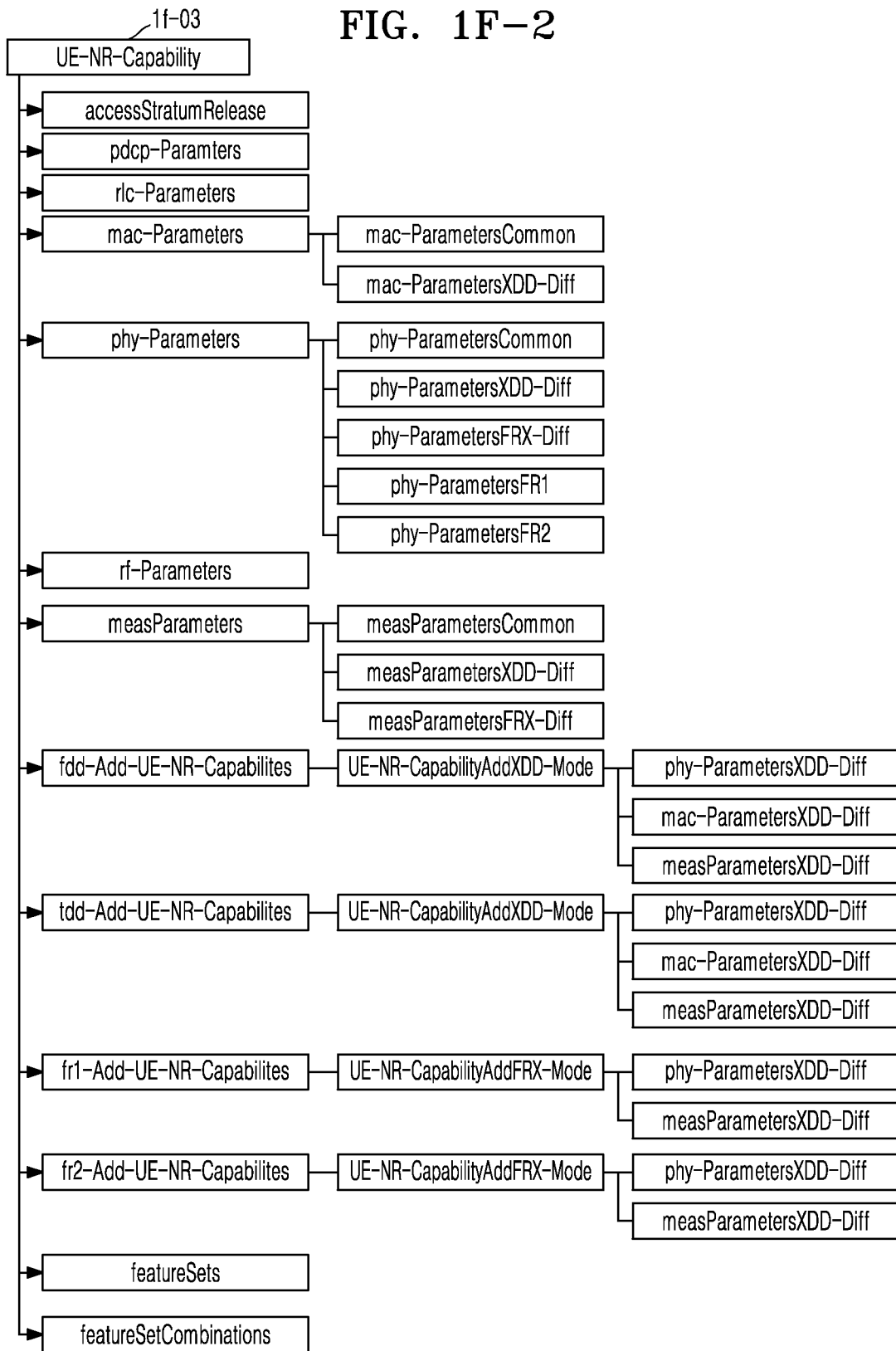
Figures 1, 1F, 2, 3:
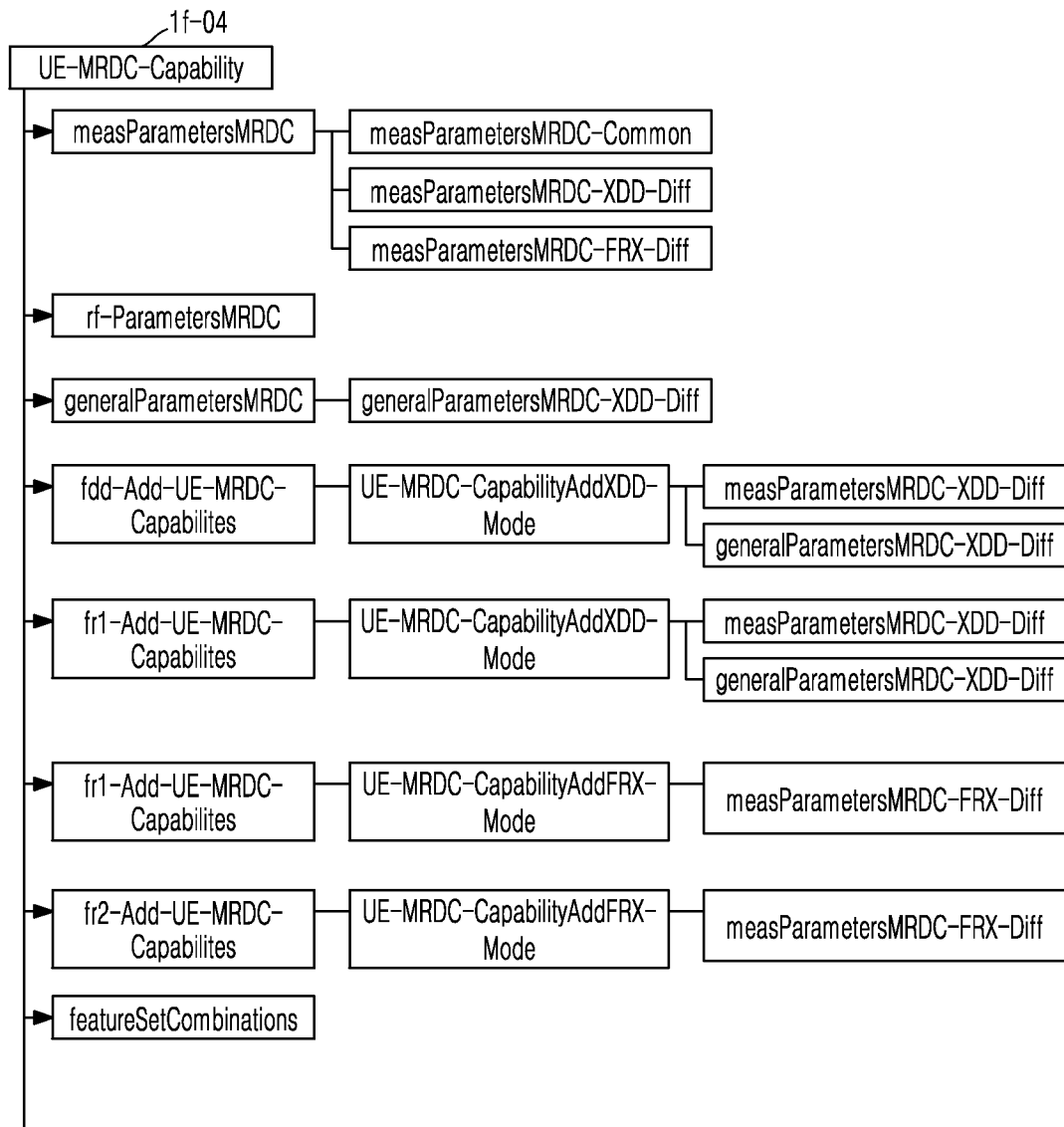

FIG. 1F-1 illustrates a diagram for describing a procedure of transmitting and receiving UE radio access capability information between a BS 1*f*-02 including an eNB, a gNB, etc. and a UE 1*f*-01 in an RRC connected mode, according to an embodiment of the disclosure.

According to an embodiment of the disclosure, when the UE radio access capability information is requested and/or the UE radio access capability information is additionally requested, the BS 1*f*-02 may transmit a UECapabilityEnquiry message to the UE 1*f*-01 in the RRC connected mode (1*f*-05). The UECapabilityEnquiry message may be transmitted when the BS 1*f*-02 requests the UE 1*f*-01 in the RRC connected mode not only for UE radio access capabilities (also referred to as UE capabilities) with respect to a NR but also for UE radio access capabilities with respect to Radio Access Technologies (RATs). Therefore, the UECapabilityEnquiry message may include a UE-CapabilityRAT-RequestList Information Element (IE) that is a UE capability request list with respect to one or more RATs, and UE-CapabilityRAT-Request requesting a UE capability with respect to each RAT may include information below.

rat-Type: A RAT type for which the network requests UE capabilities (The RAT type for which the network requests UE capabilities). For example, one of RAT-Types may be set as rat-Type, the RAT-Types including nr, eutra-nr, eutra, and Multi-Radio Dual Connectivity (MR-DC) excluding eutra-nr.
    capabilityRequestFilter: Information by which the network requests the UE to filter the UE capabilities (Information by which the network requests the UE to filter the UE capabilities). For example, when rat-Type is set to nr, capabilityRequestFilter may include information defined in UE-CapabilityRequestFilterNR (e.g., a value of frequencyBandlist or FreqBandList with respect to NR).

When the UE 1*f*-01 in the RRC connected mode receives the UECapabilityEnquiry message from the BS 1*f*-02, the UE 1*f*-01 may deliver UE radio access capabilities by transmitting a UECapabilityInformation message to the BS 1*f*-02 (1*f*-10). The UECapabilityInformation message may include a UE-CapabilityRAT-ContainerList IE that is a UE capability container list with respect to one or more RATs, and UE-CapabilityRAT-Container that is a UE capability container with respect to each RAT may include information below.

rat-Type: A RAT type that the UE 1*f*-01 in the RRC connected mode supports. For example, one of RAT-Types may be set as rat-Type, the RAT-Types including nr, eutra-nr, eutra, and MR-DC excluding eutra-nr. For example, according to a method of setting RAT-Type, when the UE 1*f*-01 supports NR from among RATs requested by the BS 1*f*-02 in 1*f*-05, RAT-Type may be set to nr.

ue-CapabilityRAT-Container: A container including UE capability information indicated by the rat-Type. For example, when the rat-Type is set to nr, ue-CapabilityRAT-Container may include information defined in UE-NR-Capability (NR UE Radio Access Capability Parameters).

In 1*f*-10, when the UE 1*f*-01 in the RRC connected mode transmits the UECapabilityInformation message to the BS 1*f*-02, the UE 1*f*-01 performs operations below.

1> When the UECapabilityEnquiry message received in 1*f*-05 includes nr, and the UE 1*f*-01 supports NR:

2> the UE 1*f*-01 may set rat-Type to nr, and may include UE-NR-Capability in ue-CapabilityRAT-Container. In this regard, according to an embodiment of the disclosure, a method, performed by the UE 1*f*-01, of including UE-NR-Capability may be one of following methods.

When the UE 1*f*-01 supports all of Frequency Division Duplex (FDD), Time Division Duplex (TDD), frequency range 1 (FR1) and frequency range 2 (FR2), the UE 1*f*-01 may set all fields of UE-NR-Capability, except for fdd-Add-UE-NR-Capabilities, tdd-Add-UE-NR-Capabilities, fr1-Add-UE-NR-Capabilities and fr2-Add-UE-NR-Capabilities, to include values applicable to FDD, TDD, FR1 and FR2 (Set all fields of UE-NR-Capability, except fdd-Add-UE-NR-Capabilities, tdd-Add-UE-NR-Capabilities, fr1-Add-UE-NR-Capabilities and fr2-Add-UE-NR-Capabilities, to include the values applicable for FDD. TDD, FR1 and FR2).

When some of fields of UE-NR-Capability have a different value for FDD and TDD (If (some of) the UE capability fields have a different value for FDD and TDD), in a case of FDD, when the UE 1*f*-01 has to support additional functions, compared to settings of previous fields of UE-NR-Capability (if for FDD, the UE supports additional functionality compared to what is indicated by the previous fields of UE-NR-Capability), the UE 1*f*-01 may include a fdd-Add-UE-NR-Capabilities field in UE-NR-Capability, and may set the fdd-Add-UE-NR-Capabilities field to include field values having reflected thereon other additional functions that are applicable to FDD (include field fdd-Add-UE-NR-Capabilities and set it to include fields reflecting the additional functionality applicable for FDD).

in a case of TDD, when the UE 1*f*-01 has to support additional functions, compared to settings of previous fields of UE-NR-Capability, the UE 1*f*-01 may include a tdd-Add-UE-NR-Capabilities field in UE-NR-Capability, and may set the tdd-Add-UE-NR-Capabilities field to include field values having reflected thereon other additional functions that are applicable to TDD.

When some of fields of UE-NR-Capability have a different value for FR1 and FR2, in a case of FR1, when the UE 1*f*-01 has to support additional functions, compared to settings of previous fields of UE-NR-Capability, the UE 1*f*-01 may include a fr1-Add-UE-NR-Capabilities field in UE-NR-Capability, and may set the fr1-Add-UE-NR-Capabilities field to include field values having reflected thereon other additional functions that are applicable to FR1. (include field fr1-Add-UE-NR-Capabilities and set it to include fields reflecting the additional functionality applicable for FR1).

a in a case of FR2, when the UE 1*f*-01 has to support additional functions, compared to settings of previous fields of UE-NR-Capability (if for FR2, the UE supports additional functionality compared to what is indicated by the previous fields of UE-NR-Capability), the UE 1*f*-01 may include a fr2-Add-UE-NR-Capabilities field in UE-NR-Capability, and may set the fr2-Add-UE-NR-Capabilities field to include field values having reflected thereon other additional functions that are applicable to FR2. (include field fr2-Add-UE-NR-Capabilities and set it to include fields reflecting the additional functionality applicable for FR2).

When the UE 1*f*-01 supports both FDD and TDD, and supports one of FR1 and FR2 (in the disclosure, FRx is used to indicate one of FR1 and FR2) (else if LE supports both FDD and TDD and single FRx), the UE 1*f*-01 may set all fields of UE-NR-Capability, except for fdd-Add-UE-NR-Capabilities, tdd-Add-UE-NR-Capabilities, fr1-Add-UE-NR-Capabilities and fr2-Add-UE-NR-Capabilities, to include values applicable to FDD, TDD, and FRx (Set all fields of UE-NR-Capability, except fdd-Add-UE-NR-Capabilities, tdd-Add-UE-NR-Capabilities, fr1-Add-UE-NR-Capabilities and fr2-Add-UE-NR-Capabilities to include the values applicable for FDD, TDD, FRx).

When some of fields of UE-NR-Capability have a different value for FDD and TDD (If (some of) the UE capability fields have a different value for FDD and TDD), in a case of FDD, when the UE 1*f*-01 has to support additional functions, compared to settings of previous fields of UE-NR-Capability (if for FDD, the LIE supports additional functionality compared to what is indicated by the previous fields of UE-NR-Capability), the UE 1*f*-01 may include a fdd-Add-UE-NR-Capabilities field in UE-NR-Capability, and may set the fdd-Add-UE-NR-Capabilities field to include field values having reflected thereon other additional functions that are applicable to FDD (include field fdd-Add-UE-NR-Capabilities and set it to include fields reflecting the additional functionality, applicable for FDD).

in a case of TDD, when the UE 1*f*-01 has to support additional functions, compared to settings of previous fields of UE-NR-Capability (if for TDD, the UE supports additional functionality compared to what is indicated by the previous fields of UE-NR-Capability), the UE 1f-01 may include a tdd-Add-UE-NR-Capabilities field in UE-NR-Capability, and may set the tdd-Add-UE-NR-Capabilities field to include field values having reflected thereon other additional functions that are applicable to TDD (include field tdd-Add-UE-NR-Capabilities and set it to include fields reflecting the additional functionality applicable for DD).

When the UE 1f-01 supports one of FDD and TDD (in the disclosure, xDD is used to indicate one of FDD and TDD), and supports both FR1 and FR2 (else if UE supports single xDD mode and both FR1 and FR2), the UE 1f-01 may set all fields of UE-NR-Capability, except for fdd-Add-UE-NR-Capabilities, tdd-Add-UE-NR-Capabilities, fr1-Add-UE-NR-Capabilities and fr2-Add-UE-NR-Capabilities, to include values applicable to xDD, FR1 and FR2 (Set all fields of UE-NR-Capability, except fdd-Add-UE-NR-Capabilities, tdd-Add-UE-NR-Capabilities, fr1-Add-UE-NR-Capabilities and fr2-Add-UE-NR-Capabilities, to include the values applicable for xDD, FR1 and FR2).

When some of fields of UE-NR-Capability have a different value for FR1 and FR2 (If (some of) the UE capability fields have a different value for FR1 and FR2), in a case of FR1, when the UE 1f-01 has to support additional functions, compared to settings of previous fields of UE-NR-Capability (if for FR1, the UE supports additional functionality compared to what is indicated by the previous fields of UE-NR-Capability), the UE 1f-01 may include a fr1-Add-UE-NR-Capabilities field in UE-NR-Capability, and may set the fr1-Add-UE-NR-Capabilities field to include field values having reflected thereon other additional functions that are applicable to FR1. (include field fr1-Add-UE-NR-Capabilities and set it to include fields reflecting the additional functionality applicable for FR1).

in a case of FR2, when the UE 1f-01 has to support additional functions, compared to settings of previous fields of UE-NR-Capability (if for FR2, the UE supports additional functionality compared to what is indicated by the previous fields of UE-NR-Capability), the UE 1f-01 may include a fr2-Add-UE-NR-Capabilities field in UE-NR-Capability, and may set the fr2-Add-UE-NR-Capabilities field to include field values having reflected thereon other additional functions that are applicable to FR2. (include field fr2-Add-UE-NR-Capabilities and set it to include fields reflecting the additional functionality applicable for FR2).

When the UE 1f-01 supports one of FDD and TDD, and supports one of FR1 and FR2 (else if UE supports single xDD mode and single FRx), the UE 1f-01 may set all fields of UE-NR-Capability, except for fdd-Add-UE-NR-Capabilities, tdd-Add-UE-NR-Capabilities, fr1-Add-UE-NR-Capabilities and fr2-Add-UE-NR-Capabilities, to include values applicable to xDD and FRx (Set all fields of UE-NR-Capability, except fdd-Add-UE-NR-Capabilities, tdd-Add-UE-NR-Capabilities, fr1-Add-UE-NR-Capabilities and fr2-Add-UE-NR-Capabilities, to include the values applicable for xDD, FRx).

2> The UE 1f-01 may include supported NR band combinations in supportedBandCombination.

1> When the UECapabilityEnquiry message received in 1f-05 includes eutra, and the UE 1f-01 supports E-UTRA:

2> the UE 1f-01 may set rat-Type to eutra, and may include UE-EUTRA-Capability in ue-CapabilityRAT-Container. In this regard, a method, performed by the UE 1f-01, of including UE-EUTRA-Capability may be determined according to "36.306: Evolved Universal Terrestrial Radio Access (E-UTRA): User Equipment (UE) radio access capabilities".

1> When the UECapabilityEnquiry message received in 1f-05 includes one of MR-DC, except for eutra-nr or eutra-nr, and the UE 1f-01 supports indicated MR-DC:

2> the UE 1f-01 may set rat-Type to one of MR-DC, except for eutra-nr or eutra-nr, and may include UE-MRDC-Capability in ue-CapabilityRAT-Container. In this regard, according to an embodiment of the disclosure, a method, performed by the UE 1f-01, of including UE-MRDC-Capability may be one of following methods.

When the UE 1f-01 supports all of FDD, TDD, FR1 and FR2, the UE 1f-01 may set all fields of UE-MRDC-Capability, except for fdd-Add-UE-MRDC-Capabilities, tdd-Add-UE-MRDC-Capabilities, fr1-Add-UE-MRDC-Capabilities and fr2-Add-UE-MRDC-Capabilities, to include values applicable to FDD, TDD, FR1 and FR2 (Set all fields of UE-MRDC-Capability, except fdd-Add-UE-MRDC-(Capabilities, tdd-Add-UE-MRDC-Capabilities, fr1-Add-UE-MRDC-Capabilities and fr2-Add-UE-MRDC-Capabilities, to include the values applicable for FDD, TDD, FR1 and FR2).

When some of fields of UE-MRDC-Capability have a different value for FDD and TDD (If (some of) the UE capability fields have a different value for FDD and TDD), in a case of FDD, when the UE 1f-01 has to support additional functions, compared to settings of previous fields of UE-MDRC-Capability (if for FDD, the UE supports additional functionality compared to what is indicated by the previous fields of UE-MRDC-Capability), the UE 1f-01 may include a fdd-Add-UE-MRDC-Capabilities field in UE-MRDC-Capability, and may set the fdd-Add-UE-MRDC-Capabilities field to include field values having reflected thereon other additional functions that are applicable to FDD (include field fdd-Add-UE-MRDC-Capabilities and set it to include fields reflecting the additional functionality applicable for FDD).

in a case of TDD, when the UE 1f-01 has to support additional functions, compared to settings of previous fields of UE-MRDC-Capability (if for TDD, the UE supports additional functionality compared to what is indicated by the previous fields of UE-MRDC-Capability), the UE 1f-01 may include a tdd-Add-UE-MRDC-Capabilities field in UE-MRDC-Capability, and may set the tdd-Add-UE-MRDC-Capabilities field to include field values having reflected thereon other additional functions that are applicable to TDD (include field tdd-Add-UE-MRDC-Capabilities and set it to include fields reflecting the additional functionality applicable for TDD).

When some of fields of UE-MRDC-Capability have a different value for FR1 and FR2 (If (some of) the UE capability fields have a different value for FR1 and FR2), in a case of FR1, when the UE 1f-01 has to support additional functions, compared to settings of previous fields of UE-MRDC-Capability (if for FR1, the UE supports additional functionality compared to what is indicated by the previous fields of UE-MRDC-Capability), the UE 1f-01 may include a fr1-Add-UE-MRDC-Capabilities field in UE-MRDC-Capability, and may set the fr1-Add-UE-MRDC-Capabilities field to include field values having reflected thereon other additional functions that are applicable to FR1. (include field fr1-Add-UE-MRDC-Capabilities and set it to include fields reflecting the additional functionality applicable for FR1).

in a case of FR2, when the UE 1f-01 has to support additional functions, compared to settings of previous fields of UE-MRDC-Capability (if for FR2, the UE supports additional functionality compared to what is indicated by the previous fields of UE-MRDC-Capability), the UE 1f-01 may include a fr2-Add-UE-MRDC-Capabilities field in UE-MRDC-Capability, and may set the fr2-Add-UE-MRDC-Capabilities field to include field values having reflected thereon other additional functions that are applicable to FR2. (include field fr2-Add-UE-MRDC-Capabilities and set it to include fields reflecting the additional functionality applicable for FR2).

When the UE 1f-01 supports both FDD and TDD, and supports one of FR1 and FR2 (in the disclosure, FRx is used to indicate one of FR1 and FR2) (else if UE supports both FDD and TDD and single FRx), the UE 1f-01 may set all fields of UE-MRDC-Capability, except for fdd-Add-UE-MRDC-Capabilities, tdd-Add-UE-MRDC-Capabilities, fr1-Add-UE-MRDC-Capabilities and fr2-Add-UE-MRDC-Capabilities, to include values applicable to FDD, TDD, and FRx (Set all fields of UE-MRDC-Capability, except fdd-Add-UE-MRDC-Capabilities, tdd-Add-UE-MRDC-Capabilities, fr1-Add-UE-MRDC-Capabilities and fr2-Add-UE-MRDC-Capabilities to include the values applicable for FDD, TDD, FRx).

When some of fields of UE-MRDC-Capability have a different value for FDD and TDD (If (some of) the UE capability fields have a different value for FDD and TDD), in a case of FDD, when the UE 1f-01 has to support additional functions, compared to settings of previous fields of UE-MRDC-Capability (if for FDD, the UE supports additional functionality compared to what is indicated by the previous fields of UE-MRDC-Capability), the UE 1f-01 may include a fdd-Add-UE-MRDC-Capabilities field in UE-MRDC-Capability, and may set the fdd-Add-UE-MRDC-Capabilities field to include field values having reflected thereon other additional functions that are applicable to FDD (include field fdd-Add-UE-MRDC-Capabilities and set it to include fields reflecting the additional functionality applicable for FDD).

in a case of TDD, when the UE 1f-01 has to support additional functions, compared to settings of previous fields of UE-MRDC-Capability (if for TDD, the UE supports additional functionality compared to what is indicated by the previous fields of UE-MRDC-Capability), the UE 1f-01 may include a tdd-Add-UE-MRDC-Capabilities field in UE-MRDC-Capability, and may set the tdd-Add-UE-MRDC-Capabilities field to include field values having reflected thereon other additional functions that are applicable to TDD (include field tdd-Add-UE-MRDC-Capabilities and set it to include fields reflecting the additional functionality applicable for TDD).

When the UE 1f-01 supports one of FDD and TDD (in the disclosure, xDD is used to indicate one of FDD and TDD), and supports both FR1 and FR2 (else if UE supports single xDD mode and both FR1 and FR2), the UE 1f-01 may set all fields of UE-MRDC-Capability, except for fdd-Add-UE-MRDC-Capabilities, tdd-Add-UE-MRDC-Capabilities, fr1-Add-UE-MRDC-Capabilities and fr2-Add-UE-MRDC-Capabilities, to include the values applicable to xDD, FR1 and FR2 (Set all fields of UE-MRDC-Capability, except fdd-Add-UE-MRDC-Capabilities, tdd-Add-UE-MRDC-Capabilities, fr1-Add-UE-MRDC-Capabilities and fr2-Add-UE-MRDC-Capabilities, to include the values applicable for xDD, FR1 and FR2).

When some of fields of UE-MRDC-Capability have a different value for FR1 and FR2 (If (some of) the UE capability fields have a different value for FR1 and FR2), in a case of FR1, when the UE 1f-01 has to support additional functions, compared to settings of previous fields of UE-MRDC-Capability (if for FR1, the UE supports additional functionality compared to what is indicated by the previous fields of UE-MRDC-Capability), the UE 1f-01 may include a fr1-Add-UE-MRDC-Capabilities field in UE-MRDC-Capability, and may set the fr1-Add-UE-MRDC-Capabilities field to include field values having reflected thereon other additional functions that are applicable to FR1. (include field fr1-Add-UE-MRDC-Capabilities and set it to include fields reflecting the additional functionality applicable for FR1).

in a case of FR2, when the UE 1f-01 has to support additional functions, compared to settings of previous fields of UE-MRDC-Capability (if for FR2, the UE supports additional functionality compared to what is indicated by the previous fields of U E-MRDC-Capability), the UE 1f-01 may include a fr2-Add-UE-MRDC-Capabilities field in UE-MRDC-Capability, and may set the fr2-Add-UE-MRDC-Capabilities field to include field values having reflected thereon other additional functions that are applicable to FR2. (include field fr2-Add-UE-MRDC-Capabilities and set it to include fields reflecting the additional functionality applicable for FR2).

When the UE 1f-01 supports one of FDD and TDD, and supports one of FR1 and FR2 (else if UE supports single xDD mode and single FRx), the UE 1f-0l may set all fields of UE-MRDC-Capability, except for fdd-Add-UE-MRDC-Capabilities, tdd-Add-UE-MRDC-Capabilities, fr1-Add-UE-MRDC-Capabilities and fr2-Add-UE-MRDC-Capabilities, to include values applicable to xDD and FRx (Set all fields of IE-MRDC-Capability, except fdd-Add-UE-MRDC-Capabilities, tdd-Add-UE-MRDC-Capabilities, fr1-Add-UE-MRDC-Capabilities and fr2-Add-UE-MRDC-Capabilities, to include the values applicable for xDD, FRx).

2> The UE 1f-01 may include supported MRDC band combinations in supportedBandCombination.

1> The UE 1f-01 transmits the UECapabilityInformation message to lower layers to transmit the UECapabilityInformation message.

UE-NR-Capability described above is illustrated as 1f-03 in FIG. 1F-2, UE-MRDC-Capability described above is illustrated as 1f-04 in FIG. 1F-3, and information about all parameters may be referenced in "38.331: Radio Resource Control (RRC) protocol specification" that is the 3GPP standard specification. In an embodiment of the disclosure, a process of transmitting the UECapabilityInformation message may be summarized below.

UE-NR/MRDC-Capability and xxx-Add-UE-NR/MRDC-Capabilities may respectively indicate UE-NR-Capability and/or UE-MRDC-Capability and xxx-Add-UE-NR-Capabilities and/or xxx-Add-UE-MRDC-Capabilities. (UE-NR/MRDC-Capability and xxx-Add-UE-NR/MRDC-Capabilities means UE-NR-Capability and/or UE-MRDC-Capability and xxx-Add-UE-NR-Capabilities and/or xxx-Add-UE-MRDC-Capabilities respectively.)

- 1> When the UE 1f-01 supports all of FDD, TDD, FR1, and FR2 (If UE supports both FDD and TDD and both FR1 and FR2):
  - 2> the UE 1f-01 may set all fields of UE-NR/MRDC-Capability, except for fdd-Add-UE-NR/MRDC-Capabilities, tdd-Add-UE-NR/MRDC-Capabilities, fr1-Add-UE-NR/MRDC-Capabilities and fr2-Add-UE-NR/MRDC-Capabilities, to include values applicable to FDD, TDD, FR1 and FR2 (Set all fields of UE-NR/MRDC-Capability except fdd-Add-UE-NR/MRDC-Capabilities, tdd-Add-UE-NR/MRDC-Capabilities, fr1-Add-UE-NR/MRDC-Capabilities and fr2-Add-UE-NR/MRDC-Capabilities, to include the values applicable for FDD, TDD, FR1 and FR2);
  - 2> When UE capability fields have a different value for FDD and TDD (If (some of) the UE capability fields have a different value for FDD and TDD):
    - 3> in a case of FDD, when the UE 1f-01 supports additional functions, compared to settings of previous fields of UE-NR/MRDC-Capability (if for FDD, the UE supports additional functionality compared to what is indicated by the previous fields of UE-NR/MRDC-Capability):
      - 4> the UE 1f-01 may include a fdd-Add-UE-NR/MRDC-Capabilities field, and may set the fdd-Add-UE-NR/MRDC-Capabilities field to include field values having reflected thereon other additional functions that are applicable to FDD (include field fdd-Add-UE-NR/MRDC-Capabilities and set it to include fields reflecting the additional functionality applicable for FDD);
    - 3> in a case of TDD, when the UE 1f-01 supports additional functions, compared to settings of previous fields of UE-NR/MRDC-Capability (if for TDD, the UE supports additional functionality compared to what is indicated by the previous fields of U E-NR/MRDC-Capability):
      - 4> the UE 1f-01 may include a tdd-Add-UE-NR/MRDC-Capabilities field, and may set the tdd-Add-UE-NR/MRDC-Capabilities field to include field values having reflected thereon other additional functions that are applicable to TDD (include field tdd-Add-UE-NR/MRDC-Capabilities and set it to include fields reflecting the additional functionality applicable for TDD);
  - 2> When UE capability fields have a different value for FR1 and FR2 (If (some of) the UE capability fields have a different value for FR1 and FR2):
    - 3> in a case of FR1, when the UE 1f-01 supports additional functions, compared to settings of previous fields of UE-NR/MRDC-Capability (if for FR1, the UE supports additional functionality compared to what is indicated by the previous fields of UE-NR/MRDC-Capability):
      - 4> the UE 1f-01 may include a fr1-Add-UE-NR/MRDC-Capabilities field, and may set the fr1-Add-UE-NR/MRDC-Capabilities field to include field values having reflected thereon other additional functions that are applicable to FR1 (include field fr1-Add-UE-NR/MRDC-Capabilities and set it to include fields reflecting the additional functionality applicable for FR1);
    - 3> in a case of FR2, when the UE 1f-01 supports additional functions, compared to settings of previous fields of UE-NR/MRDC-Capability (1f for FR2, the UE supports additional functionality compared to what is indicated by the previous fields of UE-NR/MRDC-Capability):
      - 4> the UE 1f-01 may include a fr2-Add-UE-NR/MRDC-Capabilities field, and may set the fr2-Add-UE-NR/MRDC-Capabilities field to include field values having reflected thereon other additional functions that are applicable to FR2 (include field fr2-Add-UE-NR/MRDC-Capabilities and set it to include fields reflecting the additional functionality applicable for FR2);
- 1> When the UE 1f-01 supports both FDD and TDD, and supports single FRx
  (If UE Supports Both FDD and TDD and Single FRx):
  - 2> the UE 1f-01 may set all fields of UE-NR/MRDC-Capability, except for fdd-Add-UE-NR/MRDC-Capabilities, tdd-Add-UE-NR/MRDC-Capabilities, fr1-Add-UE-NR/MRDC-Capabilities and fr2-Add-UE-NR/MRDC-Capabilities, to include values applicable to FDD, TDD and FRx (Set all fields of UE-NR/MRDC-Capability except fdd-Add-U E-NR MRDC-Capabilities, tdd-Add-UE-NR/MRDC-(Capabilities, fr1-Add-UE-NR/MRDC-Capabilities and fr2-Add-UE-NR/MRDC-Capabilities, to include the values applicable for FDD, TDD and FRx);
  - 2> When UE capability fields have a different value for FDD and TDD (If (some of) the UE capability fields have a different value for FDD and TDD):
    - 3> in a case of FDD, when the UE 1f-01 supports additional functions, compared to settings of previous fields of UE-NR/MRDC-Capability (if for FDD, the UE supports additional functionality compared to what is indicated by the previous fields of UE-NR/MRDC-Capability):
      - 4> the UE 1f-01 may include a fdd-Add-UE-NR/MRDC-Capabilities field, and may set the fdd-Add-UE-NR/MRDC-Capabilities field to include field values having reflected thereon other additional functions that are applicable to FDD (include field fdd-Add-UE-NR/MRDC-Capabilities and set it to include fields reflecting the additional functionality applicable for FDD);
    - 3> in a case of TDD, when the UE 1f-01 supports additional functions, compared to settings of previous fields of UE-NR/MRDC-Capability (if for TDD, the UE supports additional functionality compared to what is indicated by the previous fields of UE-NR/MRDC-Capability):
      - 4> the UE 1f-01 may include a tdd-Add-UE-NR/MRDC-Capabilities field, and may set the tdd-Add-UE-NR/MRDC-Capabilities field to include field values having reflected thereon other additional functions that are applicable to TDD (include field tdd-Add-UE-NR/MRDC-Capabilities and set it to include fields reflecting the additionalfunctionality applicable for TDD);

1> When the UE 1f-01 supports a single xDD mode, and supports both FR1 and FR2
(If UE supports single xDD mode and both FR1 and FR2):
2> the UE 1f-01 may set all fields of UE-NR/MRDC-Capability, except for fdd-Add-UE-NR/MRDC-Capabilities, tdd-Add-UE-NR/MRDC-Capabilities, fr1-Add-UE-NR/MRDC-Capabilities and fr2-Add-UE-NR/MRDC-Capabilities, to include values applicable to the xDD mode, FR1 and FR2 (Set all fields of UE-NR/MRDC-Capability except fdd-Add-UE-NR/MRDC-Capabilities, tdd-Add-UE-NR/MRDC-Capabilities, fr1-Add-UE-NR/MRDC-Capabilities and fr2-Add-UE-NR/MRDC-Capabilities, to include the values applicable for xDD mode, FR1 and FR2);
2> When UE capability fields have a different value for FR1 and FR2 (If (some of) the UE capability fields have a different value for FR1 and FR2):
3> in a case of FR1, when the UE 1f-01 supports additional functions, compared to settings of previous fields of UE-NR/MRDC-Capability (if for FR1, the UE supports additional functionality compared to what is indicated by the previous fields of UE-NR/MRDC-Capability):
4> the UE 1f-01 may include a fr1-Add-UE-NR/MRDC-Capabilities field, and may set the fr1-Add-UE-NR/MRDC-Capabilities field to include field values having reflected thereon other additional functions that are applicable to FR1 (include field fr1-Add-UE-NR/MRDC-Capabilities and set it to include fields reflecting the additional functionality applicable for FR1);
3> in a case of FR2, when the UE 1f-01 supports additional functions, compared to settings of previous fields of UE-NR/MRDC-Capability (if for FR2, the UE supports additional functionality compared to what is indicated by the previous fields of UE-NR/MRDC-Capability):
4> the UE 1f-01 may include a fr2-Add-UE-NR/MRDC-Capabilities field, and may set the fr2-Add-UE-NR/MRDC-Capabilities field to include field values having reflected thereon other additional functions that are applicable to FR2 (include field fr2-Add-UE-NR/MRDC-Capabilities and set it to include fields reflecting the additional functionality applicable for FR2);
1> When the UE 1f-01 supports a single xDD mode, and supports single FRx
(If UE Supports Single xDD Mode and Single FRx):
2> the UE 1f-01 may set all fields of UE-NR/MRDC-Capability, except for fdd-Add-UE-NR/MRDC-Capabilities, tdd-Add-UE-NR/MRDC-Capabilities, fr1-Add-UE-NR/MRDC-Capabilities and fr2-Add-UE-NR/MRDC-Capabilities, to include values applicable to the xDD mode and FRx (Set all fields of UE-NR/MRDC-Capability except fdd-Add-UE-NR/MRDC-Capabilities, tdd-Add-UE-NR/MRDC-Capabilities, fr1-Add-UE-NR/MRDC-Capabilities and fr2-Add-UE-NR/MRDC-Capabilities, to include the values applicable for xDD mode and FRx).

Figure 2A:
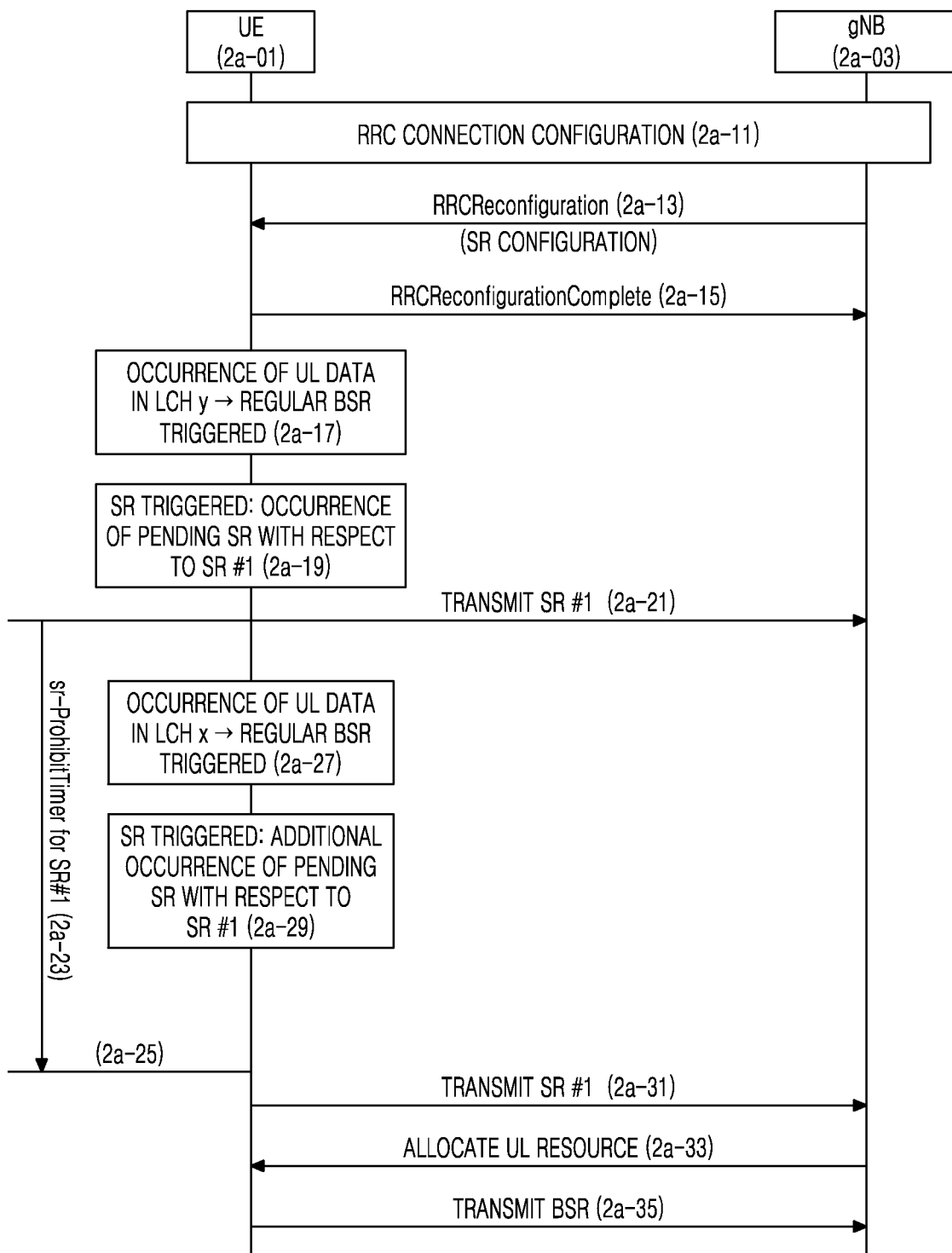
FIG. 2A illustrates a diagram of an example of a flow of messages between a UE and a BS when a method of transmitting a scheduling request is used, according to an embodiment of the disclosure.

FIG. 2A illustrates a diagram for describing a method of transmitting and receiving messages between a UE 2a-01 and a gNB 2a-03 so as to transmit a scheduling request, according to an embodiment of the disclosure.

Referring to FIG. 2A, the UE 2a-01 in an idle mode (RRC_IDLE) may perform access to the gNB 2a-03 due to occurrence of data to be transmitted (2a-11). The idle mode refers to a state in which the UE 2a-01 is not connected to a network so as to save power of the UE 2a-01 and thus is not able to transmit data. For data transmission, it is necessary for the UE 2a-01 to transit to a connected mode (RRC_CONNECTED). When the UE 2a-01 succeeds in a process of accessing the gNB 2a-03, the UE 2a-01 transits to the connected mode (RRC_CONNECTED). The UE 2a-01 in the connected mode may be enabled to transmit and receive data to and from the gNB 2a-03 by performing security activation and bearer configuration for data to be described below.

Afterward, the gNB 2a-03 may configure a radio bearer for data transmission (Data Radio Bearer (DRB)), and may transmit a SR resource and related configuration information for requesting a UL resource (2a-13). The DRB indicates a logical channel/path via which wireless data is transmitted. For example, each of data packets is transmitted while each logical channel identifier that is mapped to each DRB is marked on a subheader of a MAC layer, such that the UE 2a-01 may identify to which logical channel/path a corresponding packet belongs. Also, as described above, the SR resource is information to be transmitted through PUCCH, and the gNB 2a-03 may set a plurality of periodic SR resources to the UE 2a-01. In a present embodiment of the disclosure, a regular buffer status report (regular BSR) triggers an SR, and an SR to be transmitted may be determined based on contents (LCH) reported in the regular BSR. Accordingly, when each SR is configured, a particular logical channel(s) may also be configured together with each SR.

The UE 2a-01 may trigger a current BSR of the UE 2a-01, according to various conditions below, and a BSR may be classified based on the conditions for triggering transmission.

Type 1: Regular BSR

This BSR is transmitted in a case where a BSR retransmission timer (retxBSR-Timer) expires, when the UE 2a-01 has data that is transmittable with respect to certain logical channel/radio bearer (RB) that belong to a Logical Channel Group (LCG).

This BSR is transmitted, when data to be transmitted with respect to a certain logical channel/RB belonging to the LCG is generated in an upper layer (a RLC layer or a PDCP layer) and the data has a highest priority over a logical channel/RB belonging to any LCG.

This BSR is transmitted, when data to be transmitted with respect to a certain logical channel/RB belonging to the LCG is generated in an upper layer (a RLC layer or a PDCP layer), and except for the data, any LCG does not have data.

Type 2: Periodic BSR

This BSR is transmitted when a periodic BSR-Timer configured to the UE 2a-01 expires.

Type 3: Padding BSR

This BSR is transmitted when, after a UL resource is allocated, a padding bit to fill an unused space occurred after transmission of data is equal to or greater than a sum value of a size of a BSR MAC control element (CE) and a subheader size of the BSR MAC CE.

When a packet exists in buffers of a plurality of the LCGs, a truncated BSR is transmitted.

As described above, when the regular BSR is generated according to the aforementioned condition, the UE 2a-01 may trigger transmission of an SR through a first SR resource and then may transmit the SR. Accordingly, in a present embodiment of the disclosure, when the regular BSR is triggered through an LCH and SR configuration mapped to the LCH is present, the UE 2a-01 triggers the SR. When the SR is triggered, the SR may be considered to be pending until the SR is cancelled. The SR may be cancelled when a BSR MAC CE (that is a control message of a MAC layer)

including all buffer statuses where a BSR that triggered the SR is triggered is transmitted to the gNB 2*a*-03. The BSR MAC CE is the control message of the MAC layer, and the UE 2*a*-01 reports, by using the BSR MAC CE, a buffer status including data to be transmitted to the gNB 2*a*-03 via a UL. For example, it is possible to assume a scenario in which the gNB 2*a*-03 configures three SRs to the UE 2*a*-01, and SR #1 is mapped to LCH x and LCH y, and SR #2 is mapped to LCH z. In a case where it is assumed that LCHs x, y, and z respectively have first, second, and third priorities, when traffic exists only in LCH z in a buffer (and then data occurs in LCH y, a regular BSR is triggered due to LCH y, and thus SR #1 may be triggered.

A RRC configuration message may include information about at least one of a time/a frequency/a code/numerology (subcarrier spacing)/a transmit time interval (TTI) length for SR transmission according to each SR resource, and information about LCH mapped to each SR resource.

The gNB 2*a*-03 may transmit various measurement configurations to the UE 2*a*-01 by using an RRCReconfiguration message of an RRC layer. Afterward, the UE 2*a*-01 transmits an acknowledgement message with respect to the configurations (2*a*-15), and to this end, an RRCReconfigurationComplete message of the RRC layer may be used.

As described above, it is possible to assume the scenario in which the gNB 2*a*-03 configures three SRs to the UE 2*a*-01, and SR #1 is mapped to LCH x and LCH y, and SR #2 is mapped to LCH z. In this regard, it is assumed that LCHs x, y, and z respectively have first, second, and third priorities.

Afterward, when traffic exists only in LCH z in the buffer and then data occurs in LCH y, a regular BSR is triggered due to LCH y (2*a*-17), and thus pending SR with respect to SR #1 may occur (2*a*-19).

Accordingly, when each sr-ProhibitTimer set to each SR configuration is not running according to each SR configuration associated with pending SR(s), the UE 2*a*-01 may transmit a SR to the gNB 2*a*-03 through a PUCCH resource configured to each SR configuration (2*a*-21), and may start a sr-ProhibitTimer set to a corresponding SR configuration. When an SR associated with pending SR does not exist, the UE 2*a*-01 may perform a random access to directly transmit a preamble to the gNB 2*a*-03.

In the aforementioned example, afterward, when data is newly generated in LCH x, a regular BSR is triggered due to LCH x (2*a*-27), and thus pending SR with respect to SR #1 may additionally occur (2*a*-29). That is, two pending SRs may exist with respect to SR #1.

However, because the sr-ProhibitTimer is already running with respect to SR #1, the UE 2*a*-01 may not transmit a SR until the sr-ProhibitTimer with respect to SR #1 expires (2*a*-25).

The UE 2*a*-01 examines conditions below for each SR configuration. That is, in the present embodiment of the disclosure, two pending SRs belong to one SR #1, and thus, the UE 2*a*-01 may perform operations below only once, not twice.

- A case in which the UE 2*a*-01 is checking whether a PUCCH resource exists in corresponding SR configuration.
- A case in which a sr-ProhibitTimer set to the corresponding SR configuration is not running.
- A case in which the PUCCH resource of the SR configuration does not overlap with a measurement gap for measurement of neighboring cells.
- A case in which the PUCCH resource of the SR configuration does not overlap with a resource for data transmission.

When the aforementioned cases are all satisfied, the UE 2*a*-01 may increase SR_COUNTER by 1, may indicate a physical layer to transmit the PUCCH resource and thus may transmit a SR (2*a*-31), and then may restart sr-ProhibitTimer.

Afterward, when a UL resource is allocated from the gNB 2*a*-03 (2*a*-33), the UE 2*a*-01 may transmit a BSR MAC CE through the corresponding resource (2*a*-35). When the BSR MAC CE includes all buffer statuses at a time when a second regular BSR is triggered, the UE 2*a*-01 may cancel all of two pending SRs. However, when the BSR MAC CE includes only a buffer status at a time when a first regular BSR is triggered, the UE 2*a*-01 may cancel only SR #1 and may not cancel SR #2 and make SR #2 pending. By doing so, when sr-ProhibitTimer expires thereafter, the UE 2*a*-01 may additionally transmit a SR.

Figure 2B:
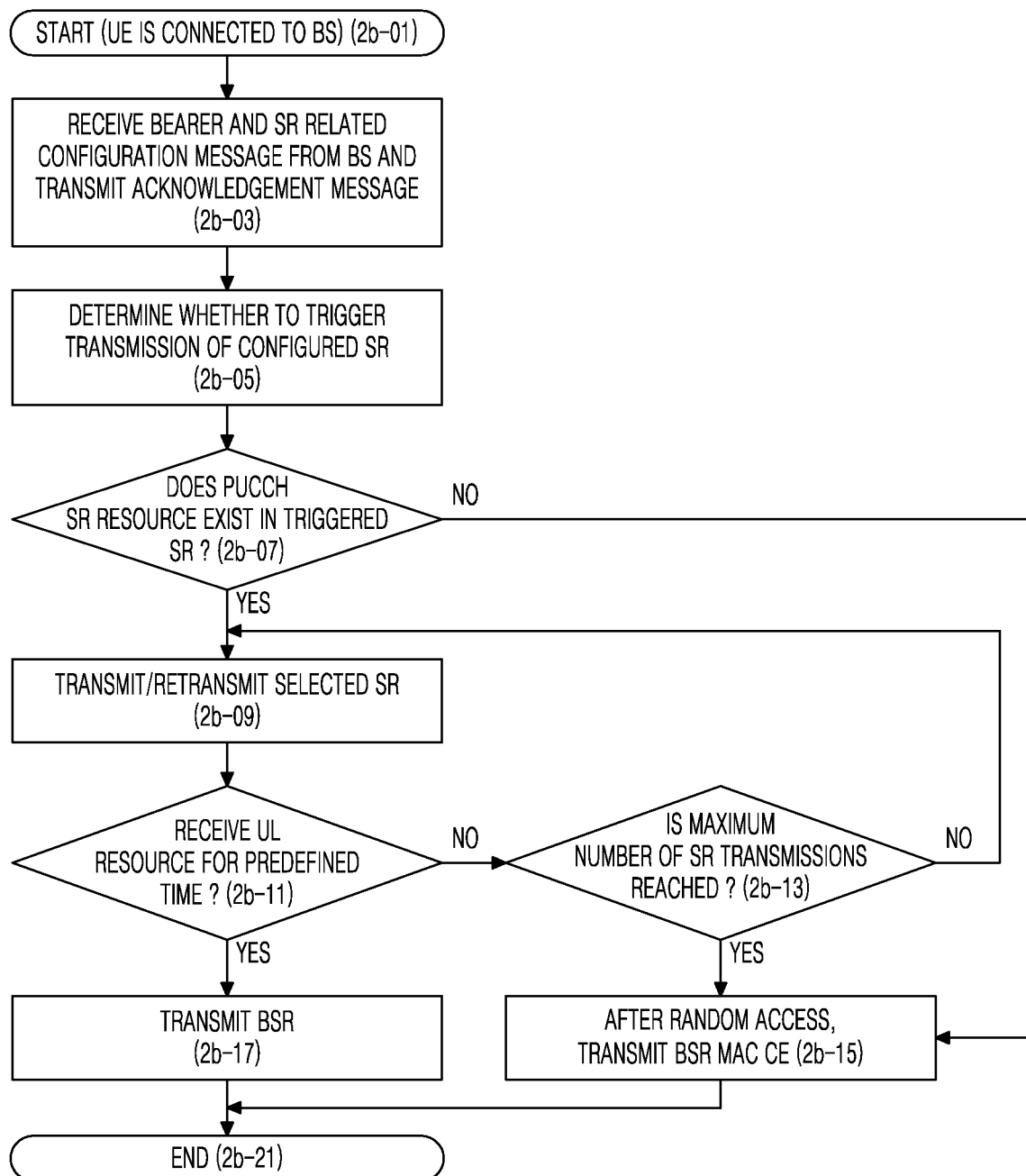
FIG. 2B illustrates a flowchart of an example of an order of operations of a UE when a method of transmitting a scheduling request is used, according to an embodiment of the disclosure.

FIG. 2B illustrates a flowchart for describing operations of a UE when transmitting a scheduling request, according to an embodiment of the disclosure.

In FIG. 2B, it is assumed that the UE is connected to a LTE BS and thus is in a RRC_CONNECTED state (2*b*-01). Afterward, the UE may be configured for a DRB from the BS, may be configured for a SR resource and related configuration information for requesting a UL resource from the BS, and may transmit an acknowledgement message, in response to the configuration (2*b*-03).

As described above, the UE may trigger a current BSR of the UE, according to various conditions below, and a BSR may be classified based on the conditions for triggering transmission.

Type 1: Regular BSR

Condition 1: This BSR is transmitted in a case where a BSR retransmission timer (retxBSR-Timer) expires, when the UE 2*a*-01 has data that is transmittable with respect to certain logical channel/RB that belong to a LCG.

Condition 2: This BSR is transmitted, when data to be transmitted with respect to a certain logical channel/RB belonging to the LCG is generated in an upper layer (a RLC layer or a PDCP layer) and the data has a highest priority over a logical channel/RB belonging to any LCG.

Condition 3: This BSR is transmitted, when data to be transmitted with respect to a certain logical channel/RB belonging to the LCG is generated in an upper layer (a RLC layer or a PDCP layer), and except for the data, any LCG does not have data.

Type 2: Periodic BSR

This BSR is transmitted when a periodic BSR-Timer configured to the UE 2*c*-01 expires.

Type 3: Padding BSR

This BSR is transmitted when, after a UL resource is allocated, a padding bit to fill an unused space occurred after transmission of data is equal to or greater than a sum value of a size of a BSR MAC CE and a subheader size of the BSR MAC CE.

When a packet exists in buffers of a plurality of the LCGs, a truncated BSR is transmitted.

At this time, the UE may determine whether a regular BSR is triggered because traffic occurs in a logical channel configured from among all logical channels (or when traffic remains in a case of expiry of retxBSR-Timer) (2*b*-05).

When the regular BSR is triggered, the UE may trigger a SR and may determine whether a configured PUCCH SR resource exists in the triggered SR (2*b*-07). When the configured PUCCH SR resource does not exist in the triggered SR, the UE may perform a random access and then may transmit a BSR MAC CE (2b-15).

When the configured PUCCH SR resource exists in the triggered SR (i.e., when SR configuration mapped to a triggered and then pending SR exists), the UE may examine conditions below for each SR configuration. That is, in a present embodiment of the disclosure, two pending SRs belong to one SR #1, and thus, operations below may be performed only once, not twice.

A case in which it is being checked whether a PUCCH resource exists in corresponding SR configuration.

A case in which a sr-ProhibitTimer set to the corresponding SR configuration is not running.

A case in which the PUCCH resource of the SR configuration does not overlap with a measurement gap for measurement of neighboring cells.

A case in which the PUCCH resource of the SR configuration does not overlap with a resource for data transmission.

When the aforementioned cases are all satisfied, the UE may determine whether the number of SR transmissions is smaller than a maximum number of allowed SR transmissions (sr_TransMax), and when the number of SR transmissions is smaller than the maximum number of allowed SR transmissions (sr_TransMax), the UE may increase SR_COUNTER by 1, may transmit an SR by indicating a physical layer to transmit a PUCCH resource (2b-09), and may restart sr-ProhibitTimer. When the number of SR transmissions reaches the maximum number of allowed SR transmissions, the UE may perform operations below.

to inform a RRC layer of release of a PUCCH resource with respect to all serving cells;

to inform the RRC layer of release of a SRS resource with respect to all serving cells;

to remove configured DL allocation and UL allocation information;

to release a PUSCH resource for reporting semi-permanent CSI; and to perform a random access on PCell when a SR is transmitted to a MCG and perform the random access on PSCell when the SR is transmitted to a SCG, and then to cancel all pending SRs.

Afterward, the UE may determine whether a UL resource is allocated from the BS (2b-11), and when not allocated, sr-ProhibitTimer is not running, and when the number of SR transmissions does not reach the maximum number of allowed SR transmissions (2b-13), the UE may retransmit the SR (2b-09). When the number of SR transmissions reaches the maximum number of allowed SR transmissions (2b-13), the UE may transmit a BSR MAC CE by performing a random access (2b-15).

When the UE receives the UL resource, the UE may transmit the BSR MAC CE through the UL resource (2b-17). Also, when the BSR MAC CE includes all buffer statuses at a time when a second regular BSR is triggered, the UE may cancel all of two pending SRs. However, when the BSR MAC CE includes only a buffer status at a time when a first regular BSR is triggered, the UE may cancel only a first SR and may not cancel a second SR and make the second SR pending. By doing so, when sr-ProhibitTimer expires thereafter, the UE may additionally transmit the second SR.

Figure 3A:
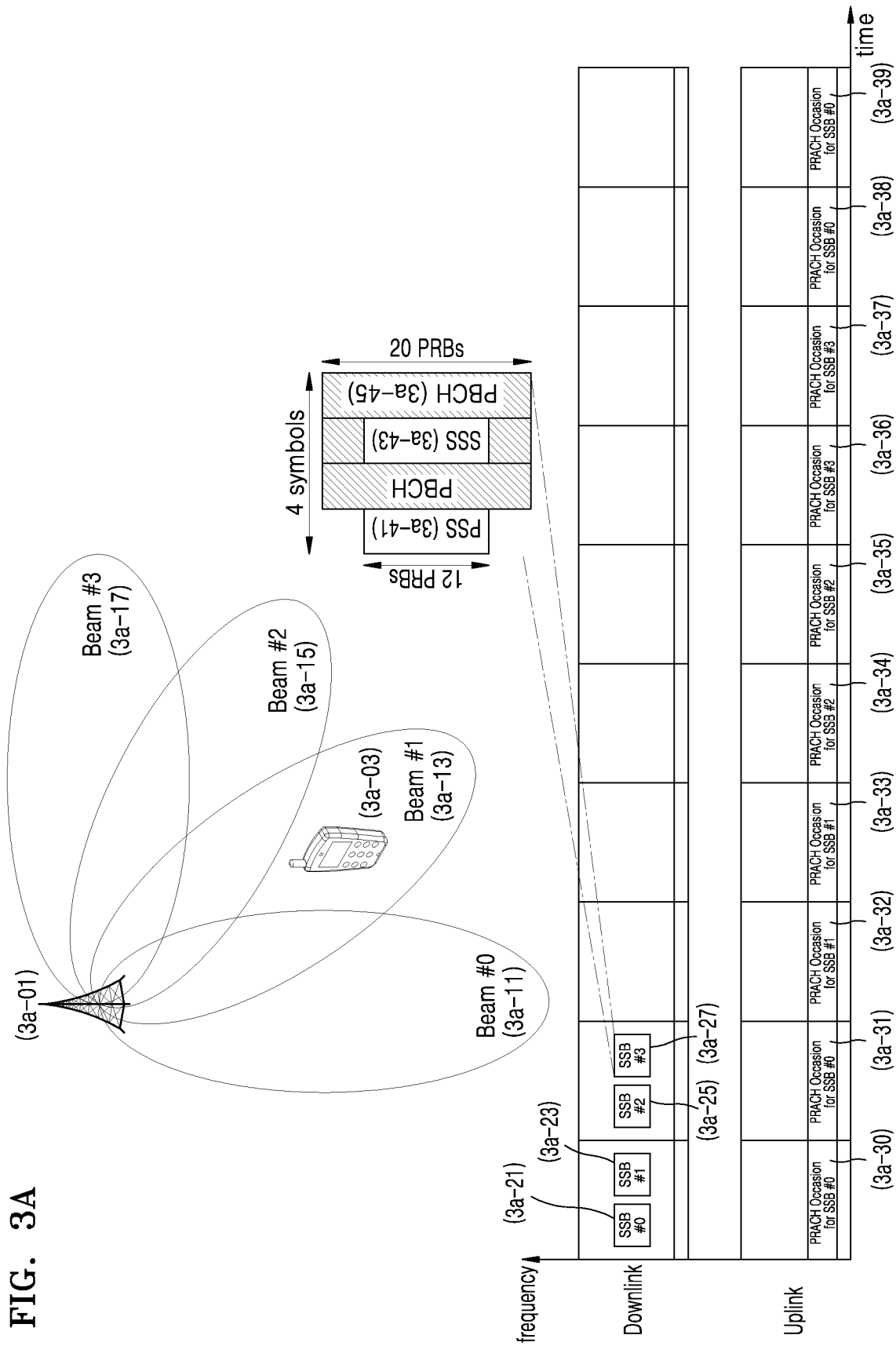
FIG. 3A illustrates a diagram for describing downlink (DL) and uplink (UL) channel frame structures for beam-based communication that is performed in a New Radio (NR) system, according to an embodiment of the disclosure.

FIG. 3A illustrates a diagram for describing DL and UL channel frame structures for beam-based communication that is performed in an NR system, according to an embodiment of the disclosure.

Referring to FIG. 3A, a BS 3a-01 may transmit signals in the form of beams 3a-11, 3a-13, 3a-15, and 3a-17 for wider coverage or strong signaling. Accordingly, a UE 3a-03 in a cell may need to transmit or receive data by using a particular beam transmitted by the BS 3a-01 (in FIG. 3A, beam #1 3a-13).

Depending on whether the UE 3a-03 is connected to the BS 3a-01, the UE 3a-03 may be classified as being in an RRC Idle mode, an RRC Inactive mode, or a RRC Connected mode. Accordingly, the BS 3a-01 may not know where the UE 3a-03 is when t the UE 3a-03 is in the RRC Inactive mode.

When the UE 3a-03 attempts to transit to the RRC Connected mode from the RRC Inactive mode, the UE 3a-03 may receive synchronization signal blocks (SSB) 3a-21, 3a-23, 3a-25, and 3a-27 transmitted from the BS 3a-01. The SSBs may be SSB signals periodically transmitted at certain intervals set by the BS 3a-01, and each of the SSBs may include a primary synchronization signal (PSS) 3a-41, a secondary synchronization signal (SSS) 3a-43, and a physical broadcast channel (PBCH) 3a-45.

A scenario where each beam transmits an SSB is assumed in FIG. 3A. For example, it is assumed that beam #0 3a-11 is used to transmit the SSB #0 3a-21, beam #1 3a-13 is used to transmit SSB #1 3a-23, beam #2 3a-15 is used to transmit SSB #2 3a-25, and beam #3 3a-17 is used to transmit SSB #3 3a-27. It is assumed that the UE 3a-03 in the RRC Idle mode or the RRC Inactive is located under beam #1 3a-13 in FIG. 3A, and thus, the UE 3a-03 receives SSB #1 3a-23 transmitted by beam #1 3a-13. When the UE 3a-03 receives SSB #1 3a-23, the UE 3a-03 may obtain a physical cell identifier (PCI) of the BS 3a-01 from the PSS or the SSS, and when the UE 3a-03 receives the PBCH, the UE 3a-03 may know an identifier of the SSB (e.g., SSB #1) currently received and where the SSB is located in a 10 ms frame as well as at which system frame number (SFN) the SSB is located among SFNs in a 10.24 ms period.

Furthermore, the PBCH may include a master information block (MIB), and the MIB may include information indicating a location at which a system information block type 1 (SIB1) that broadcasts more detailed configuration information of the cell can be received. When the UE 3a-03 receives the SIB1, the UE 3a-03 may know the total number of SSBs transmitted by the BS 3a-01, and locations of physical random access channel (PRACH) occasions (e.g., 3a-30 to 3a-39 of FIG. 3A, which are allocated at intervals of 1 ms) to perform random access on the BS 3a-01 to transit to the RRC Connected mode (more specifically, to transmit a preamble that is a physical signal designed to be in sync with UL transmission). In addition, the UE 3a-03 may determine which of the PRCH occasions is mapped to which SSB index, based on the information of the SIB1. For example, in FIG. 3A, it is assumed that the PRACH occasions are allocated at intervals of 1 ms as described above, and that 1/2 SSB is allocated for each PRACH occasion (i.e., two PRACH occasions for each SSB). Accordingly, FIG. 3A illustrates a scenario in which two PRACH occasions are allocated for each SSB from the beginning of the PRACH occasions starting with an SFN. For example, PRACH occasions 3a-30 and 3a-31 may be allocated for SSB #0, and PRACH occasions 3a-32 and 3a-33 may be allocated for SSB #1. After PRACH occasions are configured for all of the SSBs, subsequent PRACH occasions 3a-38 and 3a-39 may be allocated for a first SSB.

Accordingly, the UE 3a-03 may recognize locations of the PRACH occasions 3a-32 and 3a-33 for SSB #1, and thus may transmit a random access preamble on the earliest PRACH occasion 3a-32 at a current point of time from among the PRACH occasions 3a-32 and 3a-33 corresponding to SSB #1. Because the BS 3a-01 receives the preamble on the PRACH occasion 3a-32, the BS 3a-01 may determine that the UE 3a-03 selected SSB #1 and transmitted the preamble, and may transmit or receive data through the beam corresponding to SSB #1 when a subsequent random access is performed.

Figure 3B:
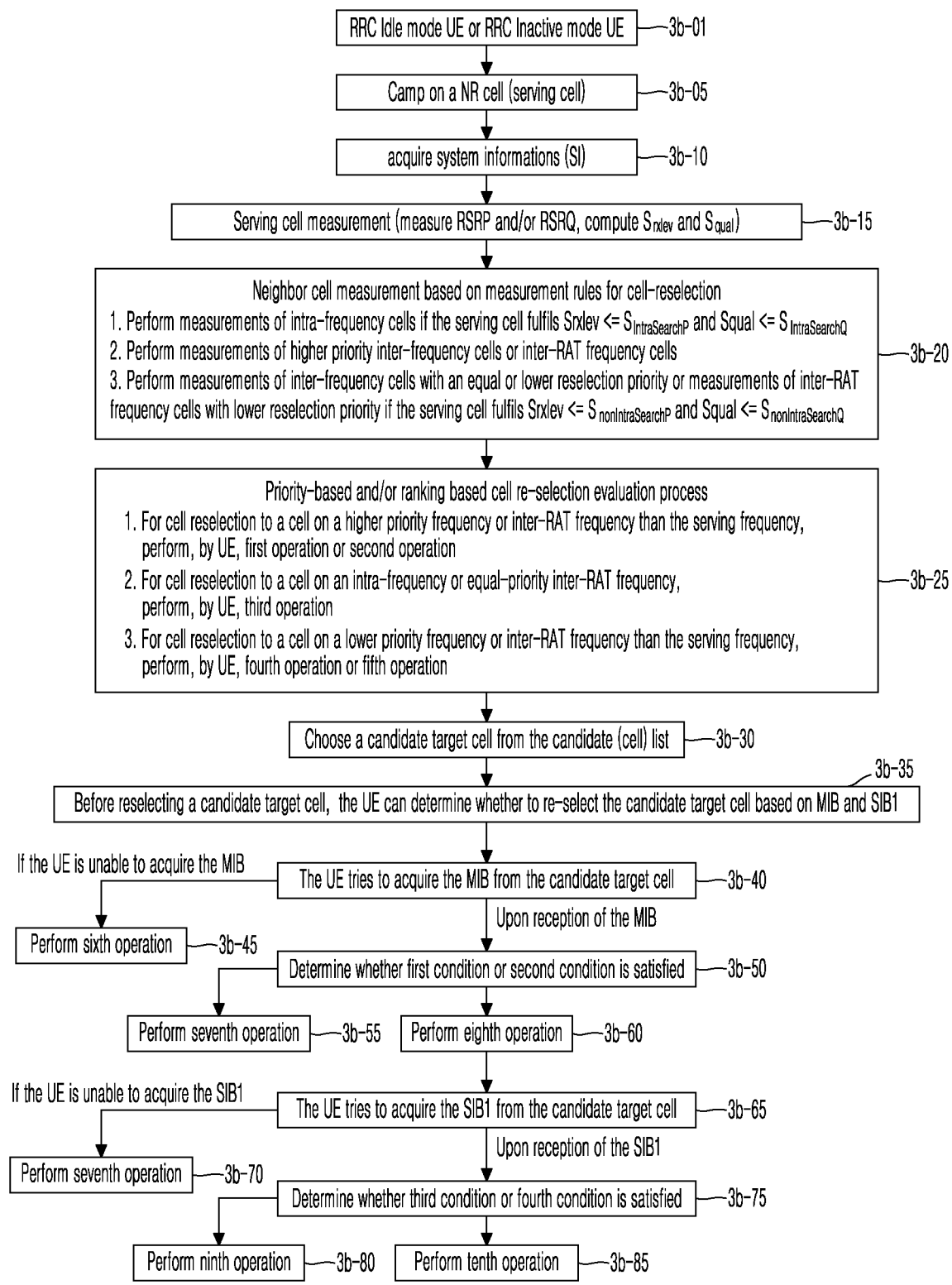
FIG. 3B illustrates a diagram for describing a cell reselection process in an RRC idle mode or an RRC inactive mode of a UE, based on system information broadcast by a BS, according to an embodiment of the disclosure.

FIG. 3B illustrates a diagram for describing a cell reselection process in an RRC idle mode or an RRC inactive mode of a UE, based on system information broadcast by a BS, according to an embodiment of the disclosure.

The cell reselection process indicates a process of determining, by the UE in the RRC idle mode or the RRC inactive mode, whether to maintain a current serving cell or to reselect a cell as a neighbor cell when a service quality of a serving cell deteriorates compared to a service quality of the neighbor cell for a predetermined reason or due to movement of the UE. In handover, whether to perform handover is determined by a network (an MME, an access and mobility management function (AMF), a source eNB, or a source gNB), whereas, in the cell reselection process, the UE itself may determine whether to perform the cell reselection process, based on a measurement value of the UE. A cell to be reselected by the UE as the UE moves may be an intra-frequency cell using a same NR frequency as the serving cell that the UE currently camps on, an inter-frequency cell using a different NR frequency, or an inter-radio access technology (inter-RAT) cell using a different RAT.

The UE in the RRC idle mode or the RRC inactive mode (operation 3b-01) may perform a series of operations when it camps on a serving cell (operation 3b-05).

In operation 3b-10, the UE in the RRC idle mode or the RRC inactive mode may receive system information broadcast by a BS of the serving cell. In this regard, the UE in the RRC idle mode or the RRC inactive mode may not receive system information broadcast by a BS of the neighbor cell. The system information may be divided into a master information block (MIB) and system information blocks (SIBs). In addition, the SIBs may be divided into a SIB1 and an SI message (e.g., a SIB2, a SIB3, a SIB4, a SIB5, a SIB6, a SIB7, a SIB8, or a SIB9) excluding the SIB1. The UE in the RRC idle mode or the RRC inactive mode may previously receive and read system information (e.g., the MIB or the SIB1) broadcast by a base station of a certain serving cell before the UE camps on the certain serving cell. For reference, the MIB and the SIB1 may be system information to be commonly applied to all UEs. The SIB2 may be system information to be commonly applied to a process of reselecting, by the UE in the RRC idle mode or the RRC inactive mode, the intra-frequency cell, the inter-frequency cell, or the inter-RAT cell. The SIB3, the SIB4, and the SIB5 may include information required for the UE in the RRC idle mode or the RRC inactive mode to reselect a cell.

The SIB1 may include information about parameters such as a minimum required reception level, a minimum required quality level, or a threshold value which is used in determining whether to measure a serving cell signal, and such information may be applied in a cell-specific manner. The SIB2, the SIB3, the SIB4, and the SIB5 may include information about parameters such as a minimum required reception level, a minimum required quality level, or a threshold value which is used in determining whether to measure a neighbor cell signal. In detail, the SIB2 may include common information for reselecting the intra-frequency cell, the inter-frequency cell, or the inter-RAT cell, the SIB3 may include information for reselecting only the intra-frequency cell, the SIB4 may include information for reselecting only the inter-frequency cell, and the SIB5 may include information for reselecting only the inter-RAT cell.

In operation 3b-15, the UE in the RRC idle mode or the RRC inactive mode may wake up in a discontinuous reception (DRX) period and may measure reference signal received power (RSRP) $Q_{rxlevmeas}$ and reference signal received quality (RSRQ) $Q_{qualmeas}$ (operation 3b-15). The UE may calculate, based on the measurement values, a reception level Srxlev and a reception quality Squal of the serving cell by using the parameters received from the SIB1. The UE may compare the calculated values with threshold values and then may determine whether to perform neighbor cell measurement for cell reselection. The reception level Srxlev and the reception quality Squal of the serving cell may be determined by using Equation 1 below.

$$\text{Srxlev} = Q_{rxlevmeas} - (Q_{rxlevmin} + Q_{rxlevminoffset}) - P_{compensation} - Q\text{offset}_{temp},$$

$$\text{Squal} = Q_{qualmeas} - (Q_{qualmin} + Q_{quaminoffset}) - Q\text{offset}_{temp}. \quad \text{<Equation 1>}$$

Definitions of parameters used in Equation 1 may be determined according to the 3GPP standard specification titled "38.304: User Equipment (UE) procedures in Idle mode and RRC Inactive state". Hereinafter, the definitions are equally applied to embodiments of the disclosure to which Equation 1 is applied.

The UE in the RRC idle mode or the RRC inactive mode may not constantly perform the neighbor cell measurement but may determine whether to perform the neighbor cell measurement based on measurement rules so as to minimize consumption of a battery power (operation 3b-20). In this regard, the UE in the RRC idle mode or the RRC inactive mode may not receive the system information broadcast by the BS of the neighbor cell, and may perform the neighbor cell measurement by using the system information broadcast by the serving cell that the UE currently camps on. When the reception level Srxlev and the reception quality Squal of the serving cell which are measured in operation 3b-15 are lower than a threshold value (Srxlev≤$S_{IntraSearchP}$ and Squal≤$S_{IntraSearchQ}$), the UE in the RRC idle mode or the RRC inactive mode may measure intra-frequency cells using a same frequency as the serving cell (operation 3b-20). That is, a reception quality Squal or a reception level Srxlev of each intra-frequency cell using the same frequency as the serving cell may be derived based on the SIB2 or/and the SIB3 broadcast by the serving cell (application of Equation 1).

For reference, information about threshold values of $S_{IntraSearchP}$ and $S_{IntraSearchQ}$ is included in the SIB2. Also, regardless of a quality of the serving cell, the neighbor cell measurement may be performed on inter-frequency and inter-RAT cells having priorities higher than a frequency of the current serving cell (operation 3b-20). The UE may obtain information about the priorities from a dedicated RRC message (e.g., an RRCRelease message) from the BS or the system information. A reception quality Squal or a reception level Srxlev of each of inter-frequency cells having a priority higher than the frequency of the serving cell may be derived (according to Equation 1) based on the SIB4 broadcast by the serving cell, and a reception quality Squal or a reception level Srxlev of each of inter-RAT cells having a priority higher than the frequency of the serving cell may be derived (according to Equation 1) based on the SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell, which are measured in operation 3b-15, are lower than a threshold value (Srxlex≤) $S_{nonIntraSearchP}$ and Squal≤) $S_{IntraSearchQ}$), the UE in the RRC idle mode or the RRC inactive mode may measure neighbor inter-frequency cells using a frequency different from the serving cell or neighbor inter-RAT cells using a RAT different from that of the serving cell (3b-20). That is, a reception quality Squal or a reception level Srxlev of at least one inter-frequency cell having a priority equal to or lower than the frequency of the serving cell is derived (according to Equation 1) based on the SIB4 broadcast by the serving cell, and a reception quality Squal or a reception level Srxlev of at least one inter-RAT cell having a priority lower than the frequency of the serving cell is derived (according to Equation 1) based on the SIB5 broadcast by the serving cell. For reference, information about threshold values of $S_{nonIntraSearchP}$ and $S_{nonIntraSearchQ}$ is included in the SIB2.

The UE in the RRC idle mode or the RRC inactive mode may perform a cell reselection evaluation process based on a cell reselection priority and/or a ranking, based on measurement values of neighbor cells (obtained in 3b-20) (3b-25). That is, when a plurality of cells fulfilling cell reselection criteria have different priorities, reselection of frequency/RAT cells having a higher priority precedes reselection of frequency/RAT cells having a lower priority (Cell reselection to a higher priority RAT/frequency shall take precede over a lower priority RAT/frequency if multiple cells of different priorities fulfil the cell reselection criteria). Priority information is included in the system information (the SIB2, the SIB4, and the SIB5) broadcast by the serving cell or is included in an RRCRelease message received when the UE transits from a RRC connected mode to the RRC idle mode or the RRC inactive mode. The information about the priorities which is included in the RRCRelease message may have a priority over information about priorities which is included in system information broadcast by the serving cell. Operations of the UE with respect to a cell reselection evaluation process for inter-frequency/inter-RAT cells having a priority higher than the frequency of the serving cell will now be described below.

First Operation:
In a case where the SIB2 including a threshold value of threshServingLowQ is broadcast and 1 second has elapsed after the UE camped on the current serving cell, when a reception quality Squal of an inter-frequency or inter-RAT cell is higher than a threshold value $Thresh_{X, HighQ}$ during a specific time interval $Treselection_{RAT}$ (Squal>$Thresh_{X,HighQ}$ during time interval $Treselection_{RAT}$), the UE may perform reselection with respect to the inter-frequency or inter-RAT cell.

Second Operation:
When the UE cannot perform the first operation, the UE may perform the second operation.
When 1 second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ (Srxlev>$Thresh_{X, HighP}$ during time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Threh_{X, HighQ}$ and $Thresh_{X, HighP}$, and $Treselection_{RAT}$ of the inter-frequency cell, i.e., information included in the SIB4 broadcast by the serving cell. Also, the UE may perform the first operation or the second operation, based on values of a reception quality Squal, a reception level Srxlev, threshold values $Threh_{X, HighQ}$ and $Thresh_{X, HighP}$, and $Treselection_{RAT}$ of the inter-RAT cell, i.e., information included in the SIB5 broadcast by the serving cell.

Also, operations of the UE with respect to a ranking-based cell reselection evaluation process for intra-frequency cells belonging to the frequency of the current serving cell or inter-frequency cells having a priority equal to the frequency of the current serving cell will now be described below.

Third Operation:
When a reception quality Squal and a reception level Srxlev of each of the intra-frequency/inter-frequency cells are greater than 0, the UE may derive rankings of respective cells based on measurement values of RSRPs (The UE shall perform ranking of all cells that fulfills the cell selection criterion S). Rankings of the serving cell and a neighbor cell may be respectively calculated by using Equation 2 below.

$$R_s = Q_{meas,s} + Q_{hyst}$$

$$R_n = Q_{meas,n} - Q_{offset} \quad <\text{Equation 2}>$$

In Equation 2, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and $Q_{offset}$ indicates an offset between the serving cell and the neighbor cell. The SIB2 includes a $Q_{hyst}$ value, and the $Q_{hyst}$ value may be commonly used in reselecting intra-frequency/inter-frequency cells. When the intra-frequency cell is reselected, $Q_{offset}$ (is signaled according to each cell, is applied only to a designated cell, and is included in the SIB3. When the inter-frequency cell is reselected, $Q_{offset}$ is signaled according to each cell, is applied only to a designated cell, and is included in the SIB4. When a ranking of a neighbor cell which is derived according to Equation 2 is greater than a ranking of the serving cell (i.e., $R_n > R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:
In a case where the SIB2 including a threshold value of threshServingLowQ is broadcast and 1 second has elapsed after the UE camped on the current serving cell, when a reception quality Squal of the current serving cell is less than a threshold value $Thresh_{Serving, LowQ}$ (Squal<$Thresh_{Serving, LowQ}$) and a reception quality Squal of an inter-frequency or inter-RAT cell is higher than a threshold value $Thresh_{X, LowQ}$ during a specific time interval $Treselection_{RAT}$ (Squal>$Thresh_{X,LowQ}$ during a time interval $Treselection_{RAT}$), the UE may perform reselection with respect to the inter-frequency or inter-RAT cell.

Fifth Operation:
When the UE cannot perform the fourth operation, the UE may perform the fifth operation.
When 1 second has elapsed after the UE camped on the current serving cell, a reception level Srxlev of the current serving cell is lower than a threshold value $Thresh_{Serving, LowP}$ (Srxlev<$Thresh_{Serving, LowP}$), and a reception level Srxlev of the inter-frequency or inter-RAT cell is higher than a threshold value $Thresh_{X,\ LowQ}$ during a specific time interval $Treselection_{RAT}$ (Srxlev>$Thresh_{X,LowP}$) during a time interval $Treselection_{RAT}$), the UE may perform reselection with respect to the inter-frequency or inter-RAT cell.

In this regard, the fourth operation or the fifth operation by the UE with respect to the inter-frequency cell may be performed based on the threshold values $Thresh_{Serving,\ LowQ}$ and $Thresh_{Serving,\ LowP}$ included in the SIB2 broadcast by the serving cell, and the reception quality Squal, the reception level Srxlev, and the threshold values $Threh_{X,\ LowQ}$ and $Thresh_{X,\ LowP}$ of the inter-frequency cell which are included in the SIB4 broadcast by the serving cell. The fourth operation or the fifth operation by the UE with respect to the inter-RAT cell may be performed based on the threshold values $Thresh_{Serving,\ LowQ}$ and $Thresh_{Serving,\ LowP}$ included in the SIB2 broadcast by the serving cell, and the reception quality Squal, the reception level Srxlev, and the threshold values $Thresh_{X,LowQ}$ and $Thresh_{X,\ LowP}$ of the inter-RAT cell which are included in the SIB5 broadcast by the serving cell. For example, the SIB4 includes a $Q_{qualmin}$ value or a $Q_{rxlevmin}$ value, and the reception quality Squal or the reception level Srxlev of the inter-frequency cell may be derived based on the values.

In 3*b*-30, the UE may derive a candidate cell list, and then may select a candidate target cell based on a priority and/or a ranking from the candidate cell list. When the candidate target cell is selected, in 3*b*-35, the UE in the RRC idle mode or the RRC inactive mode may determine whether to select a corresponding cell by attempting to receive the MIB and the SIB1 broadcast by the corresponding cell before the UE finally selects the corresponding cell. At this time, the UE performs operations below.

When the selected candidate target cell broadcasts the MIB in 3*b*-35, the UE may attempt to receive the MIB in 3*b*-40.

When the UE cannot obtain the MIB, the UE may perform a sixth operation in 3*b*-45.

Sixth Operation: The UE may consider a cell status of the corresponding cell to be barred, and may exclude the corresponding cell from the candidate cell list of cell selection/reselection for 300 seconds (the UE shall or may exclude the barred cell as a candidate for cell selection/reselection for up to 300 seconds). When a reception quality Squal and/or a reception level Srxlev of another cell which are derived according to Equation 1, the other cell using the same frequency as the corresponding cell, is greater than 0 and/or satisfies the cell reselection criteria, the UE may select the other cell (the UE may select another cell on the same frequency if the selection criteria and/or cell reselection criteria are fulfilled).

When the UE receives the MIB (Upon reception of the MIB), the UE may determine whether the corresponding cell satisfies a first condition or a second condition, based on the information included in the MIB (3*b*-50).

First condition: When a cellBarred field value included in the received MIB is set to "barred" and/or PDCCH-ConfigSIB1 is not supported.

Second condition: A condition that does not correspond to the first condition

Seventh operation. When the first condition is satisfied, in 3*b*-55, the UE may consider the corresponding cell as a barred cell, and may exclude the barred cell from the candidate cell list of cell selection/reselection for 300 seconds. When an intraFreqReselection field value included in the MIB is set to "notAllowed", the UE may not select/reselect, for 300 seconds, cell(s) that uses the same frequency as the barred cell. When the intraFreqReselection field value included in the MIB is set to "allowed", the UE may select cell(s) when the cell(s) satisfies the cell reselection criteria, the cell(s) using uses the same frequency as the barred cell.

Eighth operation: When the second condition is satisfied, in 3*b*-60, the UE may consider the corresponding cell as an allowed cell, and may determine the corresponding cell to be a candidate cell with respect to cell selection/reselection. When the intraFreqReselection field value included in the MIB is set to "notAllowed", the UE may not select/reselect, for 300 seconds, cell(s) that uses the same frequency as the cell. When the intraFreqReselection field value included in the MIB is set to "allowed", the UE may select cell(s) when the cell(s) satisfies the cell reselection criteria, the cell(s) using uses the same frequency as the cell.

When the selected candidate target cell broadcasts the SIB1 in 3*b*-35, the UE may attempt to receive the SIB1 in 3*b*-65.

When the UE cannot obtain the SIB1, the UE may perform, in 3*b*-70, the seventh operation described in 3*b*-55.

When the UE receives the SIB1 (Upon reception of the SIB1), the UE may determine whether the corresponding cell satisfies a third condition or a fourth condition, based on the information included in the SIB1 (3*b*-75). The third condition and the fourth condition are as below.

Third condition: When the UE identifies FrequencyInfoDL-SIB included in the received SIB1 and does not support a bandwidth for all subcarrier spacings (SCSs) in scs-SpecificCarrierList Fourth condition: When the UE identifies FrequencyInfoDL-SIB included in the received SIB1 and supports a bandwidth for at least one SCS in scs-SpecificCarrierList (If the UE supports the bandwidth of at least one SCS in the scs-SpecificCarrierList in FrequencyInfoDL-SIB in SIB1)

Ninth operation: When the third condition is satisfied, in 3*b*-80, the UE may determine that the corresponding cell is not accessible or may consider the corresponding cell as a barred cell, and may exclude the corresponding cell from the candidate cell list of cell selection/reselection for 300 seconds. The UE may not select/reselect, for 300 seconds, cell(s) that uses the same frequency as the barred cell.

Tenth operation: When the fourth condition is satisfied, in 3*b*-85, the UE may determine that the corresponding cell is accessible. Then, the UE may derive a reception quality Squal and/or a reception level Srxlev of the corresponding cell by using Equation 1 based on the information included in the SIB1, and when the reception quality Squal and/or the reception level Srxlev satisfies S-criterion (Srxlev>0 AND/OR Squal>0), the UE may finally reselect the corresponding cell, or otherwise, the UE may not finally reselect the corresponding cell.

Figure 3C:
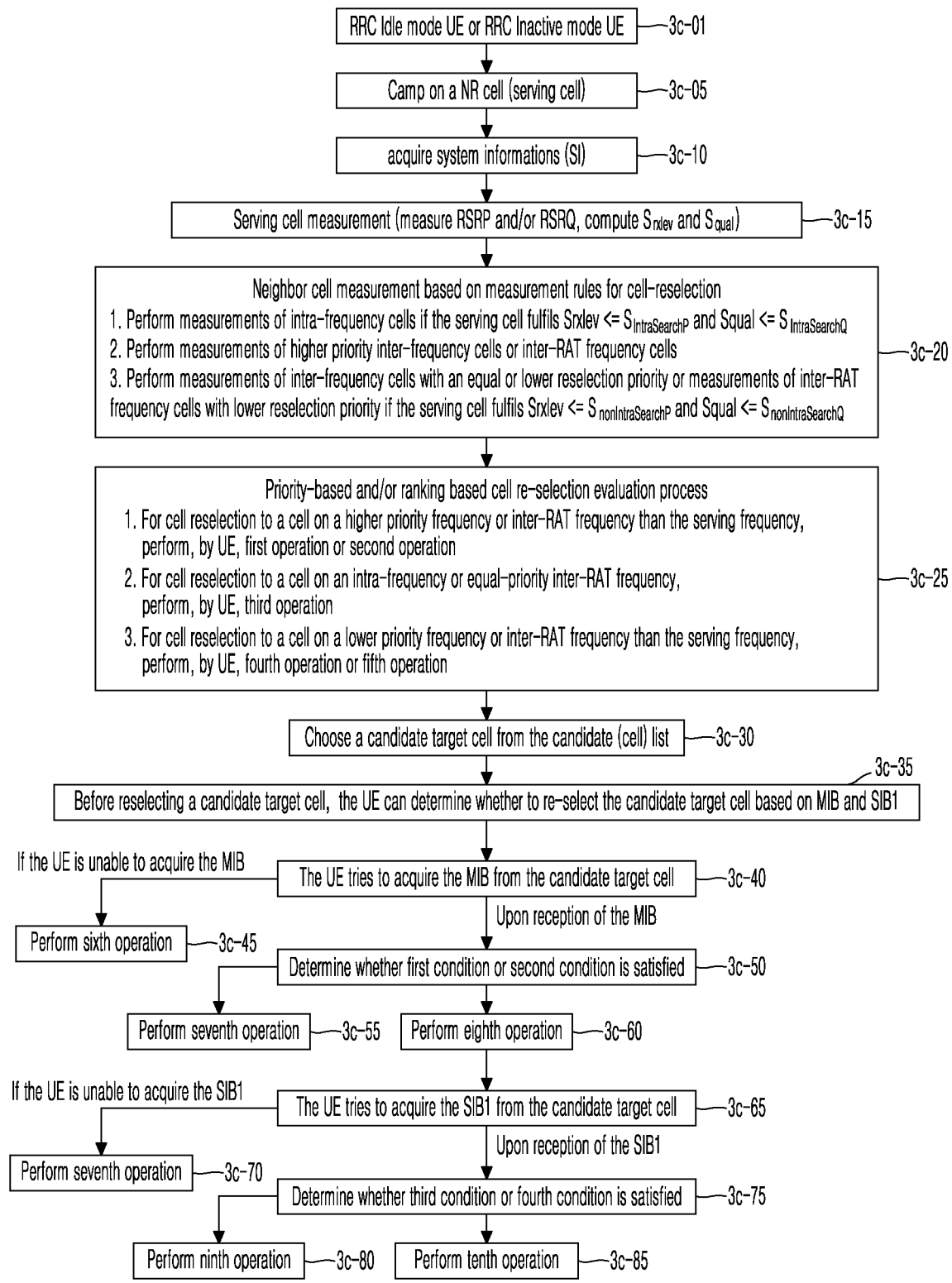
FIG. 3C illustrates a diagram for describing a cell reselection process in an RRC idle mode or an RRC inactive mode of a UE, based on system information broadcast by a BS, according to another embodiment of the disclosure.

FIG. 3C illustrates a diagram for describing a cell reselection process in an RRC idle mode or an RRC inactive mode of a UE, based on system information broadcast by a BS, according to another embodiment of the disclosure.

The UE in the RRC idle mode or the RRC inactive mode (operation 3*c*-01) may perform a series of operations when it camps on a serving cell (operation 3*c*-05).

In operation 3*c*-10, the UE in the RRC idle mode or the RRC inactive mode may receive system information broadcast by a BS of the serving cell. In this regard, the UE in the RRC idle mode or the RRC inactive mode may not receive system information broadcast by a BS of the neighbor cell. The system information may be divided into a master information block (MIB) and system information blocks (SIBs). In addition, the SIBs may be divided into a SIB1 and an SI message (e.g., a SIB2, a SIB3, a SIB4, a SIB5, a SIB6, a SIB7, a SIB8, or a SIB9) excluding the SIB1. The UE in the RRC idle mode or the RRC inactive mode may previously receive and read system information (e.g., the MIB or the SIB1) broadcast by a base station of a certain serving cell before the UE camps on the certain serving cell. For reference, the MIB and the SIB1 may be system information to be commonly applied to all UEs. The SIB2 may be system information to be commonly applied to a process of reselecting, by the UE in the RRC idle mode or the RRC inactive mode, the intra-frequency cell, the inter-frequency cell, or the inter-RAT cell. The SIB3, the SIB4, and the SIB5 may include information required for the UE in the RRC idle mode or the RRC inactive mode to reselect a cell.

The SIB1 may include information about parameters such as a minimum required reception level, a minimum required quality level, or a threshold value which is used in determining whether to measure a serving cell signal, and such information may be applied in a cell-specific manner. The SIB2, the SIB3, the SIB4, and the SIB5 may include information about parameters such as a minimum required reception level, a minimum required quality level, or a threshold value which is used in determining whether to measure a neighbor cell signal. In detail, the SIB2 may include common information for reselecting the intra-frequency cell, the inter-frequency cell, or the inter-RAT cell, the SIB3 may include information for reselecting only the intra-frequency cell, the SIB4 may include information for reselecting only the inter-frequency cell, and the SIB5 may include information for reselecting only the inter-RAT cell.

In operation 3c-15, the UE in the RRC idle mode or the RRC inactive mode may wake up in a discontinuous reception (DRX) period and may measure reference signal received power (RSRP) $Q_{rxlevmeas}$ and reference signal received quality (RSRQ) $Q_{qualmeas}$ (operation 3c-15). The UE may calculate, based on the measurement values, a reception level Srxlev and a reception quality Squal of the serving cell by using the parameters received from the SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 3c-20). In this regard, the UE in the RRC idle mode or the RRC inactive mode may not receive the system information broadcast by the BS of the neighbor cell, and may perform the neighbor cell measurement by using the system information broadcast by the serving cell that the UE currently camps on. When the reception level Srxlev and the reception quality Squal of the serving cell which are measured in operation 3c-15 are lower than a threshold value (Srxlev≤$S_{IntraSearchP}$ and Squal≤$S_{IntraSearchQ}$), the UE in the RRC idle mode or the RRC inactive mode may measure intra-frequency cells using a same frequency as the serving cell (operation 3c-20). That is, a reception quality Squal or a reception level Srxlev of each intra-frequency cell using the same frequency as the serving cell may be derived based on the SIB2 or/and the SIB3 broadcast by the serving cell (application of Equation 1).

For reference, information about threshold values of $S_{IntraSearchP}$ and $S_{IntraSearchQ}$ is included in the SIB2. Also, regardless of a quality of the serving cell, the neighbor cell measurement may be performed on inter-frequency and inter-RAT cells having priorities higher than a frequency of the current serving cell (operation 3c-20). The UE may obtain information about the priorities from a dedicated RRC message (e.g., an RRCRelease message) from the BS or the system information. A reception quality Squal or a reception level Srxlev of each of inter-frequency cells having a priority higher than the frequency of the serving cell may be derived (according to Equation 1) based on the SIB4 broadcast by the serving cell, and a reception quality Squal or a reception level Srxlev of each of inter-RAT cells having a priority higher than the frequency of the serving cell may be derived (according to Equation 1) based on the SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell, which are measured in operation 3c-15, are lower than a threshold value (Srxlex≤) $S_{nonIntraSearchP}$ and Squal≤) $S_{IntraSearchQ}$), the UE in the RRC idle mode or the RRC inactive mode may measure neighbor inter-frequency cells using a frequency different from the serving cell or neighbor inter-RAT cells using a RAT different from that of the serving cell (3c-20). That is, a reception quality Squal or a reception level Srxlev of at least one inter-frequency cell having a priority equal to or lower than the frequency of the serving cell is derived (according to Equation 1) based on the SIB4 broadcast by the serving cell, and a reception quality Squal or a reception level Srxlev of at least one inter-RAT cell having a priority lower than the frequency of the serving cell is derived (according to Equation 1) based on the SIB5 broadcast by the serving cell. For reference, information about threshold values of $S_{nonIntraSearchP}$ and $S_{nonIntraSearchQ}$ is included in SIB2.

The UE in the RRC idle mode or the RRC inactive mode may perform a cell reselection evaluation process based on a cell reselection priority and/or a ranking, based on measurement values of neighbor cells (obtained in 3c-20) (3c-25). That is, when a plurality of cells fulfilling cell reselection criteria have different priorities, reselection of frequency/RAT cells having a higher priority precedes reselection of frequency/RAT cells having a lower priority (Cell reselection to a higher priority RAT/frequency shall take precede over a lower priority RAT/frequency if multiple cells of different priorities fulfill the cell reselection criteria). Priority information is included in the system information (the SIB2, the SIB4, and the SIB5) broadcast by the serving cell or is included in an RRCRelease message received when the UE transits from a RRC connected mode to the RRC idle mode or the RRC inactive mode. The information about the priorities which is included in the RRCRelease message may have a priority over information about priorities which is included in system information broadcast by the serving cell. Operations of the UE with respect to a cell reselection evaluation process for inter-frequency/inter-RAT cells having a priority higher than the frequency of the serving cell will now be described below.

First Operation:
   In a case where the SIB2 including a threshold value of threshServingLowQ is broadcast and 1 second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ (Squal>$Thresh_{X,HighQ}$ during time interval Treselection$_{RAT}$), the UE may perform reselection with respect to the inter-frequency or inter-RAT cell.

Second Operation:
When the UE cannot perform the first operation, the UE may perform the second operation.
When 1 second has elapsed after the UE camped on the current serving cell, and a reception level Srxlev of the inter-frequency or inter-RAT cell is higher than a threshold value Thresh$_{X,HighP}$ during a specific time interval Treselection$_{RAT}$ (Srxlev>Thresh$_{X,\ HighP}$ during time interval Treselection$_{RAT}$), the UE may perform reselection with respect to the inter-frequency or inter-RAT cell.

In this regard, the UE may perform the first operation or the second operation, based on values of a reception quality Squal, a reception level Srxlev, threshold values Threh$_{X,\ HighQ}$ and Thresh$_{X,\ HighP}$, and Treselection$_{RAT}$ of the inter-frequency cell, i.e., information included in the SIB4 broadcast by the serving cell. Also, the UE may perform the first operation or the second operation, based on values of a reception quality Squal, a reception level Srxlev, threshold values Threh$_{X,\ HighQ}$ and Thresh$_{X,\ HighP}$, and Treselection$_{RAT}$ of the inter-RAT cell, i.e., information included in SIB5 broadcast by the serving cell.

Also, operations of the UE with respect to a ranking-based cell reselection evaluation process for intra-frequency cells belonging to the frequency of the current serving cell or inter-frequency cells having a priority equal to the frequency of the current serving cell will now be described below.

Third Operation:
When a reception quality Squal and a reception level Srxlev of each of the intra-frequency/inter-frequency cells are greater than 0, the UE may derive rankings of respective cells based on measurement values of RSRPs (The UE shall perform ranking of all cells that fulfills the cell selection criterion S). Rankings of the serving cell and a neighbor cell may be respectively calculated by using Equation 2 described above.

In aforementioned Equation 2, Q$_{meas,s}$ indicates an RSRP measurement value of the serving cell, Q$_{meas,n}$ indicates an RSRP measurement value of the neighbor cell, Q$_{hyst}$ indicates a hysteresis value of the serving cell, and Q$_{offset}$ indicates an offset between the serving cell and the neighbor cell. The SIB2 includes a Q$_{hyst}$ value, and the Q$_{hyst}$ value may be commonly used in reselecting intra-frequency/inter-frequency cells. When the intra-frequency cell is reselected, Q$_{offset}$ (is signaled according to each cell, is applied only to a designated cell, and is included in the SIB3. When the inter-frequency cell is reselected, Q$_{offset}$ is signaled according to each cell, is applied only to a designated cell, and is included in the SIB4. When a ranking of a neighbor cell which is derived according to Equation 2 is greater than a ranking of the serving cell (i.e., R$_n$>R$_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:
In a case where the SIB2 including a threshold value of threshServingLowQ is broadcast and 1 second has elapsed after the UE camped on the current serving cell, when a reception quality Squal of the current serving cell is less than a threshold value Thresh$_{Serving,\ LowQ}$ (Squal<Thresh$_{Serving,\ LowQ}$) and a reception quality Squal of an inter-frequency or inter-RAT cell is higher than a threshold value Thresh$_{X,\ LowQ}$ during a specific time interval Treselection$_{RAT}$ (Squal>Thresh$_{X,LowQ}$ during a time interval Treselection$_{RAT}$), the UE may perform reselection with respect to the inter-frequency or inter-RAT cell.

Fifth Operation:
When the UE cannot perform the fourth operation, the UE may perform the fifth operation.
When 1 second has elapsed after the UE camped on the current serving cell, a reception level Srxlev of the current serving cell is lower than a threshold value Thresh$_{Serving,\ LowP}$ (Srxlev<Thresh$_{Serving,\ LowP}$), and a reception level Srxlev of the inter-frequency or inter-RAT cell is higher than a threshold value Thresh$_{X,\ LowQ}$ during a specific time interval Treselection$_{RAT}$ (Srxlev>Thresh$_{X,LowP}$ during a time interval Treselection$_{RAT}$), the UE may perform reselection with respect to the inter-frequency or inter-RAT cell.

In this regard, the fourth operation or the fifth operation by the UE with respect to the inter-frequency cell may be performed based on the threshold values Thresh$_{Serving,\ LowQ}$ and Thresh$_{Serving,\ LowP}$ included in the SIB2 broadcast by the serving cell, and the reception quality Squal, the reception level Srxlev, and the threshold values Threh$_{X,\ LowQ}$ and Thresh$_{X,\ LowP}$ of the inter-frequency cell which are included in the SIB4 broadcast by the serving cell. The fourth operation or the fifth operation by the UE with respect to the inter-RAT cell may be performed based on the threshold values Thresh$_{Serving,\ LowQ}$ and Thresh$_{Serving,\ LowP}$ included in the SIB2 broadcast by the serving cell, and the reception quality Squal, the reception level Srxlev, and the threshold values Thresh$_{X,\ LowQ}$ and Thresh$_{X,\ LowP}$ of the inter-RAT cell which are included in the SIB5 broadcast by the serving cell. For example, the SIB4 includes a Q$_{qualmin}$ value or a Q$_{rxlevmin}$ value, and the reception quality Squal or the reception level Srxlev of the inter-frequency cell may be derived based on the values.

In 3c-30, the UE may derive a candidate cell list, and then may select a candidate target cell based on a priority and/or a ranking from the candidate cell list. When the candidate target cell is selected, in 3c-35, the UE in the RRC idle mode or the RRC inactive mode may determine whether to select a corresponding cell by attempting to receive the MIB and the SIB1 broadcast by the corresponding cell before the UE finally selects the corresponding cell. At this time, the UE performs operations below.

When the selected candidate target cell broadcasts the MIB in 3c-35, the UE may attempt to receive the MIB in 3c-40.

When the UE cannot obtain the MIB, the UE may perform a sixth operation in 3c-45.

Sixth Operation: The UE may consider a cell status of the corresponding cell to be barred, and may exclude the corresponding cell from the candidate cell list of cell selection/reselection for 300 seconds (the UE shall or may exclude the barred cell as a candidate for cell selection/reselection for up to 300 seconds). When a reception quality Squal and/or a reception level Srxlev of another cell which are derived according to Equation 1, the other cell using the same frequency as the corresponding cell, is greater than 0 and/or satisfies the cell reselection criteria, the UE may select the other cell (the UE may select another cell on the same frequency if the selection criteria and/or cell reselection criteria are fulfilled).

When the UE receives the MIB (Upon reception of the MIB), the UE may determine whether the corresponding cell satisfies a first condition or a second condition, based on the information included in the MIB (3c-50).

First condition: When a cellBarred field value included in the received MIB is set to "barred" and/or PDCCH-ConfigSIB1 is not supported.

Second condition: A condition that does not correspond to the first condition

Seventh operation: When the first condition is satisfied, in 3c-55, the UE may consider the corresponding cell as a barred cell, and may exclude the barred cell from the candidate cell list of cell selection/reselection for 300 seconds. When an intraFreqReselection field value included in the MIB is set to "notAllowed", the UE may not select/reselect, for 300 seconds, cell(s) that uses the same frequency as the barred cell. When the intraFreqReselection field value included in the MIB is set to "allowed", the UE may select cell(s) when the cell(s) satisfies the cell reselection criteria, the cell(s) using uses the same frequency as the barred cell.

Eighth operation: When the second condition is satisfied, in 3c-60, the UE may consider the corresponding cell as an allowed cell, and may determine the corresponding cell to be a candidate cell with respect to cell selection/reselection. When the intraFreqReselection field value included in the MIB is set to "notAllowed", the UE may not select/reselect, for 300 seconds, cell(s) that uses the same frequency as the cell. When the intraFreqReselection field value included in the MIB is set to "allowed", the UE may select cell(s) when the cell(s) satisfies the cell reselection criteria, the cell(s) using uses the same frequency as the cell.

When the selected candidate target cell broadcasts the SIB1 in 3c-35, the UE may attempt to receive the SIB1 in 3c-65.

When the UE cannot obtain the SIB1, the UE may perform, in 3c-70, the seventh operation described in 3c-55.

When the UE receives the SIB1 (Upon reception of the SIB), the UE may determine whether the corresponding cell satisfies a third condition or a fourth condition, based on the information included in the SIB1 (3c-75). The third condition and the fourth condition are as below.

Third condition: When the UE identifies FrequencyInfoUL-SIB included in the received SIB1 and does not support a bandwidth for all SCSs in scs-SpecificCarrierList Fourth condition: When the UE identifies FrequencyInfoUL-SIB included in the received SIB1 and supports a bandwidth for at least one SCS in scs-SpecificCarrierList (If the UE supports the bandwidth of at least one SCS in the scs-SpecificCarrierList in FrequencyInfoUL-SIB in SIB1)

Ninth operation: When the third condition is satisfied, in 3c-80, the UE may determine that the corresponding cell is not accessible or may consider the corresponding cell as a barred cell, and may exclude the corresponding cell from the candidate cell list of cell selection/reselection for 300 seconds. The UE may not select/reselect, for 300 seconds, cell(s) that uses the same frequency as the barred cell.

Tenth operation: When the fourth condition is satisfied, in 3c-85, the UE may determine that the corresponding cell is accessible. Then, the UE may derive a reception quality Squal and/or a reception level Srxlev of the corresponding cell by using Equation 1 based on the information included in the SIB1, and when the reception quality Squal and/or the reception level Srxlev satisfies S-criterion (Srxlev>0 AND/OR Squal>0), the UE may finally reselect the corresponding cell, or otherwise, the UE may not finally reselect the corresponding cell.

Figure 3D:
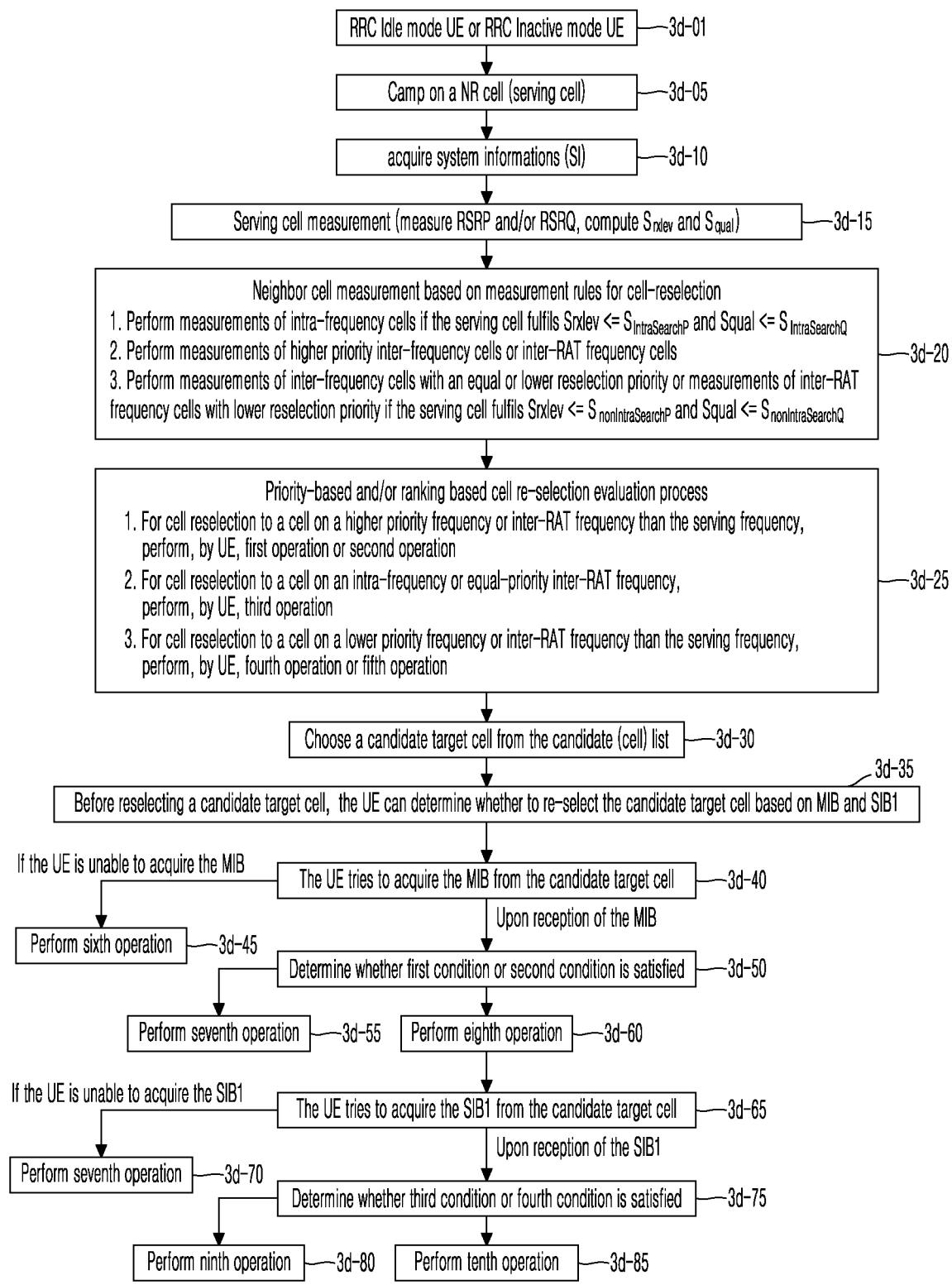
FIG. 3D illustrates a diagram for describing a cell reselection process in an RRC idle mode or an RRC inactive mode of a UE, based on system information broadcast by a BS, according to another embodiment of the disclosure.

FIG. 3D illustrates a diagram for describing a cell reselection process in an RRC idle mode or an RRC inactive mode of a UE, based on system information broadcast by a BS, according to another embodiment of the disclosure.

The UE in the RRC idle mode or the RRC inactive mode (operation 3d-01) may perform a series of operations when it camps on a serving cell (operation 3d-05).

In operation 3d-10, the UE in the RRC idle mode or the RRC inactive mode may receive system information broadcast by a BS of the serving cell. In this regard, the UE in the RRC idle mode or the RRC inactive mode may not receive system information broadcast by a BS of the neighbor cell. The system information may be divided into a master information block (MIB) and system information blocks (SIBs). In addition, the SIBs may be divided into a SIB1 and an SI message (e.g., a SIB2, a SIB3, a SIB4, a SIB5, a SIB6, a SIB7, a SIB8, or a SIB9) excluding the SIB1. The UE in the RRC idle mode or the RRC inactive mode may previously receive and read system information (e.g., the MIB or the SIB1) broadcast by a base station of a certain serving cell before the UE camps on the certain serving cell. For reference, the MIB and the SIB1 may be system information to be commonly applied to all UEs. The SIB2 may be system information to be commonly applied to a process of reselecting, by the UE in the RRC idle mode or the RRC inactive mode, the intra-frequency cell, the inter-frequency cell, or the inter-RAT cell. The SIB3, the SIB4, and the SIB5 may include information required for the UE in the RRC idle mode or the RRC inactive mode to reselect a cell.

The SIB1 may include information about parameters such as a minimum required reception level, a minimum required quality level, or a threshold value which is used in determining whether to measure a serving cell signal, and such information may be applied in a cell-specific manner. The SIB2, the SIB3, the SIB4, and the SIB5 may include information about parameters such as a minimum required reception level, a minimum required quality level, or a threshold value which is used in determining whether to measure a neighbor cell signal. In detail, the SIB2 may include common information for reselecting the intra-frequency cell, the inter-frequency cell, or the inter-RAT cell, the SIB3 may include information for reselecting only the intra-frequency cell, the SIB4 may include information for reselecting only the inter-frequency cell, and the SIB5 may include information for reselecting only the inter-RAT cell.

In operation 3d-15, the UE in the RRC idle mode or the RRC inactive mode may wake up in a discontinuous reception (DRX) period and may measure reference signal received power (RSRP) $Q_{rxlevmeas}$ and reference signal received quality (RSRQ) $Q_{qualmeas}$ (operation 3d-15). The UE may calculate, based on the measurement values, a reception level Srxlev and a reception quality Squal of the serving cell by using the parameters received from the SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 3d-20). In this regard, the UE in the RRC idle mode or the RRC inactive mode may not receive the system information broadcast by the BS of the neighbor cell, and may perform the neighbor cell measurement by using the system information broadcast by the serving cell that the UE currently camps on. When the reception level Srxlev and the reception quality Squal of the serving cell which are measured in operation 3d-15 are lower than a threshold value (Srxlev≤$S_{IntraSearchP}$ and Squal≤$S_{IntraSearchQ}$), the UE in the RRC idle mode or the RRC inactive mode may measure intra-frequency cells using a same frequency as the serving cell (operation 3d-20). That is, a reception quality Squal or a reception level Srxlev of each intra-frequency cell using the same frequency as the serving cell may be derived based on the SIB2 or/and the SIB3 broadcast by the serving cell (application of Equation 1).

For reference, information about threshold values of $S_{IntraSearchP}$ and $S_{IntraSearchQ}$ is included in the SIB2. Also, regardless of a quality of the serving cell, the neighbor cell measurement may be performed on inter-frequency and inter-RAT cells having priorities higher than a frequency of the current serving cell (operation 3d-20). The UE may obtain information about the priorities from a dedicated RRC message (e.g., an RRCRelease message) from the BS or the system information. A reception quality Squal or a reception level Srxlev of each of inter-frequency cells having a priority higher than the frequency of the serving cell may be derived (according to Equation 1) based on the SIB4 broadcast by the serving cell, and a reception quality Squal or a reception level Srxlev of each of inter-RAT cells having a priority higher than the frequency of the serving cell may be derived (according to Equation 1) based on the SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell, which are measured in operation 3d-15, are lower than a threshold value (Srxlex≤$S_{nonIntraSearchP}$ and Squal≤$S_{IntraSearchQ}$), the UE in the RRC idle mode or the RRC inactive mode may measure neighbor inter-frequency cells using a frequency different from the serving cell or neighbor inter-RAT cells using a RAT different from that of the serving cell (3d-20). That is, a reception quality Squal or a reception level Srxlev of at least one inter-frequency cell having a priority equal to or lower than the frequency of the serving cell is derived (according to Equation 1) based on the SIB4 broadcast by the serving cell, and a reception quality Squal or a reception level Srxlev of at least one inter-RAT cell having a priority lower than the frequency of the serving cell is derived (according to Equation 1) based on the SIB5 broadcast by the serving cell. For reference, information about threshold values of $S_{nonIntraSearchP}$ and $S_{nonIntraSearchQ}$ is included in the SIB2.

The UE in the RRC idle mode or the RRC inactive mode may perform a cell reselection evaluation process based on a cell reselection priority and/or a ranking, based on measurement values of neighbor cells (obtained in 3d-20) (3d-25). That is, when a plurality of cells fulfilling cell reselection criteria have different priorities, reselection of frequency/RAT cells having a higher priority precedes reselection of frequency/RAT cells having a lower priority (Cell reselection to a higher priority RAT frequency shall take precede over a lower priority RAT/frequency if multiple cells of different priorities fulfill the cell reselection criteria). Priority information is included in the system information (the SIB2, the SIB4, and the SIB5) broadcast by the serving cell or is included in an RRCRelease message received when the UE transits from a RRC connected mode to the RRC idle mode or the RRC inactive mode. The information about the priorities which is included in the RRCRelease message may have a priority over information about priorities which is included in system information broadcast by the serving cell. Operations of the UE with respect to a cell reselection evaluation process for inter-frequency/inter-RAT cells having a priority higher than the frequency of the serving cell will now be described below.

First Operation:
  In a case where the SIB2 including a threshold value of threshServingLowQ is broadcast and 1 second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ (Squal>$Thresh_{X,HighQ}$ during time interval $Treselection_{RAT}$), the UE may perform reselection with respect to the inter-frequency or inter-RAT cell.

Second Operation:
  When the UE cannot perform the first operation, the UE may perform the second operation.
  When 1 second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ (Srxlev>$Thresh_{X,HighP}$ during time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Threh_{X,HighQ}$ and $Thresh_{X,HighP}$, and $Treselection_{RAT}$ of the inter-frequency cell, i.e., information included in the SIB4 broadcast by the serving cell. Also, the UE may perform the first operation or the second operation, based on values of a reception quality Squal, a reception level Srxlev, threshold values $Threh_{X,HighQ}$ and $Thresh_{X,HighP}$, and $Treselection_{RAT}$ of the inter-RAT cell, i.e., information included in the SIB5 broadcast by the serving cell.

Also, operations of the UE with respect to a ranking-based cell reselection evaluation process for intra-frequency cells belonging to the frequency of the current serving cell or inter-frequency cells having a priority equal to the frequency of the current serving cell will now be described below.

Third Operation:
  When a reception quality Squal and a reception level Srxlev of each of the intra-frequency/inter-frequency cells are greater than 0, the UE may derive rankings of respective cells based on measurement values of RSRPs (The UE shall perform ranking of all cells that fulfills the cell selection criterion S). Rankings of the serving cell and a neighbor cell may be respectively calculated by using Equation 2 described above.

In aforementioned Equation 2, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and $Q_{offset}$ indicates an offset between the serving cell and the neighbor cell. The SIB2 includes a $Q_{hyst}$ value, and the $Q_{hyst}$ value may be commonly used in reselecting intra-frequency/inter-frequency cells. When the intra-frequency cell is reselected, $Q_{offset}$ (is signaled according to each cell, is applied only to a designated cell, and is included in the SIB3. When the inter-frequency cell is reselected, $Q_{offset}$ is signaled according to each cell, is applied only to a designated cell, and is included in the SIB4. When a ranking of a neighbor cell which is derived according to Equation 2 is greater than a ranking of the serving cell (i.e., $R_n$>$R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:

In a case where the SIB2 including a threshold value of threshServingLowQ is broadcast and 1 second has elapsed after the UE camped on the current serving cell, when a reception quality Squal of the current serving cell is less than a threshold value $Thresh_{Serving, LowQ}$ ($Squal<Thresh_{Serving, LowQ}$) and a reception quality Squal of an inter-frequency or inter-RAT cell is higher than a threshold value $Thresh_{X, LowQ}$ during a specific time interval $Treselection_{RAT}$ ($Squal>Thresh_{X,LowQ}$ during a time interval $Treselection_{RAT}$), the UE may perform reselection with respect to the inter-frequency or inter-RAT cell.

Fifth Operation:

When the UE cannot perform the fourth operation, the UE may perform the fifth operation.

When 1 second has elapsed after the UE camped on the current serving cell, a reception level Srxlev of the current serving cell is lower than a threshold value $Thresh_{Serving, LowP}$ ($Srxlev<Thresh_{Serving, LowP}$), and a reception level Srxlev of the inter-frequency or inter-RAT cell is higher than a threshold value $Thresh_{X, LowQ}$ during a specific time interval $Treselection_{RAT}$ ($Srxlev>Thresh_{X,LowP}$ during a time interval $Treselection_{RAT}$), the UE may perform reselection with respect to the inter-frequency or inter-RAT cell.

In this regard, the fourth operation or the fifth operation by the UE with respect to the inter-frequency cell may be performed based on the threshold values $Thresh_{Serving, LowQ}$ and $Thresh_{Serving, LowP}$ included in the SIB2 broadcast by the serving cell, and the reception quality Squal, the reception level Srxlev, and the threshold values $Threh_{X, LowQ}$ and $Thresh_{X, LowP}$ of the inter-frequency cell which are included in the SIB4 broadcast by the serving cell. The fourth operation or the fifth operation by the UE with respect to the inter-RAT cell may be performed based on the threshold values $Thresh_{Serving, LowQ}$ and $Thresh_{Serving, LowP}$ included in the SIB2 broadcast by the serving cell, and the reception quality Squal, the reception level Srxlev, and the threshold values $Thresh_{X,LowQ}$ and $Thresh_{X, LowP}$ of the inter-RAT cell which are included in the SIB5 broadcast by the serving cell. For example, the SIB4 includes a $Q_{qualmin}$ value or a $Q_{rxlevmin}$ value, and the reception quality Squal or the reception level Srxlev of the inter-frequency cell may be derived based on the values.

In 3d-30, the UE may derive a candidate cell list, and then may select a candidate target cell based on a priority and/or a ranking from the candidate cell list. When the candidate target cell is selected, in 3d-35, the UE in the RRC idle mode or the RRC inactive mode may determine whether to select a corresponding cell by attempting to receive the MIB and the SIB1 broadcast by the corresponding cell before the UE finally selects the corresponding cell. At this time, the UE performs operations below.

When the selected candidate target cell broadcasts the MIB in 3d-35, the UE may attempt to receive the MIB in 3d-40.

When the UE cannot obtain the MIB, the UE may perform a sixth operation in 3d-45.

Sixth Operation: The UE may consider a cell status of the corresponding cell to be barred, and may exclude the corresponding cell from the candidate cell list of cell selection/reselection for 300 seconds (the UE shall or may exclude the barred cell as a candidate for cell selection/reselection for up to 300 seconds). When a reception quality Squal and/or a reception level Srxlev of another cell which are derived according to Equation 1, the other cell using the same frequency as the corresponding cell, is greater than 0 and/or satisfies the cell reselection criteria, the UE may select the other cell (the UE may select another cell on the same frequency if the selection criteria and/or cell reselection criteria are fulfilled).

When the UE receives the MIB (Upon reception of the MIB), the UE may determine whether the corresponding cell satisfies a first condition or a second condition, based on the information included in the MIB (3d-50).

First condition: When a cellBarred field value included in the received MIB is set to "barred" and/or PDCCH-ConfigSIB1 is not supported.

Second condition: A condition that does not correspond to the first condition

Seventh operation: When the first condition is satisfied, in 3d-55, the UE may consider the corresponding cell as a barred cell, and may exclude the barred cell from the candidate cell list of cell selection/reselection for 300 seconds. When an intraFreqReselection field value included in the MIB is set to "notAllowed", the UE may not select/reselect, for 300 seconds, cell(s) that uses the same frequency as the barred cell. When the intraFreqReselection field value included in the MIB is set to "allowed", the UE may select cell(s) when the cell(s) satisfies the cell reselection criteria, the cell(s) using uses the same frequency as the barred cell.

Eighth operation: When the second condition is satisfied, in 3d-60, the UE may consider the corresponding cell as an allowed cell, and may determine the corresponding cell to be a candidate cell with respect to cell selection/reselection. When the intraFreqReselection field value included in the MIB is set to "notAllowed", the UE may not select/reselect, for 300 seconds, cell(s) that uses the same frequency as the cell. When the intraFreqReselection field value included in the MIB is set to "allowed", the UE may select cell(s) when the cell(s) satisfies the cell reselection criteria, the cell(s) using uses the same frequency as the cell.

When the selected candidate target cell broadcasts the SIB1 in 3d-35, the UE may attempt to receive the SIB1 in 3d-65.

When the UE cannot obtain the SIB1, the UE may perform, in 3d-70, the seventh operation described in 3d-55.

When the UE receives the SIB1 (Upon reception of the SIB1), the UE may determine whether the corresponding cell satisfies a third condition or a fourth condition, based on the information included in the SIB1 (3d-75). The third condition and the fourth condition are as below.

Third condition: When the UE identifies all of FrequencyInfoUL-SIB and FrequencyInfoDL-SIB included in the received SIB1 and does not support a bandwidth for all SCSs in scs-SpecificCarrierList Fourth condition: When the UE identifies FrequencyInfoUL-SIB and FrequencyInfoDL-SIB included in the received SIB1 and supports a bandwidth for at least one SCS in scs-SpecificCarrierList (If the UE supports the bandwidth of at least one SCS in the scs-SpecificCarrierList in FrequencyInfoUL-SIB in SIB1 and the bandwidth of at least one SCS in the scs-SpecificCarrierList in FrequencyInfoDL-SIB in SIB1)

Ninth operation: When the third condition is satisfied, in 3d-80, the UE may determine that the corresponding cell is not accessible or may consider the corresponding cell as a barred cell, and may exclude the corresponding cell from the candidate cell list of cell selection/reselection for 300 seconds. The UE may not select/reselect, for 300 seconds, cell(s) that uses the same frequency as the barred cell.

Tenth operation: When the fourth condition is satisfied, in 3d-85, the UE may determine that the corresponding cell is accessible. Then, the UE may derive a reception quality Squal and/or a reception level Srxlev of the corresponding cell by using Equation 1 based on the information included in the SIB1, and when the reception quality Squal and/or the reception level Srxlev satisfies S-criterion (Srxlev>0 AND/OR Squal>0), the UE may finally reselect the corresponding cell, or otherwise, the UE may not finally reselect the corresponding cell.

Figure 3E:
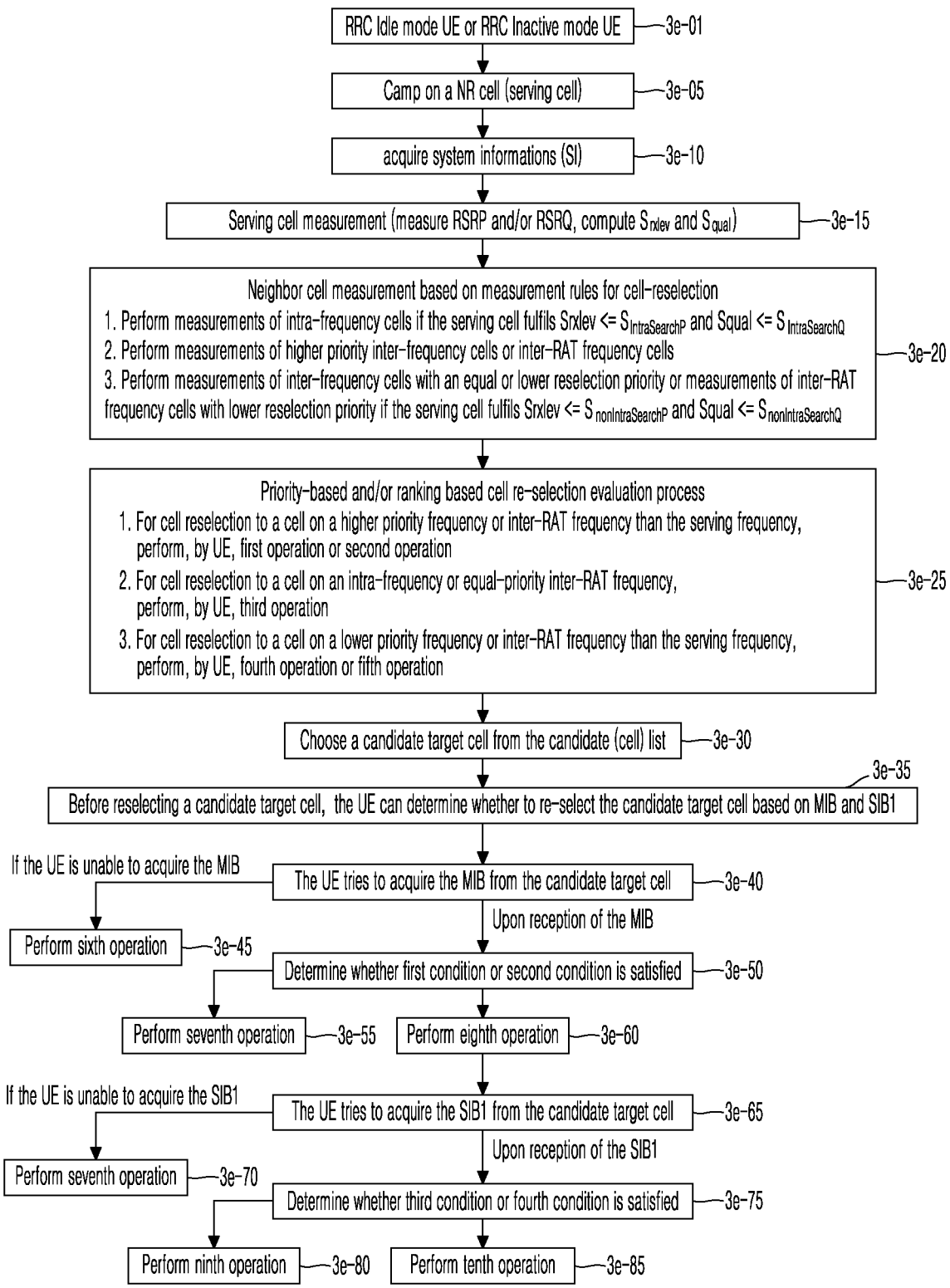
FIG. 3E illustrates a diagram for describing a cell reselection process in an RRC idle mode or an RRC inactive mode of a UE, based on system information broadcast by a BS, according to another embodiment of the disclosure.

FIG. 3E illustrates a diagram for describing a cell reselection process in an RRC idle mode or an RRC inactive mode of a UE, based on system information broadcast by a BS, according to another embodiment of the disclosure.

The UE in the RRC idle mode or the RRC inactive mode (operation 3e-01) may perform a series of operations when it camps on a serving cell (operation 3e-05).

In operation 3e-10, the UE in the RRC idle mode or the RRC inactive mode may receive system information broadcast by a BS of the serving cell. In this regard, the UE in the RRC idle mode or the RRC inactive mode may not receive system information broadcast by a BS of the neighbor cell. The system information may be divided into a master information block (MIB) and system information blocks (SIBs). In addition, the SIBs may be divided into a SIB1 and an SI message (e.g., a SIB2, a SIB3, a SIB4, a SIB5, a SIB6, a SIB7, a SIB8, or a SIB9) excluding the SIB1. The UE in the RRC idle mode or the RRC inactive mode may previously receive and read system information (e.g., the MIB or the SIB1) broadcast by a base station of a certain serving cell before the UE camps on the certain serving cell. For reference, the MIB and the SIB1 may be system information to be commonly applied to all UEs. The SIB2 may be system information to be commonly applied to a process of reselecting, by the UE in the RRC idle mode or the RRC inactive mode, the intra-frequency cell, the inter-frequency cell, or the inter-RAT cell. The SIB3, the SIB4, and the SIB5 may include information required for the UE in the RRC idle mode or the RRC inactive mode to reselect a cell.

The SIB1 may include information about parameters such as a minimum required reception level, a minimum required quality level, or a threshold value which is used in determining whether to measure a serving cell signal, and such information may be applied in a cell-specific manner. The SIB2, the SIB3, the SIB4, and the SIB5 may include information about parameters such as a minimum required reception level, a minimum required quality level, or a threshold value which is used in determining whether to measure a neighbor cell signal. In detail, the SIB2 may include common information for reselecting the intra-frequency cell, the inter-frequency cell, or the inter-RAT cell, the SIB3 may include information for reselecting only the intra-frequency cell, the SIB4 may include information for reselecting only the inter-frequency cell, and the SIB5 may include information for reselecting only the inter-RAT cell.

In operation 3e-15, the UE in the RRC idle mode or the RRC inactive mode may wake up in a discontinuous reception (DRX) period and may measure reference signal received power (RSRP) $Q_{rxlevmeas}$ and reference signal received quality (RSRQ) $Q_{qualmeas}$ (operation 3e-15). The UE may calculate, based on the measurement values, a reception level Srxlev and a reception quality Squal of the serving cell by using the parameters received from the SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 3e-20). In this regard, the UE in the RRC idle mode or the RRC inactive mode may not receive the system information broadcast by the BS of the neighbor cell, and may perform the neighbor cell measurement by using the system information broadcast by the serving cell that the UE currently camps on. When the reception level Srxlev and the reception quality Squal of the serving cell which are measured in operation 3e-15 are lower than a threshold value (Srxlev≤$S_{IntraSearchP}$ and Squal≤$S_{IntraSearchQ}$), the UE in the RRC idle mode or the RRC inactive mode may measure intra-frequency cells using a same frequency as the serving cell (operation 3e-20). That is, a reception quality Squal or a reception level Srxlev of each intra-frequency cell using the same frequency as the serving cell may be derived based on the SIB2 or/and the SIB3 broadcast by the serving cell (application of Equation 1).

For reference, information about threshold values of $S_{IntraSearchP}$ and $S_{IntraSearchQ}$ is included in the SIB2. Also, regardless of a quality of the serving cell, the neighbor cell measurement may be performed on inter-frequency and inter-RAT cells having priorities higher than a frequency of the current serving cell (operation 3e-20). The UE may obtain information about the priorities from a dedicated RRC message (e.g., an RRCRelease message) from the BS or the system information. A reception quality Squal or a reception level Srxlev of each of inter-frequency cells having a priority higher than the frequency of the serving cell may be derived (according to Equation 1) based on the SIB4 broadcast by the serving cell, and a reception quality Squal or a reception level Srxlev of each of inter-RAT cells having a priority higher than the frequency of the serving cell may be derived (according to Equation 1) based on the SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell, which are measured in operation 3e-15, are lower than a threshold value (Srxlex≤) $S_{nonIntraSearchP}$ and Squal≤) $S_{intraSearchQ}$), the UE in the RRC idle mode or the RRC inactive mode may measure neighbor inter-frequency cells using a frequency different from the serving cell or neighbor inter-RAT cells using a RAT different from that of the serving cell (3e-20). That is, a reception quality Squal or a reception level Srxlev of at least one inter-frequency cell having a priority equal to or lower than the frequency of the serving cell is derived (according to Equation 1) based on the SIB4 broadcast by the serving cell, and a reception quality Squal or a reception level Srxlev of at least one inter-RAT cell having a priority lower than the frequency of the serving cell is derived (according to Equation 1) based on the SIB5 broadcast by the serving cell. For reference, information about threshold values of $S_{nonIntraSearchP}$ and $S_{nonIntraSearchQ}$ is included in the SIB2.

The UE in the RRC idle mode or the RRC inactive mode may perform a cell reselection evaluation process based on a cell reselection priority and/or a ranking, based on measurement values of neighbor cells (obtained in 3e-20) (3e-25). That is, when a plurality of cells fulfilling cell reselection criteria have different priorities, reselection of frequency/RAT cells having a higher priority precedes reselection of frequency/RAT cells having a lower priority (Cell reselection to a higher priority RAT/frequency shall take precede over a lower priority RAT/frequency if multiple cells of different priorities fulfill the cell reselection criteria). Priority information is included in the system information (the SIB2, the SIB4, and the SIB5) broadcast by the serving cell or is included in an RRCRelease message received when the UE transits from a RRC connected mode to the RRC idle mode or the RRC inactive mode. The information about the priorities which is included in the RRCRelease message may have a priority over information about priorities which is included in system information broadcast by the serving cell. Operations of the UE with respect to a cell reselection evaluation process for inter-frequency/inter-RAT cells having a priority higher than the frequency of the serving cell will now be described below.

First Operation:

In a case where the SIB2 including a threshold value of threshServingLowQ is broadcast and 1 second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ ($Squal>Thresh_{X,HighQ}$ during time interval $Treselection_{RAT}$), the UE may perform reselection with respect to the inter-frequency or inter-RAT cell.

Second Operation:

When the UE cannot perform the first operation, the UE may perform the second operation.

When 1 second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ ($Srxlev>Thresh_{X,HighP}$ during time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Threh_{X,HighQ}$ and $Thresh_{X,HighP}$, and $Treselection_{RAT}$ of the inter-frequency cell, i.e., information included in the SIB4 broadcast by the serving cell. Also, the UE may perform the first operation or the second operation, based on values of a reception quality Squal, a reception level Srxlev, threshold values $Threh_{X,HighQ}$ and $Thresh_{X,HighP}$, and $Treselection_{RAT}$ of the inter-RAT cell, i.e., information included in the SIB5 broadcast by the serving cell.

Also, operations of the UE with respect to a ranking-based cell reselection evaluation process for intra-frequency cells belonging to the frequency of the current serving cell or inter-frequency cells having a priority equal to the frequency of the current serving cell will now be described below.

Third Operation:

When a reception quality Squal and a reception level Srxlev of each of the intra-frequency/inter-frequency cells are greater than 0, the UE may derive rankings of respective cells based on measurement values of RSRPs (The UE shall perform ranking of all cells that fulfills the cell selection criterion S). Rankings of the serving cell and a neighbor cell may be respectively calculated by using Equation 2 described above.

In aforementioned Equation 2, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and Qoffset indicates an offset between the serving cell and the neighbor cell. The SIB2 includes a $Q_{hyst}$ value, and the $Q_{hyst}$ value may be commonly used in reselecting intra-frequency/inter-frequency cells. When the intra-frequency cell is reselected, $Q_{offset}$ (is signaled according to each cell, is applied only to a designated cell, and is included in the SIB3. When the inter-frequency cell is reselected, $Q_{offset}$ is signaled according to each cell, is applied only to a designated cell, and is included in the SIB4. When a ranking of a neighbor cell which is derived according to Equation 2 is greater than a ranking of the serving cell (i.e., $R_n>R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:

In a case where the SIB2 including a threshold value of threshServingLowQ is broadcast and 1 second has elapsed after the UE camped on the current serving cell, when a reception quality Squal of the current serving cell is less than a threshold value $Thresh_{Serving, LowQ}$ ($Squal<Thresh_{Serving, LowQ}$) and a reception quality Squal of an inter-frequency or inter-RAT cell is higher than a threshold value $Thresh_{X, LowQ}$ during a specific time interval $Treselection_{RAT}$ ($Squal>Thresh_{X,LowQ}$ during a time interval $Treselection_{RAT}$), the UE may perform reselection with respect to the inter-frequency or inter-RAT cell.

Fifth Operation:

When the UE cannot perform the fourth operation, the UE may perform the fifth operation.

When 1 second has elapsed after the UE camped on the current serving cell, a reception level Srxlev of the current serving cell is lower than a threshold value $Thresh_{Serving, LowP}$ ($Srxlev<Thresh_{Serving, LowP}$), and a reception level Srxlev of the inter-frequency or inter-RAT cell is higher than a threshold value $Thresh_{X, LowQ}$ during a specific time interval $Treselection_{RAT}$ ($Srxlev>Thresh_{X,LowP}$ during a time interval $Treselection_{RAT}$), the UE may perform reselection with respect to the inter-frequency or inter-RAT cell.

In this regard, the fourth operation or the fifth operation by the UE with respect to the inter-frequency cell may be performed based on the threshold values $Thresh_{Serving, LowQ}$ and $Thresh_{Serving, LowP}$ included in the SIB2 broadcast by the serving cell, and the reception quality Squal, the reception level Srxlev, and the threshold values $Threh_{X, LowQ}$ and $Thresh_{X, LowP}$ of the inter-frequency cell which are included in the SIB4 broadcast by the serving cell. The fourth operation or the fifth operation by the UE with respect to the inter-RAT cell may be performed based on the threshold values $Thresh_{Serving, LowQ}$ and $Thresh_{Serving, LowP}$ included in the SIB2 broadcast by the serving cell, and the reception quality Squal, the reception level Srxlev, and the threshold values $Thresh_{X,LowQ}$ and $Thresh_{X, LowP}$ of the inter-RAT cell which are included in the SIB5 broadcast by the serving cell. For example, the SIB4 includes a $Q_{qualmin}$ value or a $Q_{rxlevmin}$ value, and the reception quality Squal or the reception level Srxlev of the inter-frequency cell may be derived based on the values.

In 3e-30, the UE may derive a candidate cell list, and then may select a candidate target cell based on a priority and/or a ranking from the candidate cell list. When the candidate target cell is selected, in 3e-35, the UE in the RRC idle mode or the RRC inactive mode may determine whether to select a corresponding cell by attempting to receive the MIB and the SIB1 broadcast by the corresponding cell before the UE finally selects the corresponding cell. At this time, the UE performs operations below.

When the selected candidate target cell broadcasts the MIB in 3e-35, the UE may attempt to receive the MIB in 3e-40.

When the UE cannot obtain the MIB, the UE may perform a sixth operation in 3e-45.

Sixth Operation: The UE may consider a cell status of the corresponding cell to be barred, and may exclude the corresponding cell from the candidate cell list of cell selection/reselection for 300 seconds (the UE shall or may exclude the barred cell as a candidate for cell selection/reselection for up to 300 seconds). When a reception quality Squal and/or a reception level Srxlev of another cell which are derived according to Equation 1, the other cell using the same frequency as the corresponding cell, is greater than 0 and/or satisfies the cell reselection criteria, the UE may select the other cell (the UE may select another cell on the same frequency if the selection criteria and/or cell reselection criteria are fulfilled).

When the UE receives the MIB (Upon reception of the MIB), the UE may determine whether the corresponding cell satisfies a first condition or a second condition, based on the information included in the MIB (3e-50).

First condition: When a cellBarred field value included in the received MIB is set to "barred" and/or PDCCH-ConfigSIB1 is not supported.

Second condition: A condition that does not correspond to the first condition

Seventh operation: When the first condition is satisfied, in 3e-55, the UE may consider the corresponding cell as a barred cell, and may exclude the barred cell from the candidate cell list of cell selection/reselection for 300 seconds. When an intraFreqReselection field value included in the MIB is set to "notAllowed", the UE may not select/reselect, for 300 seconds, cell(s) that uses the same frequency as the barred cell. When the intraFreqReselection field value included in the MIB is set to "allowed", the UE may select cell(s) when the cell(s) satisfies the cell reselection criteria, the cell(s) using uses the same frequency as the barred cell.

Eighth operation: When the second condition is satisfied, in 3e-60, the UE may consider the corresponding cell as an allowed cell, and may determine the corresponding cell to be a candidate cell with respect to cell selection/reselection. When the intraFreqReselection field value included in the MIB is set to "notAllowed", the UE may not select/reselect, for 300 seconds, cell(s) that uses the same frequency as the cell. When the intraFreqReselection field value included in the MIB is set to "allowed", the UE may select cell(s) when the cell(s) satisfies the cell reselection criteria, the cell(s) using uses the same frequency as the cell.

When the selected candidate target cell broadcasts the SIB1 in 3e-35, the UE may attempt to receive the SIB1 in 3e-65.

When the UE cannot obtain the SIB1, the UE may perform, in 3e-70, the seventh operation described in 3e-55.

When the UE receives the SIB1 (Upon reception of the SIB1), the UE may determine whether the corresponding cell satisfies a third condition or a fourth condition, based on the information included in the MIB and the SIB1 (3e-75). The third condition and the fourth condition are as below.

Third condition: When the UE identifies a SCS value configured in subCarrierSpacingCommon of the received MIB, and does not support Bandwidth of initial DL BWP using the SCS value in configured location AndBandwidth in the received SIB1

Fourth condition: When the UE identifies a SCS value configured in subCarrierSpacingCommon of the received MIB, and supports Bandwidth of initial DL BWP using the SCS value in configured locationAndBandwidth in the received SIB1 (If the UE supports the bandwidth of the initial DL BWP in locationAndBandwidth in SIB1)

Ninth operation: When the third condition is satisfied, in 3e-80, the UE may determine that the corresponding cell is not accessible or may consider the corresponding cell as a barred cell, and may exclude the corresponding cell from the candidate cell list of cell selection/reselection for 300 seconds. The UE may not select/reselect, for 300 seconds, cell(s) that uses the same frequency as the barred cell.

Tenth operation: When the fourth condition is satisfied, in 3e-85, the UE may determine that the corresponding cell is accessible. Then, the UE may derive a reception quality Squal and/or a reception level Srxlev of the corresponding cell by using Equation 1 based on the information included in the SIB1, and when the reception quality Squal and/or the reception level Srxlev satisfies S-criterion (Srxlev>0 AND/OR Squal>0), the UE may finally reselect the corresponding cell, or otherwise, the UE may not finally reselect the corresponding cell.

Figure 3F:
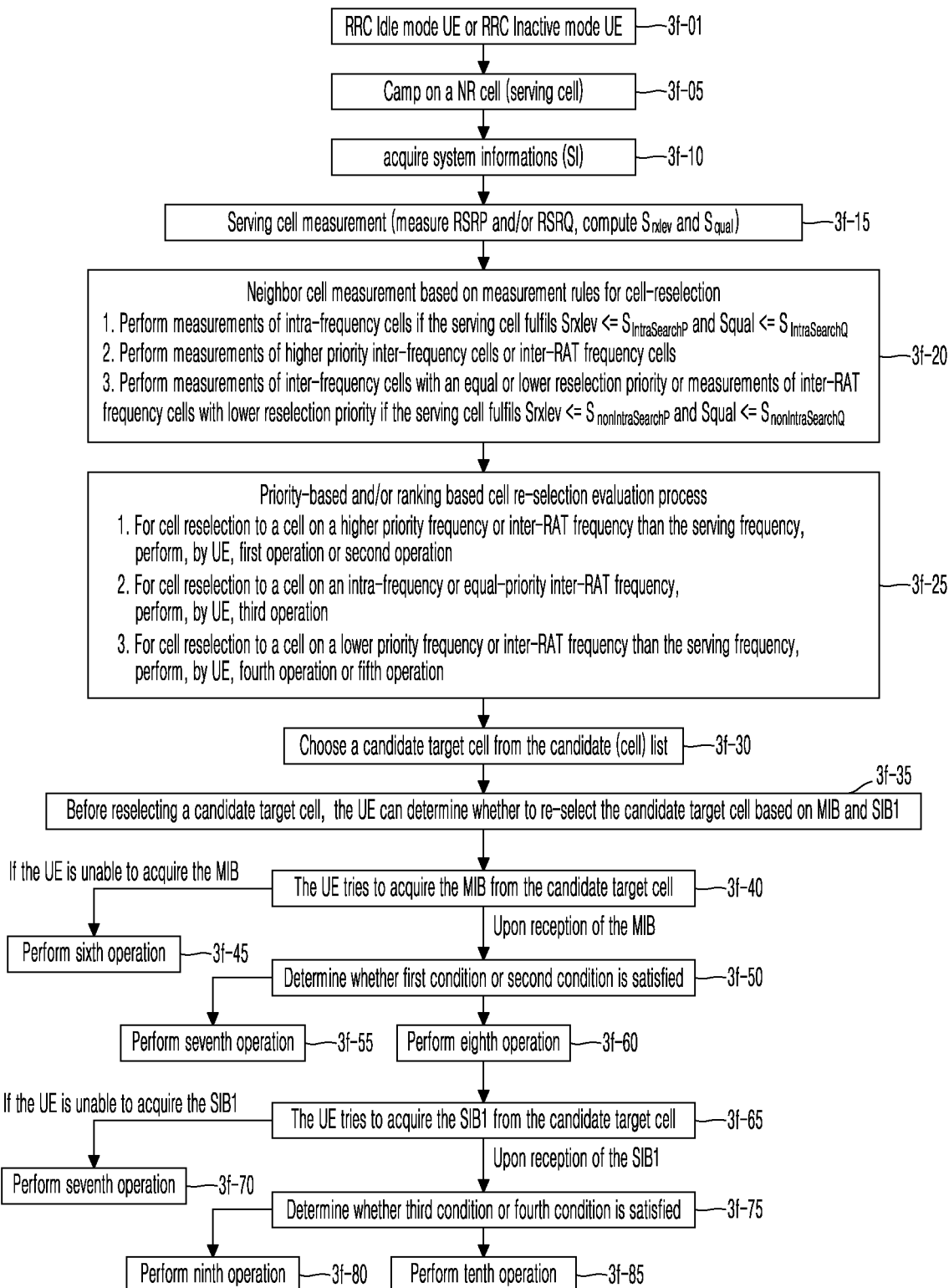
FIG. 3F illustrates a diagram for describing a cell reselection process in an RRC idle mode or an RRC inactive mode of a UE, based on system information broadcast by a BS, according to another embodiment of the disclosure.

FIG. 3F illustrates a diagram for describing a cell reselection process in an RRC idle mode or an RRC inactive mode of a UE, based on system information broadcast by a BS, according to another embodiment of the disclosure.

The UE in the RRC idle mode or the RRC inactive mode (operation 3f-01) may perform a series of operations when it camps on a serving cell (operation 3f-05).

In operation 3f-10, the UE in the RRC idle mode or the RRC inactive mode may receive system information broadcast by a BS of the serving cell. In this regard, the UE in the RRC idle mode or the RRC inactive mode may not receive system information broadcast by a BS of the neighbor cell. The system information may be divided into a master information block (MIB) and system information blocks (SIBs). In addition, the SIBs may be divided into a SIB1 and an SI message (e.g., a SIB2, a SIB3, a SIB4, a SIB5, a SIB6, a SIB7, a SIB8, or a SIB9) excluding the SIB1. The UE in the RRC idle mode or the RRC inactive mode may previously receive and read system information (e.g., the MIB or the SIB1) broadcast by a base station of a certain serving cell before the UE camps on the certain serving cell. For reference, the MIB and the SIB1 may be system information to be commonly applied to all UEs. The SIB2 may be system information to be commonly applied to a process of reselecting, by the UE in the RRC idle mode or the RRC inactive mode, the intra-frequency cell, the inter-frequency cell, or the inter-RAT cell. The SIB3, the SIB4, and the SIB5 may include information required for the UE in the RRC idle mode or the RRC inactive mode to reselect a cell.

The SIB1 may include information about parameters such as a minimum required reception level, a minimum required quality level, or a threshold value which is used in determining whether to measure a serving cell signal, and such information may be applied in a cell-specific manner. The SIB2, the SIB3, the SIB4, and the SIB5 may include information about parameters such as a minimum required reception level, a minimum required quality level, or a threshold value which is used in determining whether to measure a neighbor cell signal. In detail, the SIB2 may include common information for reselecting the intra-frequency cell, the inter-frequency cell, or the inter-RAT cell, the SIB3 may include information for reselecting only the intra-frequency cell, the SIB4 may include information for reselecting only the inter-frequency cell, and the SIB5 may include information for reselecting only the inter-RAT cell.

In operation 3f-15, the UE in the RRC idle mode or the RRC inactive mode may wake up in a discontinuous reception (DRX) period and may measure reference signal received power (RSRP) $Q_{rxlevmeas}$ and reference signal received quality (RSRQ) $Q_{qualmeas}$ (operation 3f-15). The UE may calculate, based on the measurement values, a reception level Srxlev and a reception quality Squal of the serving cell by using the parameters received from the SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 3f-20). In this regard, the UE in the RRC idle mode or the RRC inactive mode may not receive the system information broadcast by the BS of the neighbor cell, and may perform the neighbor cell measurement by using the system information broadcast by the serving cell that the UE currently camps on. When the reception level Srxlev and the reception quality Squal of the serving cell which are measured in operation 3f-15 are lower than a threshold value (Srxlev≤$S_{IntraSearchP}$ and Squal≤$S_{IntraSearchQ}$), the UE in the RRC idle mode or the RRC inactive mode may measure intra-frequency cells using a same frequency as the serving cell (operation 3f-20). That is, a reception quality Squal or a reception level Srxlev of each intra-frequency cell using the same frequency as the serving cell may be derived based on the SIB2 or/and the SIB3 broadcast by the serving cell (application of Equation 1).

For reference, information about threshold values of $S_{IntraSearchP}$ and $S_{IntraSearchQ}$ is included in the SIB2. Also, regardless of a quality of the serving cell, the neighbor cell measurement may be performed on inter-frequency and inter-RAT cells having priorities higher than a frequency of the current serving cell (operation 3f-20). The UE may obtain information about the priorities from a dedicated RRC message (e.g., an RRCRelease message) from the BS or the system information. A reception quality Squal or a reception level Srxlev of each of inter-frequency cells having a priority higher than the frequency of the serving cell may be derived (according to Equation 1) based on the SIB4 broadcast by the serving cell, and a reception quality Squal or a reception level Srxlev of each of inter-RAT cells having a priority higher than the frequency of the serving cell may be derived (according to Equation 1) based on the SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell, which are measured in operation 3f-15, are lower than a threshold value (Srxlex≤) $S_{nonIntraSearchP}$ and Squal≤) $S_{IntraSearchQ}$), the UE in the RRC idle mode or the RRC inactive mode may measure neighbor inter-frequency cells using a frequency different from the serving cell or neighbor inter-RAT cells using a RAT different from that of the serving cell (3f-20). That is, a reception quality Squal or a reception level Srxlev of at least one inter-frequency cell having a priority equal to or lower than the frequency of the serving cell is derived (according to Equation 1) based on the SIB4 broadcast by the serving cell, and a reception quality Squal or a reception level Srxlev of at least one inter-RAT cell having a priority lower than the frequency of the serving cell is derived (according to Equation 1) based on the SIB5 broadcast by the serving cell. For reference, information about threshold values of $S_{nonIntraSearchP}$ and $S_{nonIntraSeachQ}$ is included in the SIB2.

The UE in the RRC idle mode or the RRC inactive mode may perform a cell reselection evaluation process based on a cell reselection priority and/or a ranking, based on measurement values of neighbor cells (obtained in 3f-20) (3f-25). That is, when a plurality of cells fulfilling cell reselection criteria have different priorities, reselection of frequency/RAT cells having a higher priority precedes reselection of frequency/RAT cells having a lower priority (Cell reselection to a higher priority RAT/frequency shall take precede over a lower priority RAT/frequency if multiple cells of different priorities fulfill the cell reselection criteria). Priority information is included in the system information (the SIB2, the SIB4, and the SIB5) broadcast by the serving cell or is included in an RRCRelease message received when the UE transits from a RRC connected mode to the RRC idle mode or the RRC inactive mode. The information about the priorities which is included in the RRCRelease message may have a priority over information about priorities which is included in system information broadcast by the serving cell. Operations of the UE with respect to a cell reselection evaluation process for inter-frequency/inter-RAT cells having a priority higher than the frequency of the serving cell will now be described below.

First Operation:
In a case where the SIB2 including a threshold value of threshServingLowQ is broadcast and 1 second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ (Squal>$Thresh_{X,HighQ}$ during time interval $Treselection_{RAT}$), the UE may perform reselection with respect to the inter-frequency or inter-RAT cell.

Second Operation:
When the UE cannot perform the first operation, the UE may perform the second operation.
When 1 second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ (Srxlev>$Thresh_{X, HighP}$ during time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Threh_{X, HighQ}$ and $Thresh_{X, HighP}$, and $Treselection_{RAT}$ of the inter-frequency cell, i.e., information included in the SIB4 broadcast by the serving cell. Also, the UE may perform the first operation or the second operation, based on values of a reception quality Squal, a reception level Srxlev, threshold values $Threh_{X, HighQ}$ and $Thresh_{X, HighP}$, and $Treselection_{RAT}$ of the inter-RAT cell, i.e., information included in the SIB5 broadcast by the serving cell.

Also, operations of the UE with respect to a ranking-based cell reselection evaluation process for intra-frequency cells belonging to the frequency of the current serving cell or inter-frequency cells having a priority equal to the frequency of the current serving cell will now be described below.

Third Operation:

When a reception quality Squal and a reception level Srxlev of each of the intra-frequency/inter-frequency cells are greater than 0, the UE may derive rankings of respective cells based on measurement values of RSRPs (The UE shall perform ranking of all cells that fulfills the cell selection criterion S). Rankings of the serving cell and a neighbor cell may be respectively calculated by using Equation 2 described above.

In aforementioned Equation 2, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and $Q_{offset}$ indicates an offset between the serving cell and the neighbor cell. The SIB2 includes a $Q_{hyst}$ value, and the $Q_{hyst}$ value may be commonly used in reselecting intra-frequency/inter-frequency cells. When the intra-frequency cell is reselected, $Q_{offset}$ (is signaled according to each cell, is applied only to a designated cell, and is included in the SIB3. When the inter-frequency cell is reselected, $Q_{offset}$ is signaled according to each cell, is applied only to a designated cell, and is included in the SIB4. When a ranking of a neighbor cell which is derived according to Equation 2 is greater than a ranking of the serving cell (i.e., $R_n > R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:

In a case where the SIB2 including a threshold value of threshServingLowQ is broadcast and 1 second has elapsed after the UE camped on the current serving cell, when a reception quality Squal of the current serving cell is less than a threshold value $Thresh_{Serving, LowQ}$ (Squal<$Thresh_{Serving, LowQ}$) and a reception quality Squal of an inter-frequency or inter-RAT cell is higher than a threshold value $Thresh_{X, LowQ}$ during a specific time interval $Treselection_{RAT}$ (Squal>$Thresh_{X,LowQ}$ during a time interval $Treselection_{RAT}$), the UE may perform reselection with respect to the inter-frequency or inter-RAT cell.

Fifth Operation:

When the UE cannot perform the fourth operation, the UE may perform the fifth operation.

When 1 second has elapsed after the UE camped on the current serving cell, a reception level Srxlev of the current serving cell is lower than a threshold value $Thresh_{Serving, LowP}$ (Srxlev<$Thresh_{Serving, LowP}$), and a reception level Srxlev of the inter-frequency or inter-RAT cell is higher than a threshold value $Thresh_{X, LowQ}$ during a specific time interval $Treselection_{RAT}$ (Srxlev>$Thresh_{X,LowP}$ during a time interval $Treselection_{RAT}$), the UE may perform reselection with respect to the inter-frequency or inter-RAT cell.

In this regard, the fourth operation or the fifth operation by the UE with respect to the inter-frequency cell may be performed based on the threshold values $Thresh_{Serving, LowQ}$ and $Thresh_{Serving, LowP}$ included in the SIB2 broadcast by the serving cell, and the reception quality Squal, the reception level Srxlev, and the threshold values $Threh_{X, LowQ}$ and $Thresh_{X, LowP}$ of the inter-frequency cell which are included in the SIB4 broadcast by the serving cell. The fourth operation or the fifth operation by the UE with respect to the inter-RAT cell may be performed based on the threshold values $Thresh_{Serving, LowQ}$ and $Thresh_{Serving, LowP}$ included in the SIB2 broadcast by the serving cell, and the reception quality Squal, the reception level Srxlev, and the threshold values $Thresh_{X,LowQ}$ and $Thresh_{X, LowP}$ of the inter-RAT cell which are included in the SIB5 broadcast by the serving cell. For example, the SIB4 includes a $Q_{qualmin}$ value or a $Q_{rxlevmin}$ value, and the reception quality Squal or the reception level Srxlev of the inter-frequency cell may be derived based on the values.

In 3f-30, the UE may derive a candidate cell list, and then may select a candidate target cell based on a priority and/or a ranking from the candidate cell list. When the candidate target cell is selected, in 3f-35, the UE in the RRC idle mode or the RRC inactive mode may determine whether to select a corresponding cell by attempting to receive the MIB and the SIB1 broadcast by the corresponding cell before the UE finally selects the corresponding cell. At this time, the UE performs operations below.

When the selected candidate target cell broadcasts the MIB in 3f-35, the UE may attempt to receive the MIB in 3f-40.

When the UE cannot obtain the MIB, the UE may perform a sixth operation in 3f-45.

Sixth Operation: The UE may consider a cell status of the corresponding cell to be barred, and may exclude the corresponding cell from the candidate cell list of cell selection/reselection for 300 seconds (the UE shall or may exclude the barred cell as a candidate for cell selection/reselection for up to 300 seconds). When a reception quality Squal and/or a reception level Srxlev of another cell which are derived according to Equation 1, the other cell using the same frequency as the corresponding cell, is greater than 0 and/or satisfies the cell reselection criteria, the UE may select the other cell (the U may select another cell on the same frequency if the selection criteria and/or cell reselection criteria are fulfilled).

When the UE receives the MIB (Upon reception of the MIB), the UE may determine whether the corresponding cell satisfies a first condition or a second condition, based on the information included in the MIB (3f-50).

First condition: When a cellBarred field value included in the received MIB is set to "barred" and/or PDCCH-ConfigSIB1 is not supported.

Second condition: A condition that does not correspond to the first condition

Seventh operation: When the first condition is satisfied, in 3f-55, the UE may consider the corresponding cell as a barred cell, and may exclude the barred cell from the candidate cell list of cell selection/reselection for 300 seconds. When an intraFreqReselection field value included in the MIB is set to "notAllowed", the UE may not select/reselect, for 300 seconds, cell(s) that uses the same frequency as the barred cell. When the intraFreqReselection field value included in the MIB is set to "allowed", the UE may select cell(s) when the cell(s) satisfies the cell reselection criteria, the cell(s) using uses the same frequency as the barred cell.

Eighth operation: When the second condition is satisfied, in 3f-60, the UE may consider the corresponding cell as an allowed cell, and may determine the corresponding cell to be a candidate cell with respect to cell selection/reselection. When the intraFreqReselection field value included in the MIB is set to "notAllowed", the UE may not select/reselect, for 300 seconds, cell(s) that uses the same frequency as the cell. When the intraFreqReselection field value included in the MIB is set to "allowed", the UE may select cell(s) when the cell(s) satisfies the cell reselection criteria, the cell(s) using uses the same frequency as the cell.

When the selected candidate target cell broadcasts the SIB1 in 3*f*-35, the UE may attempt to receive the SIB1 in 3*f*-65.

When the UE cannot obtain the SIB1, the UE may perform, in 3*f*-70, the seventh operation described in 3*f*-55.

When the UE receives the SIB1 (Upon reception of the SIB1), the UE may determine whether the corresponding cell satisfies a third condition or a fourth condition, based on the information included in the MIB and the SIB1 (3*f*-75). The third condition and the fourth condition are as below.

Third condition: When the UE identifies a SCS value configured in subCarrierSpacingCommon of the received MIB, and does not support Bandwidth of initial UL BWP using the SCS value in configured locationAndBandwidth in the received SIB1

Fourth condition: When the UE identifies a SCS value configured in subCarrierSpacingCommon of the received MIB, and supports Bandwidth of initial UL BWP using the SCS value in configured locationAndBandwidth in the received SIB1 (If the UE supports the bandwidth of the initial UL BWP in locationAndBandwidth in SIB1)

Ninth operation: When the third condition is satisfied, in 3*f*-80, the UE may determine that the corresponding cell is not accessible or may consider the corresponding cell as a barred cell, and may exclude the corresponding cell from the candidate cell list of cell selection/reselection for 300 seconds. The UE may not select/reselect, for 300 seconds, cell(s) that uses the same frequency as the barred cell.

Tenth operation: When the fourth condition is satisfied, in 3*f*-85, the UE may determine that the corresponding cell is accessible. Then, the UE may derive a reception quality Squal and/or a reception level Srxlev of the corresponding cell by using Equation 1 based on the information included in the SIB1, and when the reception quality Squal and/or the reception level Srxlev satisfies S-criterion (Srxlev>0 AND/OR Squal>0), the UE may finally reselect the corresponding cell, or otherwise, the UE may not finally reselect the corresponding cell.

Figure 3G:
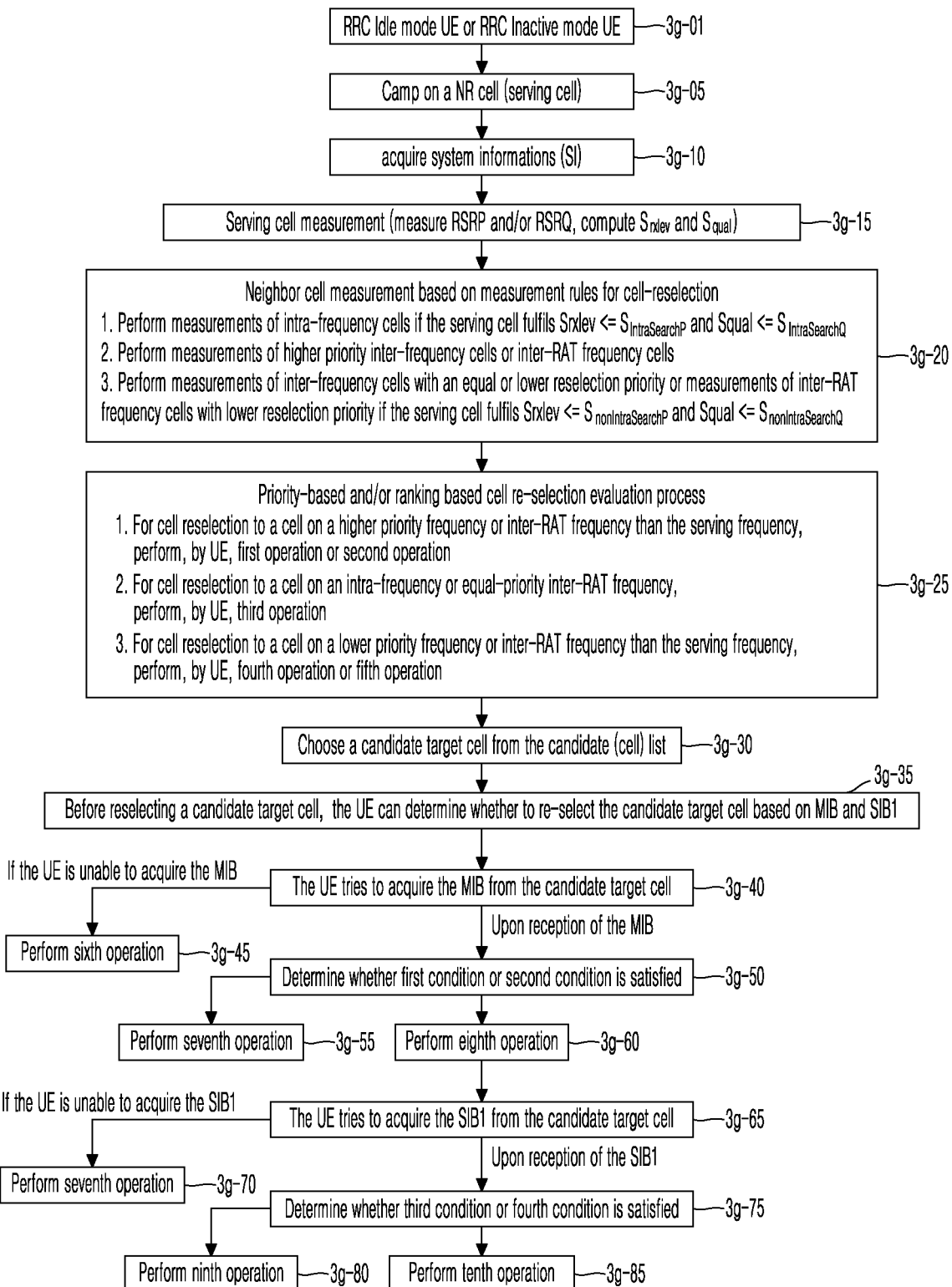
FIG. 3G illustrates a diagram for describing a cell reselection process in an RRC idle mode or an RRC inactive mode of a UE, based on system information broadcast by a BS, according to another embodiment of the disclosure.

FIG. 3G illustrates a diagram for describing a cell reselection process in an RRC idle mode or an RRC inactive mode of a UE, based on system information broadcast by a BS, according to another embodiment of the disclosure.

The UE in the RRC idle mode or the RRC inactive mode (operation 3*g*-01) may perform a series of operations when it camps on a serving cell (operation 3*g*-05).

In operation 3*g*-10, the UE in the RRC idle mode or the RRC inactive mode may receive system information broadcast by a BS of the serving cell. In this regard, the UE in the RRC idle mode or the RRC inactive mode may not receive system information broadcast by a BS of the neighbor cell. The system information may be divided into a master information block (MIB) and system information blocks (SIBs). In addition, the SIBs may be divided into a SIB1 and an SI message (e.g., a SIB2, a SIB3, a SIB4, a SIB5, a SIB6, a SIB7, a SIB8, or a SIB9) excluding the SIB1. The UE in the RRC idle mode or the RRC inactive mode may previously receive and read system information (e.g., the MIB or the SIB1) broadcast by a base station of a certain serving cell before the UE camps on the certain serving cell. For reference, the MIB and the SIB1 may be system information to be commonly applied to all UEs. The SIB2 may be system information to be commonly applied to a process of reselecting, by the UE in the RRC idle mode or the RRC inactive mode, the intra-frequency cell, the inter-frequency cell, or the inter-RAT cell. The SIB3, the SIB4, and the SIB5 may include information required for the UE in the RRC idle mode or the RRC inactive mode to reselect a cell.

The SIB1 may include information about parameters such as a minimum required reception level, a minimum required quality level, or a threshold value which is used in determining whether to measure a serving cell signal, and such information may be applied in a cell-specific manner. The SIB2, the SIB3, the SIB4, and the SIB5 may include information about parameters such as a minimum required reception level, a minimum required quality level, or a threshold value which is used in determining whether to measure a neighbor cell signal. In detail, the SIB2 may include common information for reselecting the intra-frequency cell, the inter-frequency cell, or the inter-RAT cell, the SIB3 may include information for reselecting only the intra-frequency cell, the SIB4 may include information for reselecting only the inter-frequency cell, and the SIB5 may include information for reselecting only the inter-RAT cell.

In operation 3*g*-15, the UE in the RRC idle mode or the RRC inactive mode may wake up in a discontinuous reception (DRX) period and may measure reference signal received power (RSRP) $Q_{rxlevmeas}$ and reference signal received quality (RSRQ) $Q_{qualmeas}$ (operation 3*g*-15). The UE may calculate, based on the measurement values, a reception level Srxlev and a reception quality Squal of the serving cell by using the parameters received from the SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 3*g*-20). In this regard, the UE in the RRC idle mode or the RRC inactive mode may not receive the system information broadcast by the BS of the neighbor cell, and may perform the neighbor cell measurement by using the system information broadcast by the serving cell that the UE currently camps on. When the reception level Srxlev and the reception quality Squal of the serving cell which are measured in operation 3*g*-15 are lower than a threshold value (Srxlev≤$S_{IntraSearchP}$ and Squal≤$S_{IntraSearchQ}$), the UE in the RRC idle mode or the RRC inactive mode may measure intra-frequency cells using a same frequency as the serving cell (operation 3*g*-20). That is, a reception quality Squal or a reception level Srxlev of each intra-frequency cell using the same frequency as the serving cell may be derived based on the SIB2 or/and the SIB3 broadcast by the serving cell (application of Equation 1).

For reference, information about threshold values of $S_{IntraSearchP}$ and $S_{IntraSearchQ}$ is included in the SIB2. Also, regardless of a quality of the serving cell, the neighbor cell measurement may be performed on inter-frequency and inter-RAT cells having priorities higher than a frequency of the current serving cell (operation 3*g*-20). The UE may obtain information about the priorities from a dedicated RRC message (e.g., an RRCRelease message) from the BS or the system information. A reception quality Squal or a reception level Srxlev of each of inter-frequency cells having a priority higher than the frequency of the serving cell may be derived (according to Equation 1) based on the SIB4 broadcast by the serving cell, and a reception quality Squal or a reception level Srxlev of each of inter-RAT cells having a priority higher than the frequency of the serving cell may be derived (according to Equation 1) based on the SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell, which are measured in operation 3g-15, are lower than a threshold value (Srxlex≤$S_{nonIntraSearchP}$ and Squal≤$S_{intraSearchQ}$), the UE in the RRC idle mode or the RRC inactive mode may measure neighbor inter-frequency cells using a frequency different from the serving cell or neighbor inter-RAT cells using a RAT different from that of the serving cell (3g-20). That is, a reception quality Squal or a reception level Srxlev of at least one inter-frequency cell having a priority equal to or lower than the frequency of the serving cell is derived (according to Equation 1) based on the SIB4 broadcast by the serving cell, and a reception quality Squal or a reception level Srxlev of at least one inter-RAT cell having a priority lower than the frequency of the serving cell is derived (according to Equation 1) based on the SIB5 broadcast by the serving cell. For reference, information about threshold values of $S_{nonIntraSearchP}$ and $S_{nonIntraSearchQ}$ is included in the SIB2.

The UE in the RRC idle mode or the RRC inactive mode may perform a cell reselection evaluation process based on a cell reselection priority and/or a ranking, based on measurement values of neighbor cells (obtained in 3g-20) (3g-25). That is, when a plurality of cells fulfilling cell reselection criteria have different priorities, reselection of frequency/RAT cells having a higher priority precedes reselection of frequency/RAT cells having a lower priority (Cell reselection to a higher priority RAT/frequency shall take precede over a lower priority RAT/frequency if multiple cells of different priorities fulfill the cell reselection criteria). Priority information is included in the system information (the SIB2, the SIB4, and the SIB5) broadcast by the serving cell or is included in an RRCRelease message received when the UE transits from a RRC connected mode to the RRC idle mode or the RRC inactive mode. The information about the priorities which is included in the RRCRelease message may have a priority over information about priorities which is included in system information broadcast by the serving cell. Operations of the UE with respect to a cell reselection evaluation process for inter-frequency/inter-RAT cells having a priority higher than the frequency of the serving cell will now be described below.

First Operation:
In a case where the SIB2 including a threshold value of threshServingLowQ is broadcast and 1 second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ (Squal>$Thresh_{X,HighQ}$ during time interval $Treselection_{RAT}$), the UE may perform reselection with respect to the inter-frequency or inter-RAT cell.

Second Operation:
When the UE cannot perform the first operation, the UE may perform the second operation.
When 1 second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ (Srxlev>$Thresh_{X,HighP}$ during time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Threh_{X,HighQ}$ and $Thresh_{X,HighP}$, and $Treselection_{RAT}$ of the inter-frequency cell, i.e., information included in the SIB4 broadcast by the serving cell. Also, the UE may perform the first operation or the second operation, based on values of a reception quality Squal, a reception level Srxlev, threshold values $Threh_{X,HighQ}$ and $Thresh_{X,HighP}$, and $Treselection_{RAT}$ of the inter-RAT cell, i.e., information included in the SIB5 broadcast by the serving cell.

Also, operations of the UE with respect to a ranking-based cell reselection evaluation process for intra-frequency cells belonging to the frequency of the current serving cell or inter-frequency cells having a priority equal to the frequency of the current serving cell will now be described below.

Third Operation:
When a reception quality Squal and a reception level Srxlev of each of the intra-frequency/inter-frequency cells are greater than 0, the UE may derive rankings of respective cells based on measurement values of RSRPs (The UE shall perform ranking of all cells that fulfills the cell selection criterion S). Rankings of the serving cell and a neighbor cell may be respectively calculated by using Equation 2 described above.

In aforementioned Equation 2, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and $Q_{offset}$ indicates an offset between the serving cell and the neighbor cell. The SIB2 includes a $Q_{hyst}$ value, and the $Q_{hyst}$ value may be commonly used in reselecting intra-frequency/inter-frequency cells. When the intra-frequency cell is reselected, $Q_{offset}$ is signaled according to each cell, is applied only to a designated cell, and is included in the SIB3. When the inter-frequency cell is reselected, $Q_{offset}$ is signaled according to each cell, is applied only to a designated cell, and is included in the SIB4. When a ranking of a neighbor cell which is derived according to Equation 2 is greater than a ranking of the serving cell (i.e., $R_n > R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:
In a case where the SIB2 including a threshold value of threshServingLowQ is broadcast and 1 second has elapsed after the UE camped on the current serving cell, when a reception quality Squal of the current serving cell is less than a threshold value $Thresh_{Serving, LowQ}$ (Squal<$Thresh_{Serving, LowQ}$) and a reception quality Squal of an inter-frequency or inter-RAT cell is higher than a threshold value $Thresh_{X, LowQ}$ during a specific time interval $Treselection_{RAT}$ (Squal>$Thresh_{X,LowQ}$ during a time interval $Treselection_{RAT}$), the UE may perform reselection with respect to the inter-frequency or inter-RAT cell.

Fifth Operation:
When the UE cannot perform the fourth operation, the UE may perform the fifth operation.
When 1 second has elapsed after the UE camped on the current serving cell, a reception level Srxlev of the current serving cell is lower than a threshold value $Thresh_{Serving, LowP}$ (Srxlev<$Thresh_{Serving, LowP}$), and a reception level Srxlev of the inter-frequency or inter-RAT cell is higher than a threshold value $Thresh_{X, LowQ}$ during a specific time interval Treselection$_{RAT}$ (Srxlev>Thresh$_{X,LowP}$ during a time interval Treselection$_{RAT}$), the UE may perform reselection with respect to the inter-frequency or inter-RAT cell.

In this regard, the fourth operation or the fifth operation by the UE with respect to the inter-frequency cell may be performed based on the threshold values Thresh$_{Serving, LowQ}$ and Thresh$_{Serving, LowP}$ included in the SIB2 broadcast by the serving cell, and the reception quality Squal, the reception level Srxlev, and the threshold values Threh$_{X, LowQ}$ and Thresh$_{X, LowP}$ of the inter-frequency cell which are included in the SIB4 broadcast by the serving cell. The fourth operation or the fifth operation by the UE with respect to the inter-RAT cell may be performed based on the threshold values Thresh$_{Serving, LowQ}$ and Thresh$_{Serving, LowP}$ included in the SIB2 broadcast by the serving cell, and the reception quality Squal, the reception level Srxlev, and the threshold values Thresh$_{X,LowQ}$ and Thresh$_{X, LowP}$ of the inter-RAT cell which are included in the SIB5 broadcast by the serving cell. For example, the SIB4 includes a $Q_{qualmin}$ value or a $Q_{rxlevmin}$ value, and the reception quality Squal or the reception level Srxlev of the inter-frequency cell may be derived based on the values.

In 3g-30, the UE may derive a candidate cell list, and then may select a candidate target cell based on a priority and/or a ranking from the candidate cell list. When the candidate target cell is selected, in 3g-35, the UE in the RRC idle mode or the RRC inactive mode may determine whether to select a corresponding cell by attempting to receive the MIB and the SIB1 broadcast by the corresponding cell before the UE finally selects the corresponding cell. At this time, the UE performs operations below.

When the selected candidate target cell broadcasts the MIB in 3g-35, the UE may attempt to receive the MIB in 3g-40.

When the UE cannot obtain the MIB, the UE may perform a sixth operation in 3g-45.

Sixth Operation: The UE may consider a cell status of the corresponding cell to be barred, and may exclude the corresponding cell from the candidate cell list of cell selection/reselection for 300 seconds (the UE shall or may exclude the barred cell as a candidate for cell selection/reselection for up to 300 seconds). When a reception quality Squal and/or a reception level Srxlev of another cell which are derived according to Equation 1, the other cell using the same frequency as the corresponding cell, is greater than 0 and/or satisfies the cell reselection criteria, the UE may select the other cell (the UE may select another cell on the same frequency if the selection criteria and/or cell reselection criteria are fulfilled).

When the UE receives the MIB (Upon reception of the MIB), the UE may determine whether the corresponding cell satisfies a first condition or a second condition, based on the information included in the MIB (3g-50).

First condition: When a cellBarred field value included in the received MIB is set to "barred" and/or PDCCH-ConfigSIB1 is not supported.

Second condition: A condition that does not correspond to the first condition

Seventh operation: When the first condition is satisfied, in 3g-55, the UE may consider the corresponding cell as a barred cell, and may exclude the barred cell from the candidate cell list of cell selection/reselection for 300 seconds. When an intraFreqReselection field value included in the MIB is set to "notAllowed", the UE may not select/reselect, for 300 seconds, cell(s) that uses the same frequency as the barred cell. When the intraFreqReselection field value included in the MIB is set to "allowed", the UE may select cell(s) when the cell(s) satisfies the cell reselection criteria, the cell(s) using uses the same frequency as the barred cell.

Eighth operation: When the second condition is satisfied, in 3g-60, the UE may consider the corresponding cell as an allowed cell, and may determine the corresponding cell to be a candidate cell with respect to cell selection/reselection. When the intraFreqReselection field value included in the MIB is set to "notAllowed", the UE may not select/reselect, for 300 seconds, cell(s) that uses the same frequency as the cell. When the intraFreqReselection field value included in the MIB is set to "allowed", the UE may select cell(s) when the cell(s) satisfies the cell reselection criteria, the cell(s) using uses the same frequency as the cell.

When the selected candidate target cell broadcasts the SIB1 in 3g-35, the UE may attempt to receive the SIB1 in 3g-65.

When the UE cannot obtain the SIB1, the UE may perform, in 3g-70, the seventh operation described in 3g-55.

When the UE receives the SIB1 (Upon reception of the SIB), the UE may determine whether the corresponding cell satisfies a third condition or a fourth condition, based on the information included in the MIB and the SIB1 (3g-75). The third condition and the fourth condition are as below.

Third condition: When the UE identifies a SCS value configured in subCarrierSpacingCommon of the received MIB, and does not support both Bandwidth of initial DL BWP and Bandwidth of initial UL BWP using the SCS value in configured locationAndBandwidth in the received SIB1

Fourth condition: When the UE identifies a SCS value configured in subCarrierSpacingCommon of the received MIB, and supports both Bandwidth of initial DL BWP and Bandwidth of initial UL BWP using the SCS value in configured locationAndBandwidth in the received SIB1 (If the UE supports the bandwidth of the initial DL/UL BWP in locationAndBandwidth in SIB1)

Ninth operation: When the third condition is satisfied, in 3g-80, the UE may determine that the corresponding cell is not accessible or may consider the corresponding cell as a barred cell, and may exclude the corresponding cell from the candidate cell list of cell selection/reselection for 300 seconds. The UE may not select/reselect, for 300 seconds, cell(s) that uses the same frequency as the barred cell.

Tenth operation: When the fourth condition is satisfied, in 3g-85, the UE may determine that the corresponding cell is accessible. Then, the UE may derive a reception quality Squal and/or a reception level Srxlev of the corresponding cell by using Equation 1 based on the information included in the SIB1, and when the reception quality Squal and/or the reception level Srxlev satisfies S-criterion (Srxlev>0 AND/OR Squal>0), the UE may finally reselect the corresponding cell, or otherwise, the UE may not finally reselect the corresponding cell.

Figure 3H:
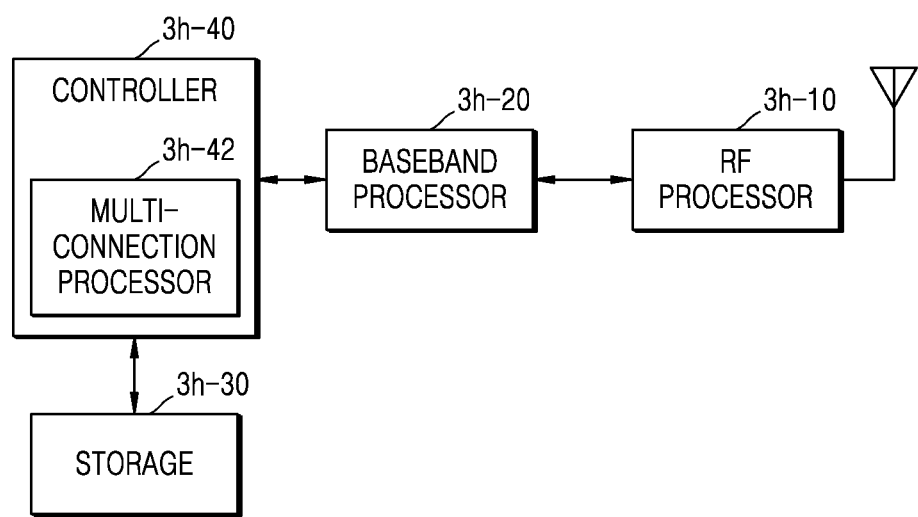
FIG. 3H illustrates a block diagram of a UE, according to an embodiment of the disclosure.

FIG. 3H illustrates a block diagram of a UE, according to an embodiment of the disclosure.

Referring to FIG. 3H, the UE may include a radio frequency (RF) processor 3h-10, a baseband processor 3h-20, a storage 3h-30, and a controller 3h-40. The UE according to an embodiment of the disclosure may perform operations to implement the embodiments of the disclosure described above with reference to FIGS. 1A to 3G.

The RF processor 3h-10 may perform functions for transmitting and receiving signals through wireless channels, e.g., band conversion and amplification of the signals. That is, the RF processor 3h-10 may up-convert a baseband signal provided from the baseband processor 3h-20, into an RF band signal and then may transmit the RF band signal through an antenna, and may down-convert an RF band signal received through the antenna, into a baseband signal. For example, the RF processor 3h-10 may include a transmit filter, a receive filter, an amplifier, a mixer, an oscillator, a digital-to-analog convertor (DAC), an analog-to-digital convertor (ADC), or the like.

Although only one antenna is illustrated in FIG. 3H, the UE may include a plurality of antennas. The RF processor 3h-10 may include a plurality of RF chains. The RF processor 3h-10 may perform beamforming. For beamforming, the RF processor 3h-10 may adjust phases and intensities of signals to be transmitted or received through a plurality of antennas or antenna elements. The RF processor 3h-10 may perform a Multiple Input Multiple Output (MIMO) operation and may receive data of a plurality of layers in the MIMO operation.

The baseband processor 3h-20 may convert between a baseband signal and a bitstream based on physical layer specifications of a system. For example, for data transmission, the baseband processor 3h-20 generates complex symbols by encoding and modulating a transmit bitstream. For data reception, the baseband processor 3h-20 may reconstruct a received bitstream by demodulating and decoding a baseband signal provided from the RF processor 3h-10. For example, according to an OFDM scheme, for data transmission, the baseband processor 3h-20 generates complex symbols by encoding and modulating a transmit bitstream, maps the complex symbols to subcarriers, and then configures OFDM symbols by performing inverse fast Fourier transformation (IFFT) and cyclic prefix (CP) insertion. For data reception, the baseband processor 3h-20 may segment a baseband signal provided from the RF processor 3h-10, into OFDM symbol units, may reconstruct signals mapped to subcarriers by performing fast Fourier transformation (FFT), and then may reconstruct a received bitstream by demodulating and decoding the signals.

The baseband processor 3h-20 and the RF processor 3h-10 transmit and receive signals as described above. The baseband processor 3h-20 and the RF processor 3h-10 may also be called a transmitter, a receiver, a transceiver, or a communicator. At least one of the baseband processor 3h-20 or the RF processor 3h-10 may include a plurality of communication modules to support a plurality of different radio access technologies. At least one of the baseband processor 3h-20 or the RF processor 3h-10 may include different communication modules to process signals of different frequency bands. For example, the different radio access technologies may include a wireless local area network (WLAN) (e.g., IEEE 802.11), a cellular network (e.g., LTE), or the like. The different frequency bands may include a super-high frequency (SHF) (e.g., 2 NRHz or 1 NRHz) band and a millimeter wave (mmWave) (e.g., 60 GHz) band.

The storage 3h-30 stores basic programs, application programs, and data, e.g., configuration information, for operations of the UE. In particular, the storage 3h-30 may store information about a second access node configured to perform wireless communication by using a second radio access technology. The storage 3h-30 may provide the stored data upon request by the controller 3h-40.

The controller 3h-40 may control overall operations of the UE. For example, the controller 3h-40 may transmit and receive signals through the baseband processor 3h-20 and the RF processor 3h-10. The controller 3h-40 may record and read data on or from the storage 3h-30. In this regard, the controller 3h-40 may include at least one processor. For example, the controller 3h-40 may include a communication processor (CP) for controlling communications and an application processor (AP) for controlling an upper layer such as an application program.

The controller 3h-40 may include a multi-connection processor 3h-42 for performing processing to operate in a multi-connection mode.

Figure 3I:
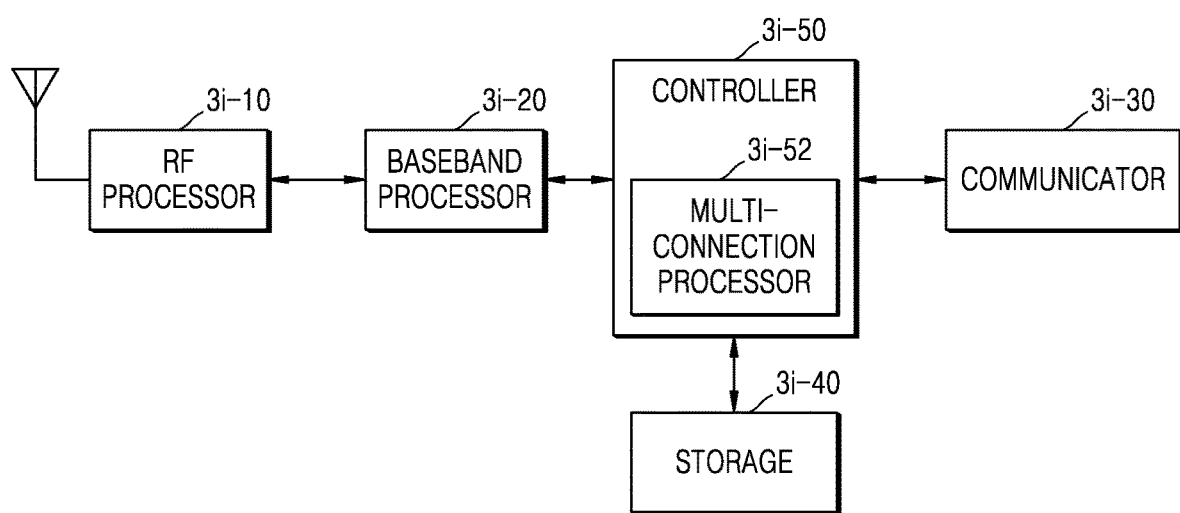
FIG. 3I illustrates a block diagram of a BS, according to an embodiment of the disclosure.

FIG. 3I is a block diagram of a BS, according to an embodiment of the disclosure.

Referring to FIG. 3I, the BS may include an RF processor 3i-10, a baseband processor 3i-20, a backhaul communicator 3i-30, a storage 3i-40, and a controller 3i-50.

The BS according to an embodiment of the disclosure may perform operations to implement the embodiments of the disclosure described above with reference to FIGS. 1A to 3G.

The RF processor 3i-10 may perform functions for transmitting and receiving signals through wireless channels, e.g., band conversion and amplification of the signals. The RF processor 3i-10 may up-convert a baseband signal provided from the baseband processor 3i-20, into an RF band signal and then may transmit the RF band signal through an antenna, and may down-convert an RF band signal received through an antenna, into a baseband signal. For example, the RF processor 3i-10 may include a transmit filter, a receive filter, an amplifier, a mixer, an oscillator, a DAC, an ADC, or the like. Although only one antenna is illustrated in FIG. 3I, the BS 3i may include a plurality of antennas. The RF processor 3i-10 may include a plurality of RF chains.

In addition, the RF processor 3i-10 may perform beamforming. For beamforming, the RF processor 3i-10 may adjust phases and intensities of signals to be transmitted or received through a plurality of antennas or antenna elements. The RF processor 3i-10 may perform a DL MIMO operation by transmitting data of one or more layers.

The baseband processor 3i-20 may convert between a baseband signal and a bitstream based on physical layer specifications of a first radio access technology. For example, for data transmission, the baseband processor 3i-20 may generate complex symbols by encoding and modulating a transmit bitstream. For data reception, the baseband processor 3i-20 may reconstruct a received bitstream by demodulating and decoding a baseband signal provided from the RF processor 3i-10. For example, according to an OFDM scheme, for data transmission, the baseband processor 3i-20 may generate complex symbols by encoding and modulating a transmit bitstream, may map the complex symbols to subcarriers, and then may configure OFDM symbols by performing IFFT and CP insertion. For data reception, the baseband processor 3i-20 may segment a baseband signal provided from the RF processor 3i-10, into OFDM symbol units, may reconstruct signals mapped to subcarriers by performing FFT, and then may reconstruct a received bitstream by demodulating and decoding the signals. The baseband processor 3i-20 and the RF processor 3i-10 may transmit and receive signals as described above. As such, the baseband processor 3i-20 and the RF processor 3i-10 may also be called a transmitter, a receiver, a transceiver, a communicator, or a wireless communicator.

The backhaul communicator 3i-30 may provide an interface for communicating with other nodes in a network That is, the backhaul communicator 3i-30 may convert a bitstream to be transmitted from the BS to another node, e.g., a secondary BS or a core network, into a physical signal, and converts a physical signal received from the other node, into a bitstream.

The storage 3i-40 may store basic programs, application programs, and data, e.g., configuration information, for operations of the BS. In particular, the storage 3i-40 may store, for example, information about bearers assigned for a connected UE and measurement results reported from the connected UE. The storage 3i-40 may store criteria information used to determine whether to provide or release dual connectivity to or from the UE. The storage 3i-40 may provide the stored data upon request by the controller 3i-50.

The controller 3i-50 may control overall operations of the BS. For example, the controller 3i-50 may transmit and receive signals through the baseband processor 3i-20 and the RF processor 3i-10, or the backhaul communicator 3i-30. The controller 3i-50 may record and read data on or from the storage 3i-40. To this end, the controller 3i-50 may include at least one processor.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

According to an embodiment of the disclosure, information about a capability of the UE may be easily provided in the mobile communication system. According to an embodiment of the disclosure, the UE may perform a resource request by using a plurality of scheduling requests according to a characteristic of traffic and a reason of a transmit resource request, and thus may be timely allocated a UL resource and then may transmit data. According to an embodiment of the disclosure, the UE may effectively perform cell reselection, in response to channel bandwidth signaling, in the mobile communication system.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

Although the present disclosure has been described with various embodiments, various changes and modifications may be suggested to one skilled in the art. It is intended that the present disclosure encompass such changes and modifications as fall within the scope of the appended claims.

What is claimed is:

1. A user equipment (UE) comprising:
a transceiver; and
a processor configured to:
receive a system information block 1 (SIB1) message via the transceiver,
identify, based on the received SIB1 message, that the UE does not support at least one of an uplink bandwidth of an initial uplink bandwidth-part (BWP) or a downlink bandwidth of an initial downlink BWP, and
in case that the UE does not support at least one of the uplink bandwidth of the initial uplink BWP or the downlink bandwidth of the initial downlink BWP, determine a cell corresponding to the SIB1 as barred.

2. The UE of claim 1, wherein the processor excludes the barred cell as a candidate for a cell selection or a reselection for up to 300 seconds.

3. The UE of claim 1, wherein the uplink bandwidth is identified based on an uplink parameter for a subcarrier spacing (SCS) of the initial uplink BWP and the downlink bandwidth is identified based on a downlink parameter for the SCS of the initial downlink BWP.

4. The UE of claim 1,
wherein, in case that the UE does not support at least one of the uplink bandwidth of the initial uplink BWP or the downlink bandwidth of the initial downlink BWP, the processor performs barring of the cell as if selection or reselection of intra-frequency cell is set to not allowed.

5. A base station comprising:
a transceiver; and
a processor configured to:
determine an uplink bandwidth of an initial uplink bandwidth-part (BWP) and a downlink bandwidth of an initial downlink BWP, and
transmit, via the transceiver, a system information block 1 (SIB1) message including information indicating the determined uplink bandwidth and the determined downlink bandwidth,
wherein in case that at least one of the uplink bandwidth of the initial uplink BWP or the downlink bandwidth of the initial downlink BWP is not supported at a user equipment (UE), a cell corresponding to the SIB 1 message is determined to be barred at the UE.

6. The base station of claim 5, wherein the barred cell is excluded as a candidate for a cell selection or a reselection for up to 300 seconds.

7. The base station of claim 5, wherein the uplink bandwidth is identified based on an uplink parameter for a subcarrier spacing (SCS) of the initial uplink BWP and the downlink bandwidth is identified based on a downlink parameter for the SCS of the initial downlink BWP.

8. The base station of claim 5, wherein in case that at least one of the uplink bandwidth of the initial uplink BWP or the downlink bandwidth of the initial downlink BWP is not supported at the UE, barring of the cell is performed as if selection or reselection of intra-frequency cell is set to not allowed.

9. A method performed by a user equipment (UE), the method comprising:

receiving a system information block 1 (SIB1) message;
identifying, based on the received SIB 1 message, that the UE does not support at least one of an uplink bandwidth of an initial uplink bandwidth-part (BWP) or a downlink bandwidth of an initial downlink BWP; and
in case that the UE does not support at least one of the uplink bandwidth of the initial uplink BWP or the downlink bandwidth of the initial downlink BWP, determining a cell corresponding to the SIB1 as barred.

10. The method of claim 9, further comprising:
excluding the barred cell as a candidate for a cell selection or a reselection for up to 300 seconds.

11. The method of claim 9, wherein the uplink bandwidth is identified based on an uplink parameter for a subcarrier spacing (SCS) of the initial uplink BWP and the downlink bandwidth is identified based on a downlink parameter for the SCS of the initial downlink BWP.

12. The method of claim 9,
wherein in case that the UE does not support at least one of the uplink bandwidth of the initial uplink BWP or the downlink bandwidth of the initial downlink BWP, barring the cell as if selection or reselection of intra-frequency cell is set to not allowed.

13. A method performed by a base station, the method comprising:
determining an uplink bandwidth of an initial uplink bandwidth-part (BWP) and a downlink bandwidth of an initial downlink BWP; and
transmitting a system information block 1 (SIB1) message including information indicating the determined uplink bandwidth and the determined downlink bandwidth,
wherein in case that at least one of the uplink bandwidth of the initial uplink BWP or the downlink bandwidth of the initial downlink BWP is not supported at a user equipment (UE), a cell corresponding to the SIB 1 message is determined to be barred at the UE.

14. The method of claim 13, wherein the barred cell is excluded as a candidate for a cell selection or a reselection for up to 300 seconds.

15. The method of claim 13, wherein the uplink bandwidth is identified based on an uplink parameter for a subcarrier spacing (SCS) of the initial uplink BWP and the downlink bandwidth is identified based on a downlink parameter for the SCS of the initial downlink BWP.

16. The method of claim 13, wherein in case that at least one of the uplink bandwidth of the initial uplink BWP or the downlink bandwidth of the initial downlink BWP is not supported at the UE, barring of the cell is performed as if selection or reselection of intra-frequency cell is set to not allowed.

* * * * *